(12) United States Patent (10) Patent No.: US 10,256,540 B2
An et al. (45) Date of Patent: Apr. 9, 2019

(54) ANTENNA ASSEMBLY AND METHOD FOR MANUFACTURING SAME

(71) Applicant: LG INNOTEK CO., LTD., Seoul (KR)

(72) Inventors: Jeong Wook An, Seoul (KR); Jung Oh Lee, Seoul (KR); Yang Hyun Kim, Seoul (KR); Ki Min Lee, Seoul (KR); Hye Min Lee, Seoul (KR); Sung Hyun Leem, Seoul (KR); Ki Chul Chang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/362,367

(22) Filed: Nov. 28, 2016

(65) Prior Publication Data

US 2017/0133744 A1 May 11, 2017

Related U.S. Application Data

(63) Continuation of application No. 14/387,521, filed as application No. PCT/KR2013/002412 on Mar. 22, 2013, now Pat. No. 9,553,476.

(30) Foreign Application Priority Data

Mar. 23, 2012 (KR) .................. 10-2012-0029987
Jul. 19, 2012 (KR) .................. 10-2012-0079004
(Continued)

(51) Int. Cl.
*H01Q 7/00* (2006.01)
*H02J 50/12* (2016.01)
(Continued)

(52) U.S. Cl.
CPC ............. *H01Q 7/00* (2013.01); *H01P 11/00* (2013.01); *H01Q 1/2225* (2013.01);
(Continued)

(58) Field of Classification Search
CPC ...... H01Q 7/00; H01Q 1/2225; H01Q 1/2208; H01Q 5/40
(Continued)

(56) References Cited

U.S. PATENT DOCUMENTS 4,947,180 A 8/1990 Scholz
5,574,470 A * 11/1996 de Vall ............... G06K 7/10336
340/572.7

(Continued)

FOREIGN PATENT DOCUMENTS

CN 1462413 A 12/2003
CN 1592986 A 3/2005
(Continued)

OTHER PUBLICATIONS

Office Action dated Feb. 14, 2017 in Japanese Application No. 2015501586.
(Continued)

*Primary Examiner* — Dameon E Levi
*Assistant Examiner* — Ab Salam Alkassim, Jr.
(74) *Attorney, Agent, or Firm* — Saliwanchik, Lloyd & Eisenschenk

(57) ABSTRACT

Disclosed is an antenna assembly including a substrate, and a wireless charge antenna pattern on the substrate. The wireless charge antenna pattern has a sectional surface including a plurality of inner angles in which two inner angles are different from each other. The antenna assembly includes a wireless communication antenna pattern formed on the substrate and provided at an outside of the wireless charge antenna pattern. The wireless communication antenna pattern has a plurality of inner angles at a sectional surface thereof, and a plurality of angle values of the inner angles provided at the sectional surface of the wireless communication antenna pattern correspond to a plurality of
(Continued)

angle values of the inner angles provided at the sectional surface of the wireless charge antenna pattern, respectively.

20 Claims, 44 Drawing Sheets

(30) Foreign Application Priority Data

| | | | |
|---|---|---|---|
| Nov. 2, 2012 | (KR) | ........................ | 10-2012-0123375 |
| Mar. 15, 2013 | (KR) | ........................ | 10-2013-0028300 |
| Mar. 15, 2013 | (KR) | ........................ | 10-2013-0028301 |
| Mar. 15, 2013 | (KR) | ........................ | 10-2013-0028302 |
| Mar. 15, 2013 | (KR) | ........................ | 10-2013-0028303 |

(51) Int. Cl.
| | |
|---|---|
| *H02J 50/70* | (2016.01) |
| *H01P 11/00* | (2006.01) |
| *H01Q 1/22* | (2006.01) |
| *H01Q 1/38* | (2006.01) |
| *H04B 5/00* | (2006.01) |

(52) U.S. Cl.
CPC ............ *H01Q 1/2291* (2013.01); *H01Q 1/38* (2013.01); *H02J 50/12* (2016.02); *H02J 50/70* (2016.02); *H04B 5/0037* (2013.01); *H04B 5/0081* (2013.01)

(58) Field of Classification Search
USPC ........................................................ 343/788
See application file for complete search history.

(56) References Cited

U.S. PATENT DOCUMENTS

| | | | |
|---|---|---|---|
| 6,008,622 A | 12/1999 | Nakawatase | |
| 6,575,374 B1 | 6/2003 | Boyadjian et al. | |
| 6,950,023 B1* | 9/2005 | Martin ............ | G06K 19/07749 340/572.1 |
| 7,113,137 B2 | 9/2006 | Bisig | |
| 7,259,672 B2 | 8/2007 | Takei | |
| 7,712,672 B2* | 5/2010 | Takahashi ........... | G06K 7/10336 235/492 |
| 7,971,339 B2 | 7/2011 | Finn | |
| 8,159,182 B2 | 4/2012 | Kato et al. | |
| 8,177,137 B2 | 5/2012 | Arai | |
| 8,514,135 B2* | 8/2013 | Jang .................... | H01Q 1/2225 343/700 MS |
| 8,792,837 B2* | 7/2014 | Deguchi ............ | G06K 7/10336 343/788 |
| 8,947,189 B2 | 2/2015 | Maruyama et al. | |
| 9,053,406 B2 | 6/2015 | Higashiyama | |
| 9,105,967 B2* | 8/2015 | Park ....................... | H01Q 1/243 |
| 9,165,708 B2* | 10/2015 | Lim ........................ | H02J 50/10 |
| 9,276,642 B2* | 3/2016 | Shostak ............... | H04B 5/0037 |
| 9,450,303 B2* | 9/2016 | Su .......................... | H01Q 1/526 |
| 9,460,847 B2 | 10/2016 | Lee et al. | |
| 9,484,768 B2* | 11/2016 | Park ........................ | B06B 1/06 |
| 9,515,513 B2* | 12/2016 | Suzuki .................... | H02J 7/025 |
| 9,543,653 B2* | 1/2017 | Han ........................ | H01Q 1/38 |
| 9,553,476 B2* | 1/2017 | An .......................... | H01P 11/00 |
| 9,607,757 B2* | 3/2017 | Hirobe .................... | H01Q 5/40 |
| 9,673,509 B2* | 6/2017 | Park ....................... | H01Q 1/243 |
| 9,674,646 B2* | 6/2017 | Jang ........................ | H01Q 1/273 |
| 9,761,928 B2* | 9/2017 | Han ....................... | H01Q 1/243 |
| 9,825,484 B2* | 11/2017 | Van Bosch ............. | H02J 7/025 |
| 9,843,215 B2* | 12/2017 | Yeom ..................... | H02J 5/005 |
| 9,941,576 B2* | 4/2018 | Ito .......................... | H01Q 7/06 |
| 9,941,729 B2* | 4/2018 | Peralta ................... | H02J 5/005 |
| 9,941,743 B2* | 4/2018 | Peralta ................... | H01F 38/14 |
| 9,948,129 B2* | 4/2018 | Singh ..................... | H02J 7/025 |
| 9,960,629 B2* | 5/2018 | Rajagopalan .......... | H02J 7/025 |
| 9,991,735 B1* | 6/2018 | Yamaguchi ............. | H02J 50/90 |
| 9,991,744 B2* | 6/2018 | Lee ......................... | H02J 50/10 |
| 10,003,120 B2* | 6/2018 | Kang .................... | H01Q 1/2291 |
| 10,014,577 B2* | 7/2018 | Cao ....................... | H01Q 1/38 |
| 10,063,100 B2* | 8/2018 | Singh ..................... | H01F 27/38 |
| 10,110,052 B2* | 10/2018 | Yeom .................... | H02J 5/005 |
| 2003/0141590 A1 | 7/2003 | Kamiya et al. | |
| 2005/0046573 A1 | 3/2005 | De Velasco et al. | |
| 2005/0072595 A1 | 4/2005 | Cho | |
| 2005/0079820 A1* | 4/2005 | Yamashita ........... | G06K 7/0008 455/41.2 |
| 2005/0116874 A1 | 6/2005 | El-Mahdawy et al. | |
| 2005/0275497 A1* | 12/2005 | Ramadan ................ | H01F 5/003 336/200 |
| 2006/0166506 A1 | 7/2006 | Okawa et al. | |
| 2007/0001921 A1* | 1/2007 | Takahashi ............... | H01Q 1/38 343/788 |
| 2007/0007661 A1 | 1/2007 | Burgess et al. | |
| 2007/0020932 A1 | 1/2007 | Maruyama et al. | |
| 2007/0069961 A1 | 3/2007 | Akiho et al. | |
| 2007/0095913 A1* | 5/2007 | Takahashi .......... | G06K 7/10336 235/451 |
| 2007/0254432 A1 | 11/2007 | Yamazaki et al. | |
| 2007/0279002 A1 | 12/2007 | Partovi | |
| 2008/0055046 A1* | 3/2008 | Shimizu ................... | H01Q 1/22 340/10.1 |
| 2008/0122570 A1 | 5/2008 | Takaishi | |
| 2008/0129439 A1 | 6/2008 | Nishikawa et al. | |
| 2008/0154178 A1 | 6/2008 | Carter et al. | |
| 2008/0164840 A1 | 7/2008 | Kato et al. | |
| 2008/0197957 A1 | 8/2008 | Kondo et al. | |
| 2008/0200210 A1 | 8/2008 | Lim et al. | |
| 2008/0246664 A1* | 10/2008 | Ikemoto ........... | G06K 19/07749 343/700 MS |
| 2008/0266748 A1 | 10/2008 | Lee | |
| 2008/0303735 A1* | 12/2008 | Fujimoto ................. | H01Q 1/22 343/787 |
| 2009/0029185 A1 | 1/2009 | Lee et al. | |
| 2009/0058358 A1 | 3/2009 | Inoue et al. | |
| 2009/0058737 A1 | 3/2009 | Tsujimura et al. | |
| 2009/0108974 A1* | 4/2009 | Raggam ........... | G06K 19/07749 336/105 |
| 2009/0115681 A1 | 5/2009 | Lai et al. | |
| 2009/0314842 A1 | 12/2009 | Charrin | |
| 2009/0315680 A1* | 12/2009 | Arimura .......... | G06K 19/07749 340/10.1 |
| 2010/0156735 A1* | 6/2010 | Nakamura ............... | H01Q 1/38 343/788 |
| 2010/0265041 A1 | 10/2010 | Almog et al. | |
| 2010/0277004 A1 | 11/2010 | Suzuki et al. | |
| 2010/0289341 A1 | 11/2010 | Ozaki et al. | |
| 2010/0295682 A1* | 11/2010 | August ............ | G06K 19/07749 340/572.7 |
| 2010/0308187 A1 | 12/2010 | Lin | |
| 2011/0032685 A1 | 2/2011 | Akiba et al. | |
| 2011/0050164 A1 | 3/2011 | Partovi et al. | |
| 2011/0127070 A1 | 6/2011 | Ahn et al. | |
| 2011/0267248 A1 | 11/2011 | Remski et al. | |
| 2011/0285494 A1 | 11/2011 | Jeong et al. | |
| 2011/0302770 A1 | 12/2011 | Radenne et al. | |
| 2011/0312382 A1* | 12/2011 | Itay ......................... | H04B 1/3816 455/558 |
| 2012/0001701 A1* | 1/2012 | Taniguchi ............. | G06K 7/0008 333/5 |
| 2012/0019075 A1 | 1/2012 | Cho et al. | |
| 2012/0044114 A1 | 2/2012 | Eom et al. | |
| 2012/0049986 A1 | 3/2012 | Cho et al. | |
| 2012/0057322 A1 | 3/2012 | Waffenschmidt | |
| 2012/0058722 A1* | 3/2012 | Lo .......................... | H04B 1/3816 455/41.1 |
| 2012/0092222 A1* | 4/2012 | Kato ....................... | G08B 13/00 343/742 |
| 2012/0187767 A1 | 7/2012 | Kanno et al. | |
| 2012/0248981 A1 | 10/2012 | Karalis et al. | |
| 2012/0249276 A1* | 10/2012 | Fontana ............... | H01F 17/0013 336/105 |
| 2012/0274148 A1* | 11/2012 | Sung .................... | H04B 5/0037 307/104 |

(56) References Cited

U.S. PATENT DOCUMENTS

| | | | |
|---|---|---|---|
| 2013/0038278 A1* | 2/2013 | Park | H02J 7/00 320/108 |
| 2013/0038497 A1 | 2/2013 | Chae et al. | |
| 2013/0069444 A1 | 3/2013 | Waffenschmidt et al. | |
| 2013/0106198 A1 | 5/2013 | Kuk et al. | |
| 2013/0113422 A1* | 5/2013 | Lee | H01Q 1/526 320/108 |
| 2013/0169398 A1* | 7/2013 | Sugita | H01Q 1/243 336/179 |
| 2013/0176179 A1* | 7/2013 | Park | H01Q 1/243 343/702 |
| 2013/0200716 A1 | 8/2013 | Kesler et al. | |
| 2013/0249302 A1 | 9/2013 | An et al. | |
| 2013/0267170 A1* | 10/2013 | Chong | H04B 1/3833 455/41.1 |
| 2013/0271328 A1 | 10/2013 | Nickel et al. | |
| 2013/0285783 A1* | 10/2013 | Yussof | H01F 5/003 336/138 |
| 2013/0308256 A1* | 11/2013 | Lehr | G06F 1/266 361/679.01 |
| 2014/0062827 A1* | 3/2014 | Kato | H01Q 1/38 343/856 |
| 2014/0091640 A1 | 4/2014 | Scholz et al. | |
| 2014/0091758 A1 | 4/2014 | Hidaka et al. | |
| 2014/0145906 A1* | 5/2014 | Kato | H01Q 7/00 343/867 |
| 2014/0168019 A1* | 6/2014 | Hirobe | H01Q 5/40 343/720 |
| 2014/0168026 A1* | 6/2014 | Nakamura | H01F 5/04 343/788 |
| 2014/0176384 A1* | 6/2014 | Yosui | H01Q 7/06 343/788 |
| 2014/0184462 A1* | 7/2014 | Yosui | H01Q 7/06 343/788 |
| 2014/0210406 A1* | 7/2014 | Na | H02J 5/005 320/108 |
| 2014/0226293 A1 | 8/2014 | Sato | |
| 2014/0266030 A1* | 9/2014 | Park, II | H01F 27/34 320/108 |
| 2015/0054455 A1* | 2/2015 | Kim | H02J 17/00 320/108 |
| 2015/0054457 A1* | 2/2015 | Kim | H01F 38/14 320/108 |
| 2015/0061400 A1* | 3/2015 | Park, II | H01F 38/14 307/104 |
| 2015/0077296 A1* | 3/2015 | An | H01P 11/00 343/720 |
| 2015/0116178 A1* | 4/2015 | Kim | H01Q 17/00 343/842 |
| 2015/0123604 A1* | 5/2015 | Lee | H01F 38/14 320/108 |
| 2015/0145635 A1* | 5/2015 | Kurz | H01F 38/14 336/232 |
| 2015/0171519 A1* | 6/2015 | Han | H01Q 1/38 343/720 |
| 2015/0207207 A1* | 7/2015 | Park | H01Q 1/243 343/702 |
| 2015/0222017 A1* | 8/2015 | Kumura | H01Q 5/40 343/788 |
| 2015/0281873 A1* | 10/2015 | Ojala | H04W 8/245 455/41.2 |
| 2016/0064814 A1* | 3/2016 | Jang | H01Q 1/526 343/842 |
| 2016/0118711 A1* | 4/2016 | Finn | G06K 19/07769 343/867 |
| 2016/0126002 A1* | 5/2016 | Chien | H01F 27/2804 320/108 |
| 2016/0188926 A1* | 6/2016 | Pachler | G06K 7/10336 235/487 |
| 2016/0204836 A1* | 7/2016 | Lee | H04B 5/0087 343/702 |
| 2016/0224975 A1* | 8/2016 | Na | G06Q 20/352 |
| 2016/0315497 A1* | 10/2016 | Kim | H02J 17/00 |
| 2016/0345125 A1* | 11/2016 | Kim | H04W 4/008 |
| 2017/0040696 A1* | 2/2017 | Peralta | H01F 38/14 |
| 2017/0054213 A1* | 2/2017 | Singh | H01Q 7/06 |
| 2017/0213644 A1* | 7/2017 | Lee | H01F 38/14 |
| 2017/0317519 A1* | 11/2017 | Yeom | H02J 50/10 |
| 2017/0338562 A1* | 11/2017 | Ozenne | G06K 7/10356 |
| 2017/0345535 A1* | 11/2017 | Kim | H01F 1/26 |
| 2018/0076650 A1* | 3/2018 | Yamaguchi | H02J 50/90 |
| 2018/0189627 A1* | 7/2018 | Kwon | G06K 19/07779 |
| 2018/0248255 A1* | 8/2018 | Noh | H01Q 1/38 |
| 2018/0287243 A1* | 10/2018 | Ko | H01Q 1/241 |

FOREIGN PATENT DOCUMENTS

| | | |
|---|---|---|
| CN | 1784510 A | 6/2006 |
| CN | 1816945 A | 8/2006 |
| CN | 2888666 Y | 4/2007 |
| CN | 101140635 A | 3/2008 |
| CN | 101256876 A | 9/2008 |
| CN | 101573716 A | 11/2009 |
| CN | 101924398 A | 12/2010 |
| CN | 102083280 A | 6/2011 |
| CN | 202120299 U | 1/2012 |
| CN | 102360718 A | 2/2012 |
| EP | 02642632 A2 | 9/2013 |
| EP | 02752943 A1 | 7/2014 |
| JP | S56-78415 U | 6/1981 |
| JP | S61-69811 U | 6/1981 |
| JP | S61-69811 U | 5/1986 |
| JP | H04-51115 U | 4/1992 |
| JP | H06-267746 A | 9/1994 |
| JP | H07-074038 A | 3/1995 |
| JP | H08-79976 A | 3/1996 |
| JP | H10282232 A | 10/1998 |
| JP | H11-175676 A | 7/1999 |
| JP | 2001-027687 A | 1/2001 |
| JP | 2002-299138 A | 10/2002 |
| JP | 2004110854 A | 4/2004 |
| JP | 2004-153463 A | 5/2004 |
| JP | 2004364199 A | 12/2004 |
| JP | 2006-042519 A | 2/2006 |
| JP | 2007-311407 A | 11/2007 |
| JP | 2008-027015 A | 2/2008 |
| JP | 2008-172872 A | 7/2008 |
| JP | 2008-205215 A | 9/2008 |
| JP | 2008-210861 A | 9/2008 |
| JP | 2009033106 A | 2/2009 |
| JP | 2011-097534 A | 5/2011 |
| JP | 2012-008857 A | 1/2012 |
| JP | 2012-010533 A | 1/2012 |
| JP | 2012019302 A | 1/2012 |
| JP | 2012-178959 A | 9/2012 |
| JP | 2012-0191134 A | 10/2012 |
| KR | 1020040063286 A | 7/2004 |
| KR | 10-2005-0120481 A | 12/2005 |
| KR | 10-2006-0008332 A | 1/2006 |
| KR | 10-2008-0074640 A | 8/2008 |
| KR | 10-2010-0130480 A | 12/2010 |
| KR | 10-2012-0016778 A | 2/2012 |
| KR | 10-1177302 B1 | 8/2012 |
| KR | 10-2012-0123375 A | 11/2012 |
| KR | 1020130015618 A | 2/2013 |
| KR | 10-2013-0028301 A | 3/2013 |
| KR | 10-2013-0028302 A | 3/2013 |
| KR | 10-2014-0113205 A | 9/2014 |
| TW | M424550 U1 | 3/2012 |
| WO | WO-2012008693 A2 | 1/2012 |
| WO | WO-2012150293 A1 | 11/2012 |

OTHER PUBLICATIONS

International Search Report in International Application No. PCT/KR2013/002412, filed Mar. 22, 2013.
Office Action dated Nov. 11, 2013 in Korean Application No. 10-2012-0123375.
Office Action dated Feb. 24, 2014 in Korean Application No. 10-2013-0028301.

(56) References Cited

OTHER PUBLICATIONS

Office Action dated Feb. 24, 2014 in Korean Application No. 10-2013-0028302.
Office Action dated Nov. 12, 2013 in Japanese Application No. 2012-238615.
Office Action dated Oct. 7, 2014 in Japanese Application No. 2012-238615.
Office Action dated Jul. 1, 2014 in European Application No. 12190583.0.
Office Action dated Aug. 24, 2015 in U.S. Appl. No. 13/663,012.
Office Action dated Feb. 13, 2015 in U.S. Appl. No. 13/663,012.
International Search Report in International Application No. PCT/KR2013/002406 dated Jul. 25, 2013.
Office Action dated Jun. 29, 2016 in Chinese Application No. 201510084340.1.
Office Action dated Aug. 10, 2016 in Japanese Application No. 2015-172306.
Office Action dated Aug. 24, 2016 in Taiwanese Application No. 103130766.
Office Action dated Sep. 28, 2016 in Korean Application No. 1020130028300.
European Communication dated Oct. 19, 2017, in European Application No. 13763524.
Dainippon Printing (JP 2008-027015) Translation F5; Feb. 2008.
European Search Report dated Aug. 29, 2017 in European Application No. 17157643.2.
European Search Report dated Aug. 8, 2017 in European Application No. 16206292.1.
European Search Report dated Feb. 4, 2016 in European Application No. 13763524.9.
European Search Report dated Jul. 1, 2014 in European Application No. 12190583.0.
International Search Report dated Jul. 25, 2013 in International Application No. PCT/KR2013/002406.
International Search Report dated Jul. 26, 2013 in International Application No. PCT/KR2013/002412.
Murata (JP 2012-191134)—Translated patent; Oct. 2012.
Office Action dated Dec. 21, 2015 in Chinese Application No. 201380026460.5.
Office Action dated Jun. 2, 2016 in U.S. Appl. No. 14/387,521.
Office Action dated May 2, 2018 in Chinese Application No. 201610391052.5.
Office Action dated Jun. 15, 2018 in U.S. Appl. No. 15/360,425.
Office Action dated Jul. 10, 2018 in U.S. Appl. No. 15/430,173.
Office Action dated Feb. 2, 2019 in Chinese Application No. 201710325326.5.
Office Action dated Feb. 25, 2019 in Japanese Application No. 2018-012053.

* cited by examiner

FIGU 14

FIG. 33

| Freq[kHz] | Inductance Setup1 : Sweep | Resistance Setup1 : Sweep | Q Setup1 : Sweep |
|---|---|---|---|
| 130.000000 | 10023.448082 | 0.809633 | 10.012480 |
| 131.000000 | 10021.543951 | 0.814464 | 10.028048 |
| 132.000000 | 10019.649417 | 0.819320 | 10.043115 |
| 133.000000 | 10017.764376 | 0.824199 | 10.057691 |
| 134.000000 | 10015.888496 | 0.829101 | 10.071784 |
| 135.000000 | 10014.021426 | 0.834027 | 10.085405 |
| 136.000000 | 10012.163025 | 0.838976 | 10.098561 |
| 137.000000 | 10010.312867 | 0.843948 | 10.111262 |
| 138.000000 | 10008.470902 | 0.848942 | 10.123517 |
| 139.000000 | 10006.636764 | 0.853960 | 10.135333 |
| 140.000000 | 10004.810399 | 0.859000 | 10.146721 |
| 141.000000 | 10002.991358 | 0.864062 | 10.157687 |
| 142.000000 | 10001.179585 | 0.869147 | 10.168241 |
| 143.000000 | 9999.374809 | 0.874254 | 10.178391 |
| 144.000000 | 9997.577015 | 0.879383 | 10.188142 |
| 145.000000 | 9995.785687 | 0.884534 | 10.197506 |
| 146.000000 | 9994.000944 | 0.889706 | 10.206488 |
| 147.000000 | 9992.222542 | 0.894900 | 10.215097 |
| 148.000000 | 9990.450319 | 0.900116 | 10.223339 |
| 149.000000 | 9988.684063 | 0.905352 | 10.231223 |
| 150.000000 | 9986.923648 | 0.910610 | 10.238756 |
| 151.000000 | 9985.169040 | 0.915889 | 10.245944 |
| 152.000000 | 9983.419964 | 0.921189 | 10.252794 |
| 153.000000 | 9981.676290 | 0.926509 | 10.259313 |
| 154.000000 | 9979.937950 | 0.931850 | 10.265510 |
| 155.000000 | 9978.204783 | 0.937212 | 10.271388 |
| 156.000000 | 9976.476722 | 0.942594 | 10.276956 |
| 157.000000 | 9974.753596 | 0.947996 | 10.282220 |
| 158.000000 | 9973.035485 | 0.953418 | 10.287185 |
| 159.000000 | 9971.321833 | 0.958860 | 10.291859 |
| 160.000000 | 9969.613051 | 0.964321 | 10.296247 |

FIG. 34

| Freq[kHz] | Inductance Setup1 : Sweep | Resistance Setup1 : Sweep | Q Setup1 : Sweep |
|---|---|---|---|
| 130.000000 | 10375.469101 | 0.760491 | 11.053420 |
| 131.000000 | 10373.611592 | 0.764922 | 11.072242 |
| 132.000000 | 10371.760893 | 0.769376 | 11.090493 |
| 133.000000 | 10369.916781 | 0.773853 | 11.108182 |
| 134.000000 | 10368.078898 | 0.778351 | 11.125322 |
| 135.000000 | 10366.247102 | 0.782872 | 11.141920 |
| 136.000000 | 10364.421100 | 0.787415 | 11.157989 |
| 137.000000 | 10362.600644 | 0.791979 | 11.173537 |
| 138.000000 | 10360.785303 | 0.796565 | 11.188574 |
| 139.000000 | 10358.975165 | 0.801173 | 11.203109 |
| 140.000000 | 10357.169752 | 0.805802 | 11.217153 |
| 141.000000 | 10355.369156 | 0.810452 | 11.230713 |
| 142.000000 | 10353.572957 | 0.815124 | 11.243801 |
| 143.000000 | 10351.780892 | 0.819816 | 11.256422 |
| 144.000000 | 10349.993078 | 0.824529 | 11.268591 |
| 145.000000 | 10348.209063 | 0.829263 | 11.280309 |
| 146.000000 | 10346.428853 | 0.834018 | 11.291589 |
| 147.000000 | 10344.652133 | 0.838792 | 11.302441 |
| 148.000000 | 10342.878918 | 0.843587 | 11.312871 |
| 149.000000 | 10341.108850 | 0.848402 | 11.322886 |
| 150.000000 | 10339.342085 | 0.853237 | 11.332499 |
| 151.000000 | 10337.578231 | 0.858092 | 11.341712 |
| 152.000000 | 10335.817245 | 0.862967 | 11.350536 |
| 153.000000 | 10334.058946 | 0.867867 | 11.358980 |
| 154.000000 | 10332.303299 | 0.872774 | 11.367050 |
| 155.000000 | 10330.550019 | 0.877706 | 11.374754 |
| 156.000000 | 10328.799305 | 0.882658 | 11.382099 |
| 157.000000 | 10327.050748 | 0.887629 | 11.389091 |
| 158.000000 | 10325.304351 | 0.892618 | 11.395741 |
| 159.000000 | 10323.560143 | 0.897626 | 11.402053 |
| 160.000000 | 10321.817935 | 0.902653 | 11.408035 |

FIG. 52
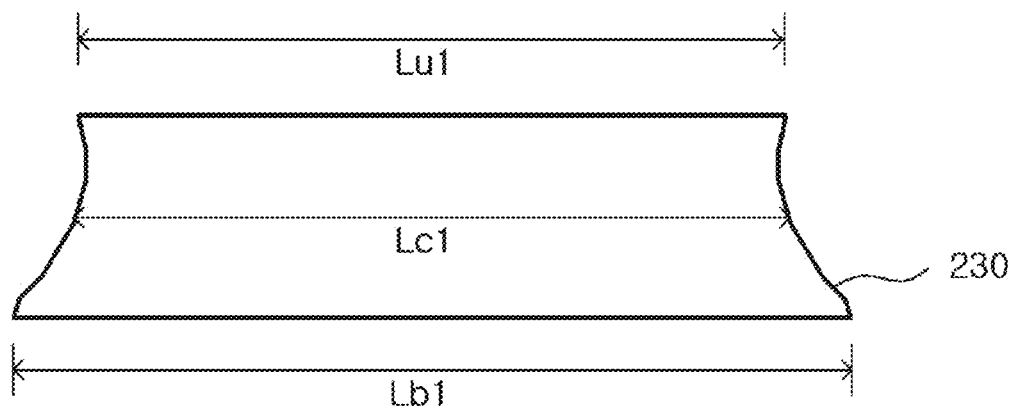
(A)
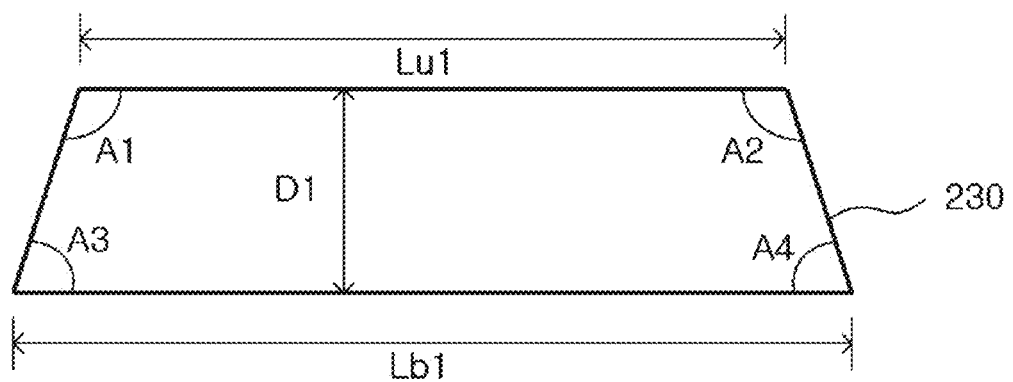
(B)

FIG. 53
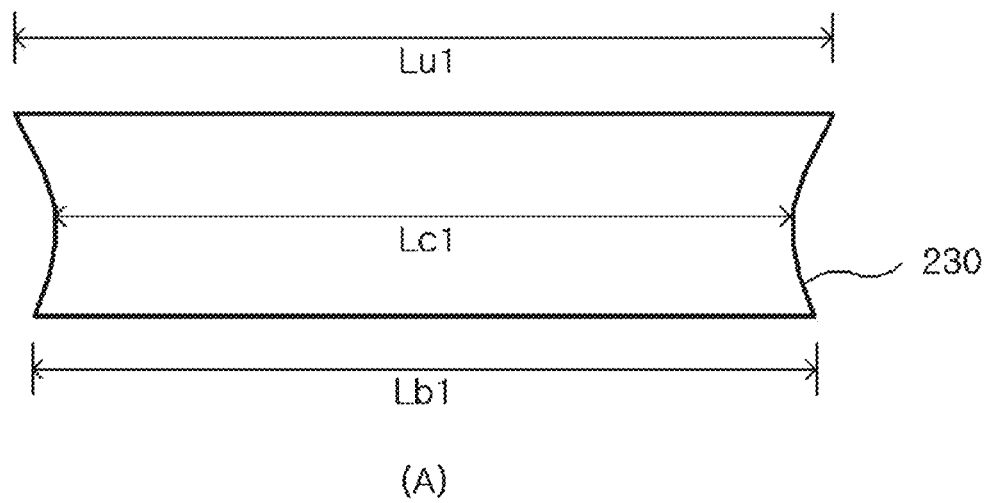
(A)
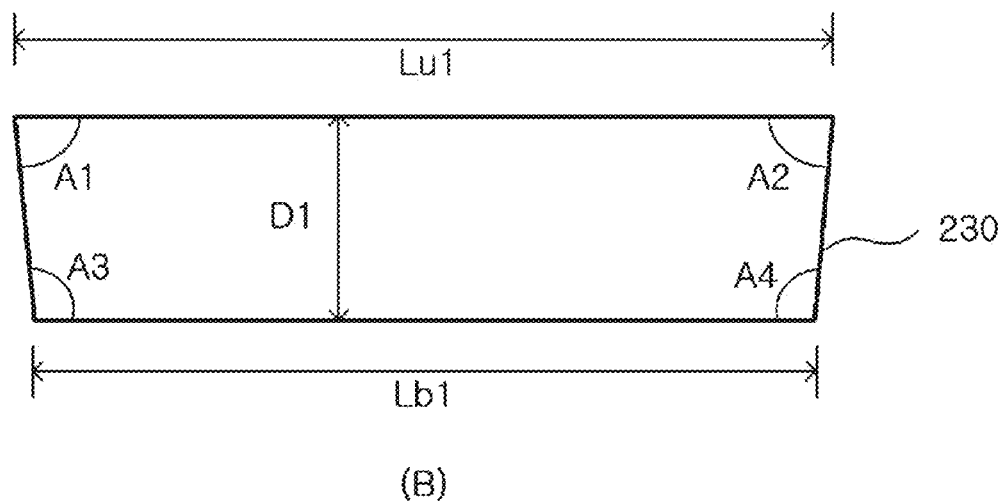
(B)

ANTENNA ASSEMBLY AND METHOD FOR MANUFACTURING SAME

CROSS-REFERENCE TO RELATED APPLICATIONS

This application is the continuation of U.S. application Ser. No. 14/387,521, filed Sep. 23, 2014; which is the U.S. national stage application of International Patent Application No. PCT/KR2013/002412, filed Mar. 22, 2013; which claims priority to Korean Application Nos. 10-2012-0029987, filed Mar. 23, 2012; 10-2012-0079004, filed Jul. 19, 2012; 10-2012-0123375, filed Nov. 2, 2012; and 10-2013-0028300, 10-2013-0028301, 10-2013-0028302, and 10-2013-0028303, filed Mar. 15, 2013, the disclosures of each of which are incorporated herein by reference in their entirety.

TECHNICAL FIELD

The disclosure relates to an antenna assembly and a method of manufacturing the same. More particularly, the disclosure relates to an antenna assembly including an antenna, which is wirelessly rechargeable, and a method of manufacturing the same.

BACKGROUND ART

A wireless power transmission or a wireless energy transfer refers to a technology of wirelessly transferring electric energy to desired devices. In the 1800's, an electric motor or a transformer employing the principle of electromagnetic induction has been used and thereafter attempts have been performed to transmit electrical energy by irradiating electromagnetic waves, such as radio waves or lasers. Actually, electrical toothbrushes or electrical razors, which are frequently used in daily life, are charged based on the principle of electromagnetic induction. The electromagnetic induction refers to a phenomenon in which a voltage is induced so that a current flows when a magnetic field is varied around a conductor. Although the electromagnetic induction technology has been rapidly commercialized while focusing on small-size devices, the power transmission distance thereof is short.

Until now, the long-distance transmission using the electromagnetic induction, the resonance and the short-wavelength radio frequency have been used as the wireless energy transfer scheme.

However, a typical antenna assembly embedded in a terminal has a thin thickness and the manufacturing process of the antennal assembly is complicated.

DISCLOSURE

Technical Problem

The disclosure provides an antenna assembly including an antenna, wirelessly charged, having a thinned thickness, and capable of simplifying the manufacturing process thereof, and a method of manufacturing the same.

Technical Solution

According to the embodiment, there is provided an antenna assembly including a substrate, and a wireless charge antenna pattern on the substrate. The wireless charge antenna pattern has a sectional surface including a plurality of inner angles in which two inner angles are different from each other.

The antenna assembly may further include a wireless communication antenna pattern formed on the substrate and provided at an outside of the wireless charge antenna pattern, The wireless communication antenna pattern has a plurality of inner angles at a sectional surface thereof, and a plurality of angle values of the inner angles provided at the sectional surface of the wireless communication antenna pattern correspond to a plurality of angle values of the inner angles provided at the sectional surface of the wireless charge antenna pattern, respectively.

The wireless charge antenna pattern may have a thickness equal to a thickness of the wireless communication antenna pattern.

Advantageous Effects

According to the embodiment, the magnetic substrate is spaced apart from the coil part by the bonding layer, so that the antenna performance can be improved.

According to the embodiment, the coil part is directly provided on the top surface of the non-magnetic insulating substrate through the laminating and etching processes, so that the fabrication process of the antenna assembly can be simplified.

According to the embodiment, the inner terminal of the spiral antenna pattern is connected to the connector provided at the outside of the spiral antenna pattern through the conductive bridge, so that the fabrication process of the antenna assembly can be simplified.

According to the embodiment, the extension pattern of the antenna pattern is cut out together with the substrate, and the substrate is folded so that the inner terminal of the spiral-shape antenna pattern is electrically connected to the connector provided at the outside of the antenna pattern, thereby simplifying the fabrication process of the antenna assembly.

According to the embodiment, the wireless charge antenna pattern and the wireless communication antenna pattern having thicker thicknesses are simultaneously formed, so that the fabrication process of the antenna assembly can be simplified.

According to the embodiment, the coil part and the short-range communication antenna are directly provided on the top surface of the magnetic surface so that the power transmission efficiency can be maintained and t communication with an external device is possible According to the embodiment, the conductive pattern is formed in the magnetic substrate so that the thickness of the antenna assembly can be reduced.

According to the embodiment, the conductive pattern is formed in the magnetic substrate so that the high power transmission efficiency can be obtained, and communication with the external device is possible by using the short-range communication antenna.

According to the embodiment, as the connection part is provided in the receiving space of the magnetic substrate, the whole thickness of the antenna assembly can be reduced by the thickness of the connection part.

According to the embodiment, the tape member is used as the connection part, so that the whole size of the antenna assembly can be reduced.

According to the embodiment, the lead frame is used as the connection part, so that the wiring layer included in the connection part can be protected from heat emission, external moisture, and shock, and mass production is possible.

According to the embodiment, the direction of the magnetic field is changed from an outward direction to the coil part due to the conductive pattern formed in the magnetic substrate, so that the power transmission efficiency can be improved. In addition, an amount of the magnetic field leaking to the outside is reduced, so that the influence of the magnetic field harmful to a human body can be minimized.

According to one embodiment of the disclosure, the antenna assembly can be fabricated only through the process of forming the pattern groove and the process of inserting the coil part, so that the fabrication process can be simplified.

Meanwhile, other effects may be directly or indirectly disclosed in the following description of the embodiment of the disclosure.

BRIEF DESCRIPTION OF THE DRAWINGS

FIG. 33 is a view to explain an inductance, a resistance, a Q value of the inner antenna according to a use frequency when the coil part is provided on the top surface of the magnetic substrate according to still another embodiment of the disclosure.

FIG. 34 is a view to explain an inductance, a resistance, a Q value of the inner antenna according to a use frequency when a coil part is provided in a pattern groove in a magnetic substrate according to still another embodiment of the disclosure.

FIGS. 50 to 53 are sectional views showing a conductive pattern formed through an etching process according to an embodiment of the disclosure.

DETAILED DESCRIPTION

In the whole description, when a certain part is electrically connected to another part, the parts are not only directly connected with each other, but also electrically connected with each other while interposing another part therebetween.

Figure 1:
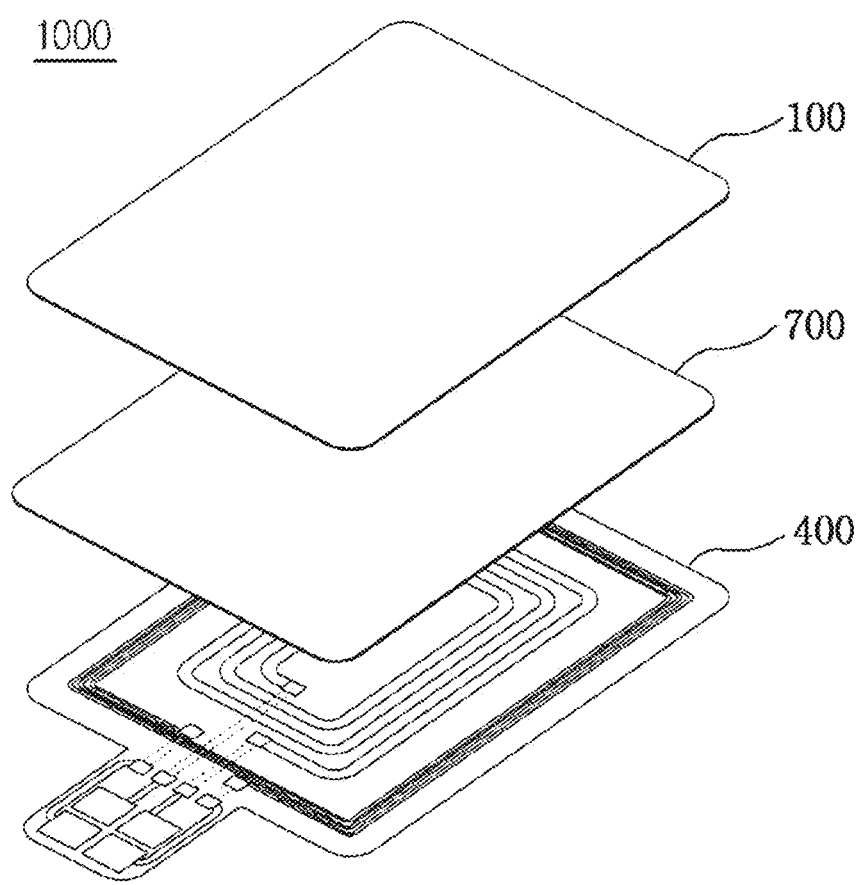
FIG. 1 is an exploded perspective view showing an antenna assembly according to an embodiment of the disclosure.

FIG. 1 is an exploded perspective view showing an antenna assembly according to an embodiment of the disclosure.

Figure 2:
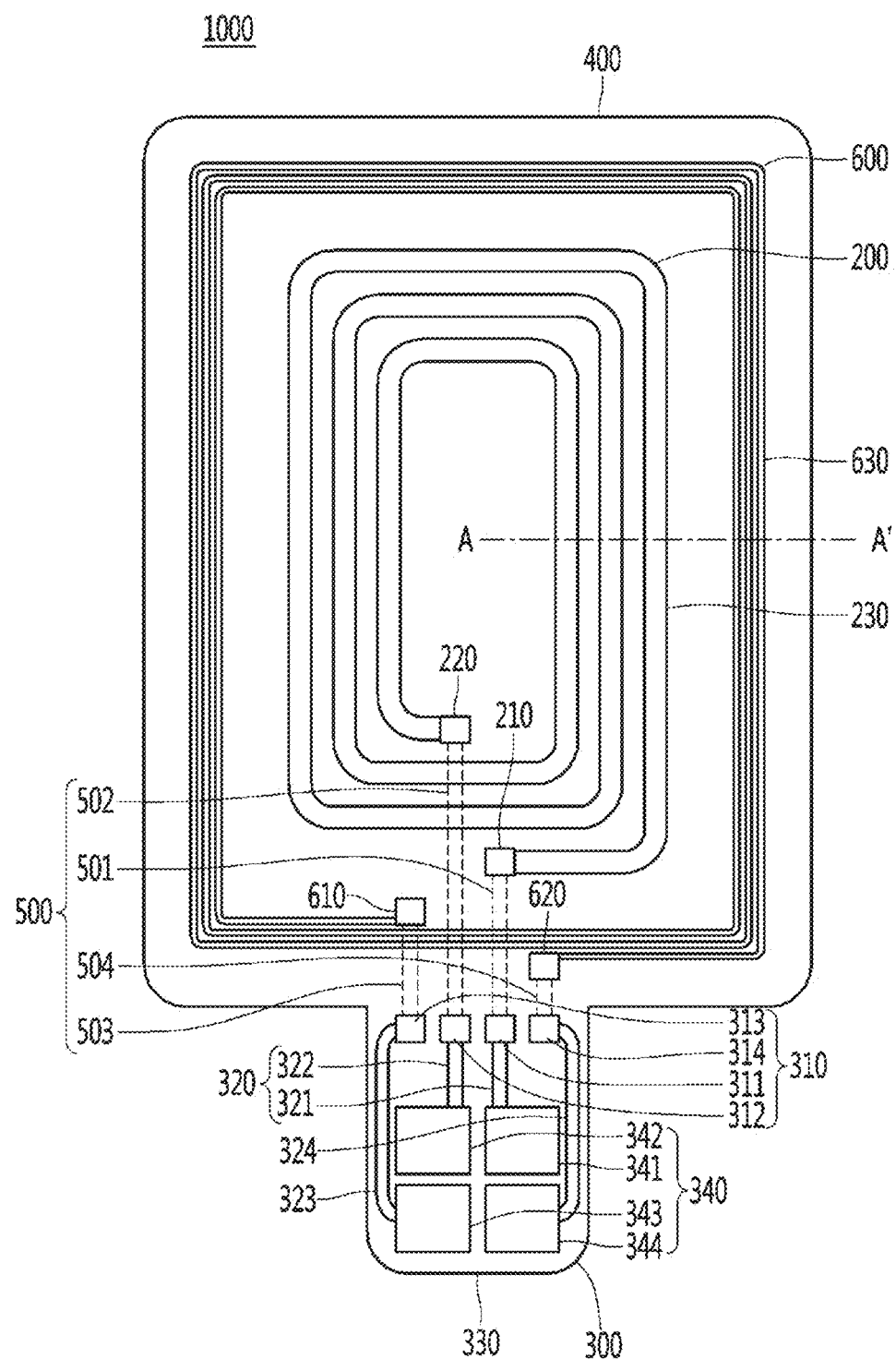
FIG. 2 is a plan view showing the antenna assembly according to the embodiment of the disclosure.

FIG. 2 is a plan view showing the antenna assembly according to the embodiment of the disclosure.

Figure 3:
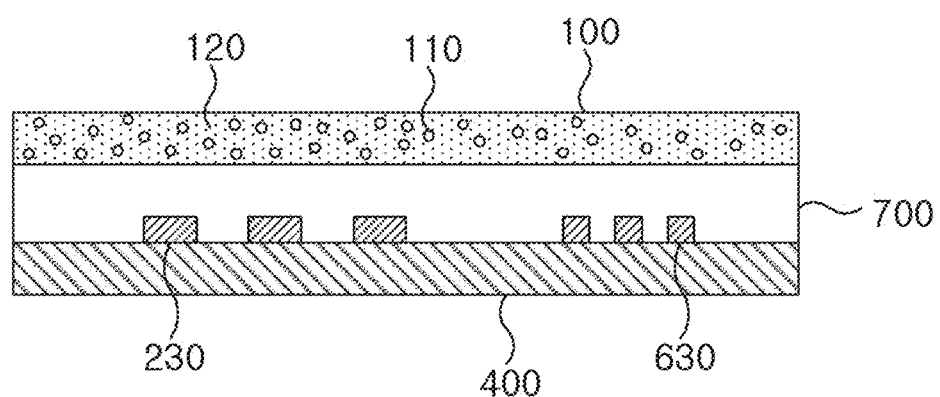
FIG. 3 is a sectional view showing the antenna assembly according to the embodiment of the disclosure.

FIG. 3 is a sectional view showing the antenna assembly according to the embodiment of the disclosure. In particular, FIG. 3 is a sectional view taken along line A-A' of the antenna assembly shown in FIG. 1.

Referring to FIGS. 1 to 3, an antenna assembly 1000 according to the embodiment of the disclosure includes a magnetic substrate 100, an inner antenna 200, a contact part 300, a substrate 400, a connection part 500, an outer antenna 600, and a bonding layer 700.

The antenna assembly 1000 may be electrically connected to a terminal device having a battery to be wirelessly charged and a wireless communication module.

The antenna assembly 1000 may be embedded in an electronic device similar to the terminal device. The terminal device may be a typical mobile phone, such as a cellular phone, a personal communication service (PCS) phone, a GSM phone, a CDMA-2000 phone, or a WCDMA phone, a portable multimedia player (PMP), a personal digital assistant (PDA), a smart phone, or a mobile broadcast system (MBS) phone, but the embodiment is not limited thereto. In particular, the antenna assembly 1000 may be buried in a back cover of the terminal device. When the back cover of the terminal device is coupled to the terminal device, the antenna assembly 1000 may be electrically connected to the terminal device through the contact part 300 of the antenna assembly 1000.

When the antenna assembly 1000 is coupled to the terminal device, the magnetic substrate 100 is interposed between a metallic part of the terminal device and an antenna in the antenna assembly 1000 to prevent a magnetic field induced to the antenna in the antenna assembly 1000 from being lost due to the metallic part of the terminal device, and to make the path of a magnetic flux. In particular, the metallic part of the terminal device may be a metallic case of the battery of the terminal device. The magnetic substrate 100 may change the direction of the magnetic field received from a transmitter. The magnetic substrate 100 may reduce an amount of a magnetic field that leaks to an outside by changing the direction of the magnetic field received from the transmitter. Accordingly, a shielding effect may be made. The magnetic substrate 100 changes the direction of the magnetic field received from the transmitter into a side direction, so that the magnetic field may be more concentrated on the inner and outer antennas 200 and 600. The magnetic substrate 100 absorbs the magnetic field leaking to the outside among magnetic fields received from the transmitter to discharge the magnetic field in the form of heat. If an amount of the magnetic field leaking to the outside is reduced, an influence harmful to a human body may be prevented. The magnetic substrate 100 may include a magnetic member 110 and a support member 120. The magnetic member 110 may have the form of particles, and the material constituting the magnetic member 110 may include ceramic. The material constituting the support member 120 may include thermosetting resin or thermoplastic resin. The magnetic substrate 100 may be provided in the form of a sheet, and may have a flexible property.

The substrate 400 may include a printed circuit board (PCB), or a flexible printed circuit board (FPCB). The substrate 400 may include a non-magnetic insulating substrate. In particular, the substrate 400 may include a polyimide (PI) film. The PI film may generally endure a high temperature of 400° C. above zero or a low temperature of 269° C. below zero, which represents super hot resistance or super cold resistance, respectively. In addition, the PI film is thin and has superior curvedness. The PI film has strong chemical resistance and abrasion resistance to maintain stable performance under inferior environments.

The inner antenna 200 may be provided on the substrate 400. As described below, the inner antenna 200 may have an antenna pattern. In this case, the sectional surface of the antenna pattern may have a polygonal shape formed at a predetermined angle instead of a circular shape of a typical coil shape. In particular, the sectional surface of the antenna pattern may have a quadrangle shape. In detail, the sectional surface of the antenna pattern may have a trapezoid shape. In more detail, the sectional surface of the antenna pattern may have a quadrangular shape. The antenna pattern may be formed on the substrate 400 through a laminating process and an etching process. The inner antenna 200 may have a plane spiral shape. The inner antenna 200 may be a wireless charge antenna for a wireless charging operation. The inner antenna 200 may include an outer terminal 210 placed at an outside of the plane spiral shape, an inner terminal 220 placed at an inside of the plane spiral shape, and an inside coil 230 of the plane spiral shape. In this case, the coil may be provided in a form of a coil pattern.

The outer antenna 600 may be provided on the substrate 400. As described below, the outer antenna 600 may have an antenna pattern. In this case, the sectional surface of the antenna pattern may have a polygonal shape formed at a predetermined angle instead of a circular shape of a typical coil. In particular, the sectional surface of the antenna pattern may have a square shape. In detail, the sectional surface of the antenna pattern may have a trapezoid shape. In more detail, the sectional surface of the antenna pattern may have a quadrangular shape. The antenna pattern may be formed on the substrate 400 through a laminating process and an etching process. The outer antenna 600 may have a plane spiral shape. The outer antenna 600 may a wireless charge antenna for a wireless charging operation. In particular, the outer antenna 600 may include a near field communication (NFC) antenna. The outer antenna 600 may include an inner terminal 610 placed at an inside of the plane spiral shape, an outer terminal 620 placed at an outside of the plan spiral shape, and an outer coil 630 of the plane spiral shape. The coil may have a coil pattern.

The inner antenna 200 and the outer antenna 600 may be formed at the same layer. A line width of the coil pattern of the inner antenna 200 may be greater than that of the coil paten of the outer terminal 600. The spacing of the coil pattern of the inner antenna 200 may be greater than that of the coil pattern of the outer antenna 600.

The magnetic substrate 100 may have a thickness in the range of 0.3 mm to 0.6 mm, and the inner and outer antennas 200 and 600 may have thicknesses in the range of 0.8 mm to 1.4 mm. In particular, the magnetic substrate 100 may have the thickness of 0.43 mm, the thicknesses of the inner and outer antennas 200 and 600 may be 0.1 mm, and the sum of the thicknesses of the magnetic substrate 100, the inner antenna 200, and the outer antenna 600 may be 0.53 mm, but the numeric values may be provided for the illustrative purpose.

The bonding layer 700 may be bonded to both of one surface of the magnetic substrate 100 and one surface of the substrate 400. In this case, the one surface of the substrate 400 making contact with the bonding layer 700 may be one of two surfaces of the substrate 400, in which the inner antenna 200 and the outer antenna 600 are formed.

The contact part 300 electrically makes contact with the terminal device, and includes a plurality of connectors, a plurality of connection conductive lines 320, a substrate 330, and a plurality of contact terminals 340. The connectors 310 include first to fourth connectors 311 to 314. The connection conductive lines 320 include first to fourth connection lines 321 to 324. The contact terminals 340 include first to fourth contact terminals 341 to 344.

The connectors 310 may be provided at the outside of the inner antenna 200. In addition, the connectors 310 may be provided at the outside of the outer antenna 600.

The connation conductive lines 320 may be provided at the outside of the inner antenna 200. In addition, the connection conductive lines 320 may be provided at the outside of the outer antenna 600.

The contact terminals 340 may be provided at the outside of the inner antenna 200. In addition, the contact terminals 340 may be provided at the outside of the outer antenna 600.

The connectors 310 may correspond to the outer and inner terminals 210 and 220 of the inner antenna 200 and the inner and outer terminals 610 and 620 of the outer antenna 600, respectively. The connection conductive lines 320 correspond to the connectors 310, respectively. The contact terminals 340 correspond to the connection conductive lines 320, respectively. The contact terminals 340 are electrically connected to the corresponding connectors 310 through the corresponding connection lines 320, respectively.

In detail, the first contact terminal 341 is electrically connected to the corresponding first connector 311 through the first connection conductive line 321. The second contact terminal 342 is electrically connected to the corresponding second connector 312 through the second connection conductive line 322. The third contact terminal 343 is electrically connected to the corresponding third connector 313 through the third connection conductive line 323. The fourth contact terminal 344 is electrically connected to the corresponding fourth connector 314 through the fourth connection conductive line 324.

The connectors 310, the connection conductive lines 320, and the contact terminals 340 may be provided in the form of conductive patterns. The conductive patterns may be formed on the substrate 330 through a lamination process and an etching process. In particular, the connectors 310, the connection lines 320, and the contact terminals 340 may be formed on the same layer.

The substrate 330 may include a printed circuit board or a flexible circuit board. In addition, the substrate 330 may include a non-magnetic insulating substrate. In particular, the substrate 330 may be formed of a polyimide film.

As described below, according to one embodiment, the substrate 330 may be an additional substrate separated from the substrate 400.

According to another embodiment, the substrate 330 may be integrally formed with the substrate 400. In this case, the connectors 310, the connection lines 320, the contact terminals 340, the inner antenna 200, and the outer antenna 600 may be formed on the same layer.

On the assumption that the inner antenna 200 is a wireless charge antenna, and the outer antenna 600 is a wireless communication antenna, if a back cover of the terminal device is coupled to the terminal device, the inner antenna 200 may be electrically connected to the battery of the terminal device through the contact terminals 340 electrically connected to the inner antenna 200, and the outer antenna 600 may be electrically connected to a wireless communication terminal of the terminal device through the contact terminals 340 electrically connected to the outer antenna 600. In detail, the inner antenna 200 may be electrically connected to the battery of the terminal device through the first and second contact terminals 341 and 342 electrically connected to the inner antenna 200, and the outer antenna 600 may be electrically connected to the wireless communication module of the terminal device through the contact terminals 343 and 344 electrically connected to the outer antenna 600.

The connection part 500 electrically connects the inner antenna 200 to the contact part 300. In addition, the connection part 500 electrically connects the outer antenna 600 to the contact part 300. In detail, the connection part 500 includes a first sub-connection part 501, a second sub-connection part 502, a third sub-connection part 503, and a fourth sub-connection part 504. The first sub-connection part 501 electrically connects the outer terminal 210 of the inner antenna 200 to the first connector 311. The second sub-connection part 502 electrically connects the inner terminal 220 of the inner antenna 200 to the second connector 312. The third sub-connection part 503 electrically connects the inner terminal 610 of the outer antenna 600 to the third connector 313. The fourth sub-connection part 504 electrically connects the outer terminal 620 of the outer antenna 600 to the fourth connector 314. Various embodiments of the connection part 500 will be described below.

Figure 4:
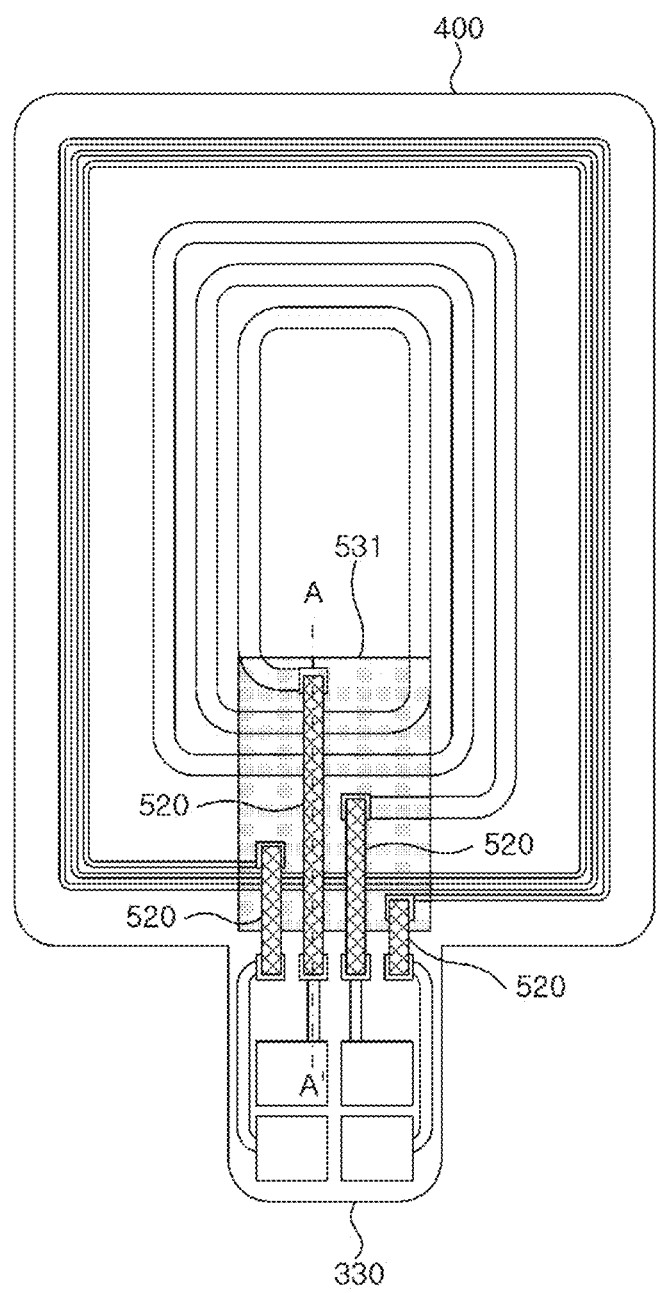
FIG. 4 is a plan view showing the antenna assembly according to the embodiment of the disclosure.

FIG. 4 is a plan view showing the antenna assembly according to the embodiment of the disclosure.

Figure 5:
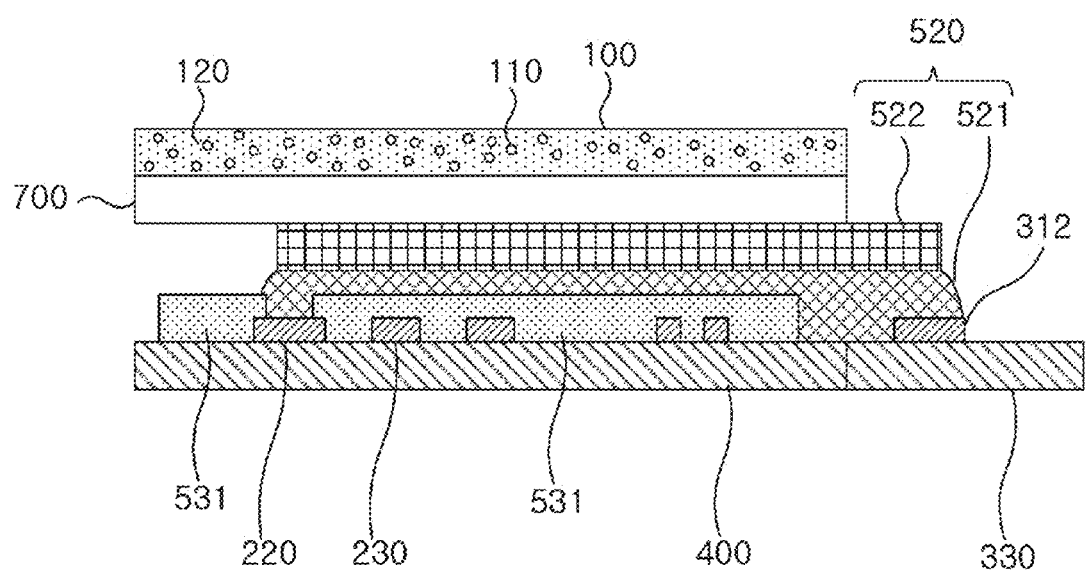
FIG. 5 is a sectional view showing the antenna assembly according to the embodiment of the disclosure.

FIG. 5 is a sectional view showing the antenna assembly according to the embodiment of the disclosure. In particular, FIG. 5 is a sectional view taken along line A-A' of the antenna assembly shown in FIG. 4.

In particular, the embodiments shown in FIGS. 4 and 5 are provided by realizing the connection part 500 in the antenna assembly shown in FIGS. 1 to 3.

Referring to FIGS. 4 and 5, the substrate 330 is integrally formed with the substrate 400.

According to one embodiment, the first sub-connection part 501, the second sub-connection part 502, the third sub-connection part 503, and the fourth sub-connection part 504 include conductive bridges 520.

According to another embodiment, the first sub-connection part 501, the second sub-connection part 502, and the third sub-connection part 503 serve as the conductive bridges 520, and the fourth sub-connection part 504 may be provided in the form of a conductive line pattern formed on the substrate 330. This is because another conductive line pattern, which blocks the formation of a conductive line pattern, may not be interposed between the outer terminal 620 of the outer antenna 600 and the fourth connector 314. Hereinafter, it is assumed that the fourth sub-connection part 504 is a conductive line pattern formed on the substrate 330.

The connection part 500 further includes an insulating layer 531. The insulating layer 531 covers portions of the antenna pattern and the substrate 400 within the range in which the conductive bridge 520 is not electrically connected to the antenna pattern. According to one embodiment, the insulating layer 531 may include insulating ink that is coated and dried. In other words, the insulating layer 531 may be formed by coating and drying insulating ink. According to another embodiment, the insulating layer 531 may include an insulating sheet. In other words, the insulating layer 531 may be formed through a laminating process with the insulating sheet. The conductive bridge 520 is formed on the insulating layer 531.

The conductive bridge 520 may include a first sub-bridge 521 formed of conductive paste and a second sub-bridge 522 formed through a plating process. The first-sub bridge 521 may include volatile conductive paste. In this case, the conductive paste may include silver paste. A lower bridge may be formed through a copper plating scheme.

The first sub-bridge 521 may be formed on the insulating layer 531, and the second sub-bridge 522 may be formed on the first sub-bridge 521.

Figure 6:
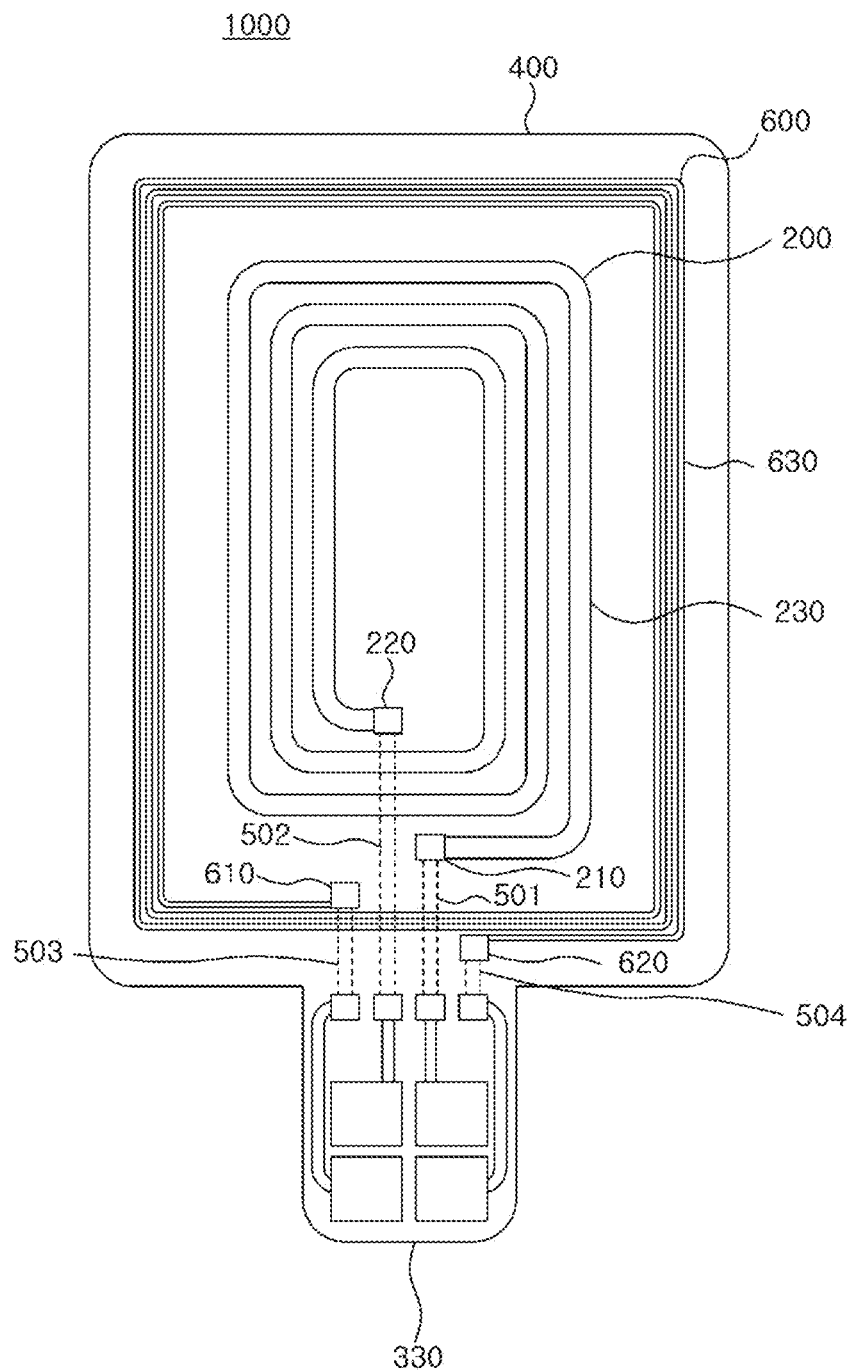
FIG. 6 is a plan view showing an antenna assembly according to another embodiment of the disclosure.
Figure 7:
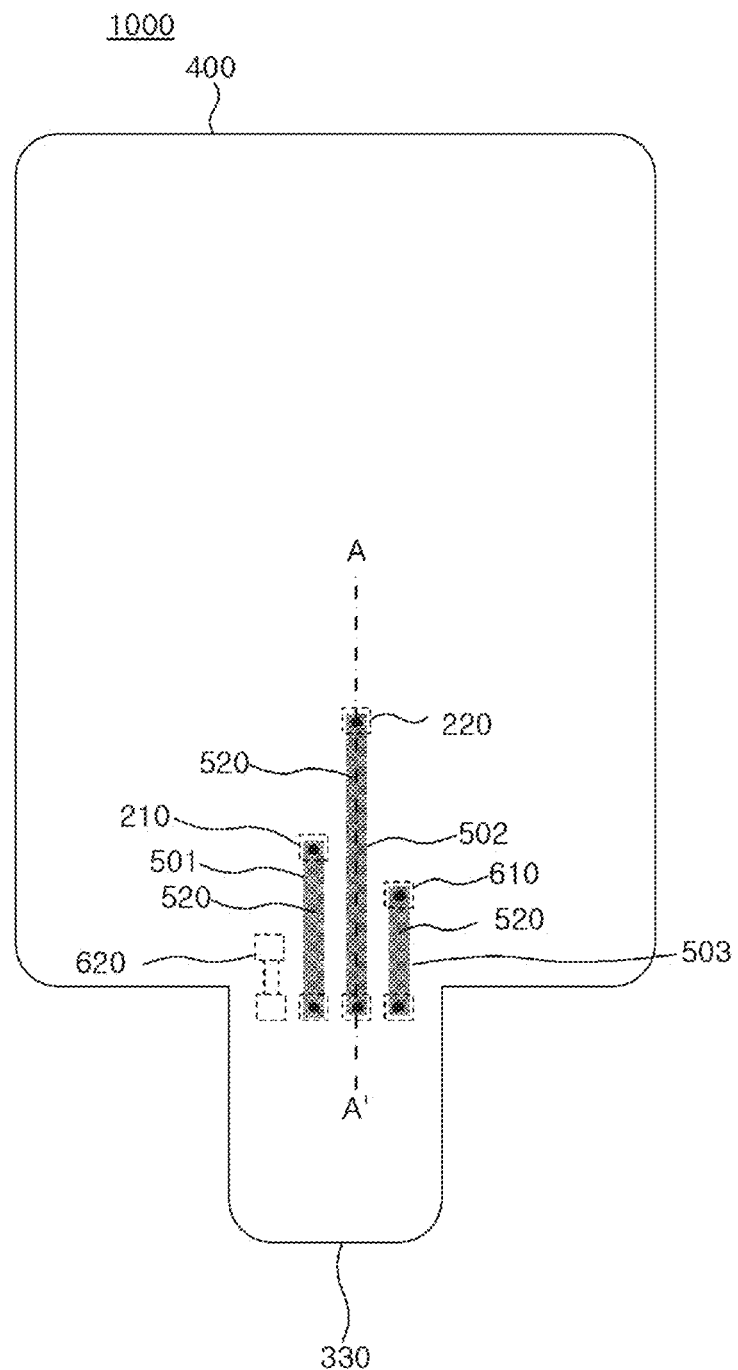
FIG. 7 is a bottom view showing the antenna assembly according to another embodiment of the disclosure.
Figure 8:
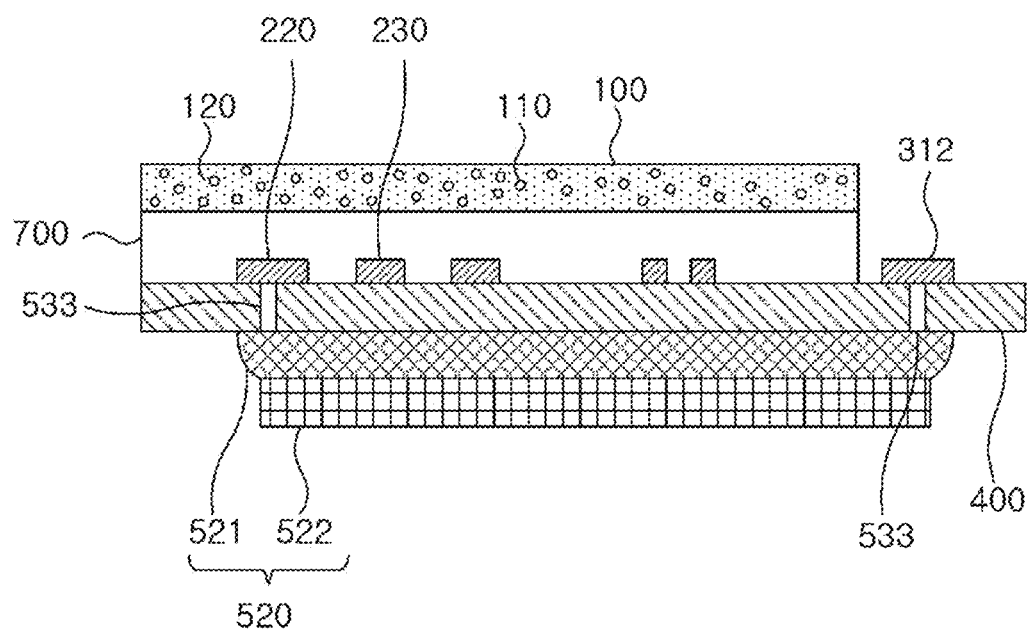
FIG. 8 is a sectional view showing the antenna assembly according to another embodiment of the disclosure.

FIG. 6 is a plan view showing an antenna assembly according to another embodiment of the disclosure. FIG. 7 is a bottom view showing the antenna assembly according to another embodiment of the disclosure. FIG. 8 is a sectional view showing the antenna assembly according to an embodiment of the disclosure. In particular, FIG. 8 is a sectional view taken along line A-A' showing the antenna assembly shown in FIG. 7.

A dotted line in FIG. 6 represents a conductive pattern provided on an opposite surface to a surface shown in FIG. 6, and a dotted line of FIG. 7 represents a conductive pattern on a portion of an opposite surface to a surface shown in FIG. 7.

In particular, an embodiment shown in FIGS. 6 to 8 is obtained by realizing the connection part 500 shown in FIGS. 1 to 3.

Referring to FIGS. 6 to 8, the substrate 330 is integrally formed with the substrate 400.

According to an embodiment, the first sub-connection part 501, the second sub-connection part 502, the third sub-connection part 503, and the fourth sub-connection part 504 include the conductive bridges 520.

According to another embodiment, the first sub-connection part 501, the second sub-connection part 502, and the third sub-connection part 503 may include the conductive bridges 520, and the fourth sub-connection part 504 may include a conductive line pattern formed on the substrate 330. This is because another conductive line pattern, which blocks the formation of a conductive line pattern, may not be interposed between the outer terminal 620 of the outer antenna 600 and the fourth connector 314. Hereinafter, it is assumed that the fourth sub-connection part 504 is a conductive line pattern formed on the substrate 330.

The conductive bridge 520 is formed at a lower portion of the substrate 400. In this case, since the substrate 400 has an insulating property, an additional insulating layer may not be formed.

Instead, in the substrate 400, the outer terminal 210 of the inner antenna 200 is electrically connected to one terminal of the conductive bridge 520 of the first sub-connection part 501 through a conductive via provided in a via hole 533 formed under the outer terminal 210 of the inner antenna 200.

In addition, in the substrate 400, the first connector 311 is electrically connected to an opposite terminal of the conductive bridge 520 of the first sub-connection part 501 through a conductive via provided in the via hole 533 formed under the first connector 311.

In the substrate 400, the inner terminal 220 of the inner antenna 200 is electrically connected with the one terminal of the conductive bridge 520 of the second sub-connection part 502 through a conductive via provided in the via hole 533 formed under the inner terminal 220 of the inner antenna 200.

In the substrate 400, the second connector 312 is electrically connected with the opposite terminal of the conductive bridge 520 of the second sub-connection part 502 through a conductive via provided in the conductive via hole 533 formed under the second connector 312.

In the substrate 400, the outer terminal 610 of the outer antenna 600 is electrically connected with one terminal of the conductive bridge 520 of the third sub-connection part 503 through a conductive via provided in the conductive via hole 533 formed under the inner terminal 610 of the outer antenna 600.

In the substrate 400, the third connector 313 is electrically connected with an opposite terminal of the conductive bridge 520 of the fourth sub-connection part 504 through a conductive via provided in the conductive via hole 533 formed under the third connector 313.

In the substrate 400, the outer terminal 620 of the outer antenna 600 is electrically connected with the one terminal of the conductive bridge 520 of the fourth sub-connection part 504 through a conductive via provided in the conductive via hole 533 formed under the outer terminal 620 of the outer antenna 600.

In the substrate 400, the fourth connector 314 is electrically connected with the opposite terminal of the conductive bridge 520 of the first sub-connection part 501 through a conductive via provided in the conductive via hole 533 formed under the fourth connector 314.

The conductive bridge 520 may include the first bridge 521 formed of the silver paste and the second bridge 522 formed through the plating process. In particular, a lower bridge may be formed through a copper plating scheme.

The first sub-bridge 521 is formed under the substrate 400, and the second sub-bridge 522 may be formed under the first sub-bridge 521.

Figure 9:
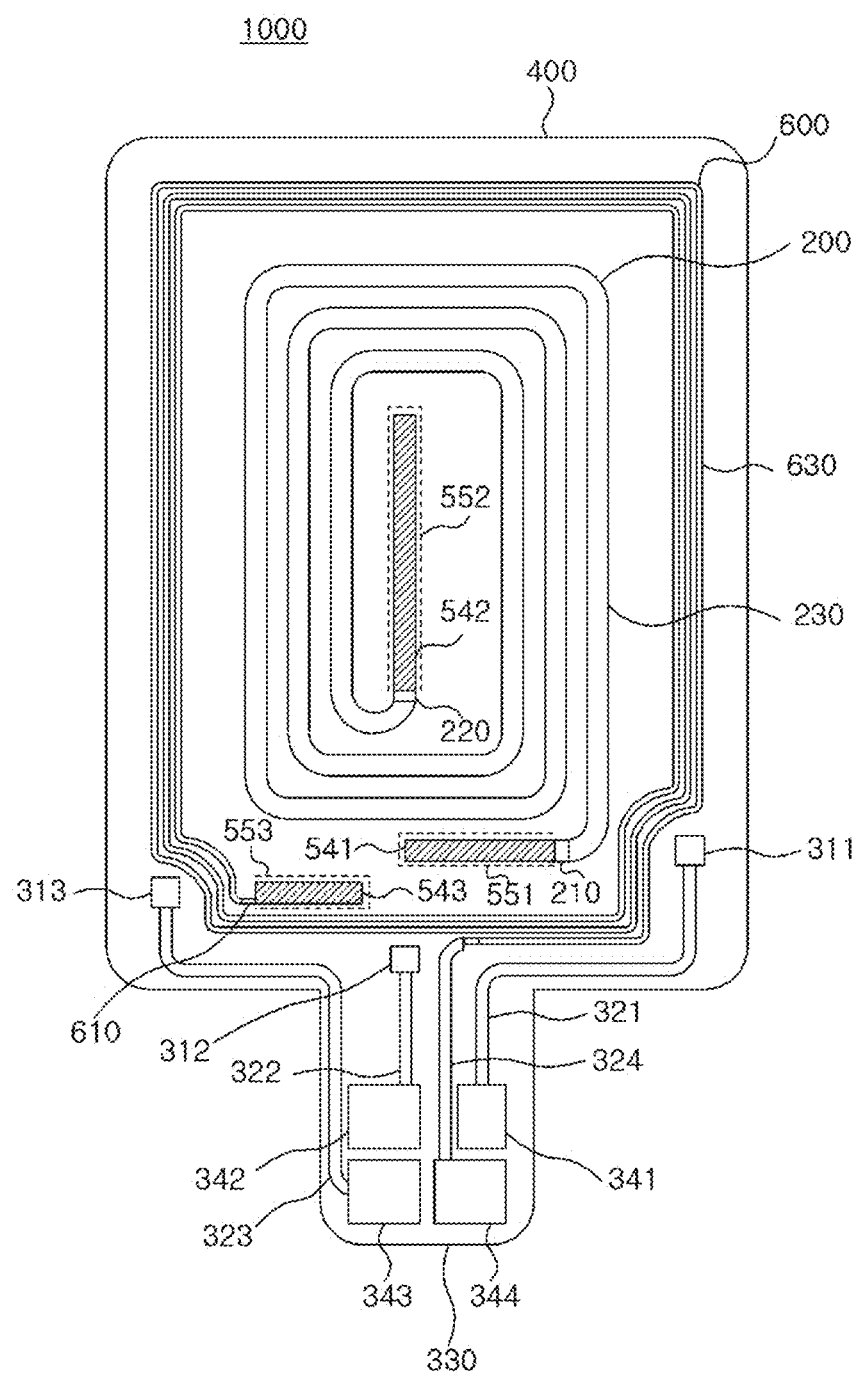
FIG. 9 is a plan view showing an antenna assembly according to still another embodiment of the disclosure.
Figure 10:
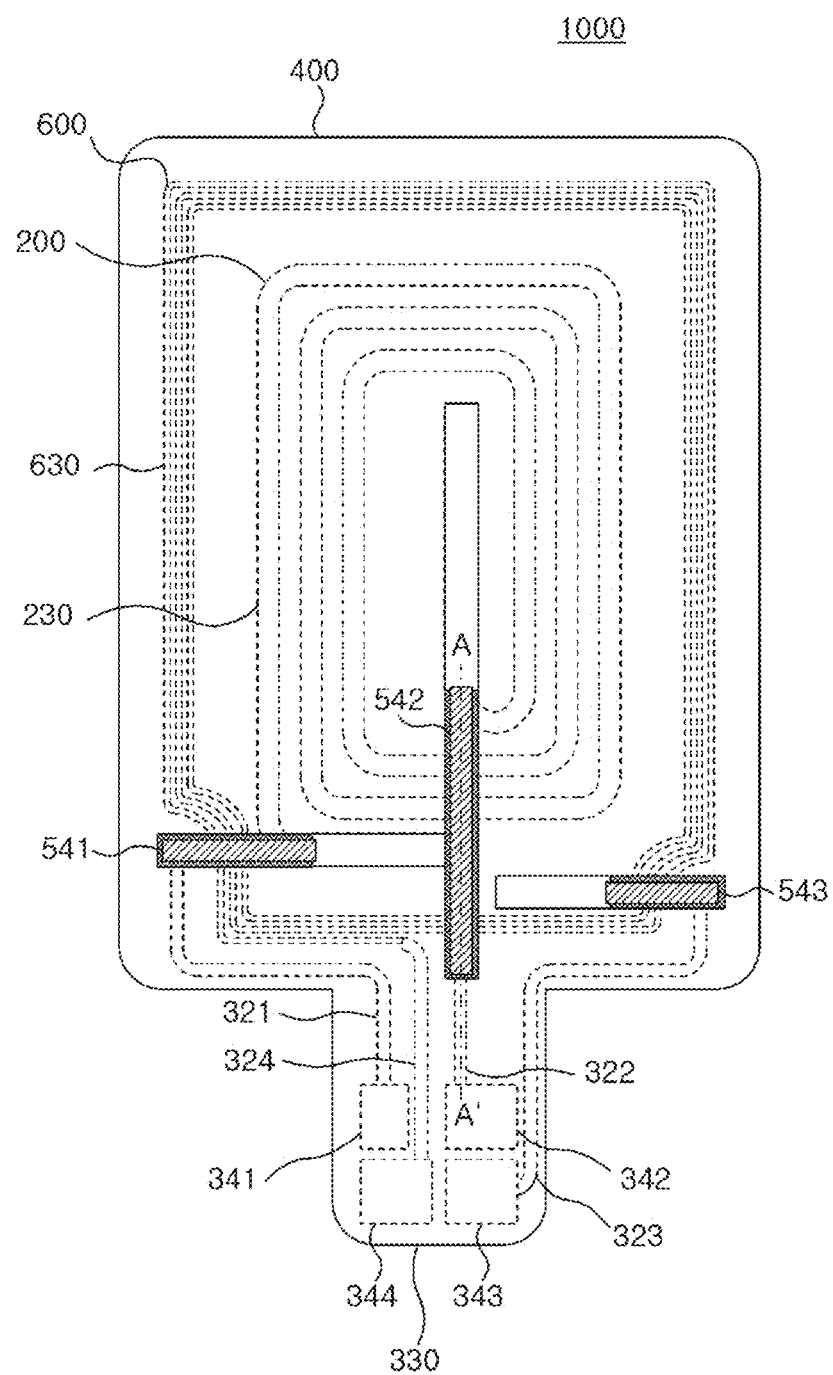
FIG. 10 is a bottom view showing the antenna assembly according to still another embodiment of the disclosure.
Figure 11:
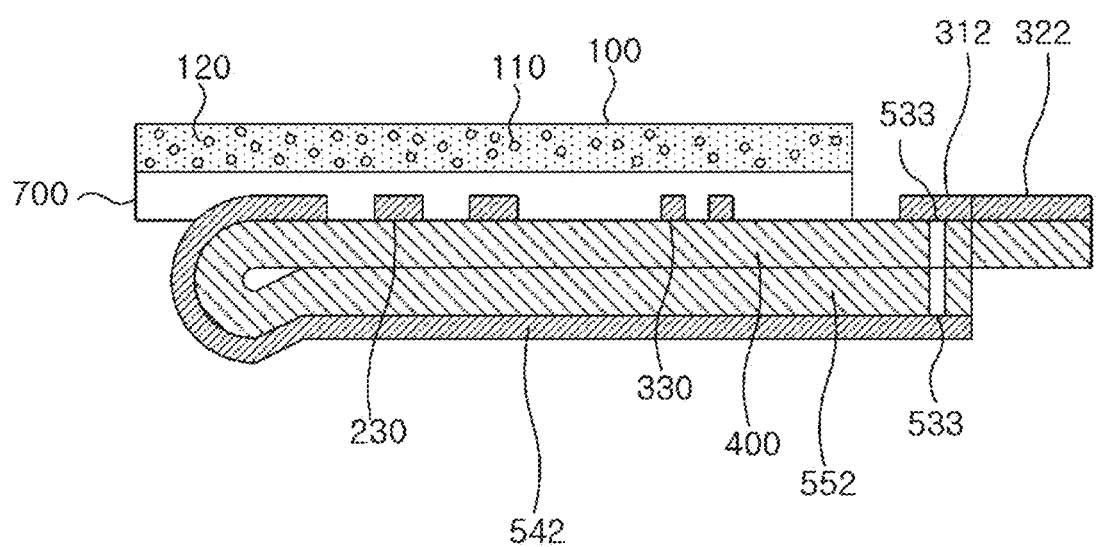
FIG. 11 is a sectional view showing the antenna assembly according to still another embodiment of the disclosure.

FIG. 9 is a plan view showing an antenna assembly according to still another embodiment of the disclosure. FIG. 10 is a bottom view showing the antenna assembly according to still another embodiment of the disclosure. FIG. 11 is a sectional view showing the antenna assembly according to still another embodiment of the disclosure. In particular, FIG. 11 is a sectional view taken along line A-A' showing the antenna assembly shown in FIG. 10.

A dotted line in FIG. 9 shows a conductive pattern on an opposite surface to that shown in FIG. 9, and a dotted line in FIG. 10 shows a conductive pattern on a portion of an opposite surface to that shown in FIG. 10.

In particular, the embodiments shown in FIGS. 9 and 11 are provided by realizing the connection part 500 in the antenna assembly shown in FIGS. 1 to 3.

Referring to FIGS. 9 to 11, the substrate 330 may be integrally formed with the substrate 400.

The substrate 400 includes a first cutting line 411, a first folding line 421, a first cutout part 431, a second cutting line 412, a second folding line 422, a second cutout part 432, a third cutting line 413, a third folding line 423, and a third cutout part 433.

The first sub-connection part 501 includes a first extension pattern 541 and a first sub-substrate 551. The first extension pattern 541 extends from the outer terminal 210 of the inner antenna 200.

The first sub-substrate 551 and the substrate 400 are integrally formed with each other on the folding line 421.

The first cutting line 411 forms an open figure, and the coupling between the first cutting line 411 and the first folding line 421 forms a closed figure.

The size and the shape of a closed figure formed through the coupling between the first cutting line 411 and the first folding line 421 correspond to the size and the shape of the first cutout part 431 which correspond to the size and the shape of the first sub-substrate 551, respectively.

The first folding line 421 is used to fold the first sub-substrate 551 that is cut out along the first cutting line 411.

The first sub-substrate 551 has the size and the shape sufficient to receive the first extension pattern 541.

The second sub-connection part 502 includes a second extension pattern 542 and a second sub-substrate 552. The second sub-pattern 542 extends from the inner terminal 220 of the inner antenna 200.

The second sub-substrate 552 and the substrate 400 are integrally formed with each other on the second folding line 422.

The second cutting line 412 forms an open figure, and the coupling between the second cutting line 412 and the second folding line 422 forms a closed figure.

The size and the shape of the closed figure formed through the coupling between the second cutting line 412 and the folding line 422 correspond to the size and the shape of the second cutout part 432 which correspond to the size and the shape of the second sub-substrate 552.

The second folding line 422 is used to fold the second sub-substrate 522 that is cut out the second cutting line 412.

The second sub-substrate 552 has the size and the shape sufficient to receive the second extension pattern 542.

The second cutout part 432 is formed by cutting the substrate 400 along the second cutting line 412 and folding the second sub-substrate 552 along the second folding line 422.

The third sub-connection part 503 includes a third extension pattern 543 and a third sub-substrate 553. The third extension pattern 543 extends from the inner terminal 610 of the outer antenna 600.

The third sub-substrate 553 and the substrate 400 are integrally formed with each other on the third folding line 423.

The third cutting line 413 forms an open figure, and the coupling between the third cutting line 413 and the third folding line 423 forms a closed figure.

The size and the shape of the closed figure formed through the coupling between the third cutting line 413 and the folding line 423 correspond to the size and the shape of the third cutout part 433 which correspond to the size and the shape of the third cutout part 533.

The third folding line 423 is used to fold the third sub-substrate 553 that is cut out along the third cutting line 413.

The third sub-substrate 553 has the size and the shape sufficient to receive the third extension pattern 543.

The third cutout part 433 is formed by cutting the substrate 400 along the third cutting line 413 and folding the third sub-substrate 553 along the third folding line 423.

According to one embodiment, the fourth sub-connection part 504 may be a conductive line pattern formed at an upper portion of the substrate 330. In this case, the conductive line pattern corresponding to the fourth sub-connection part 504 is electrically connected to a fourth contact terminal 344 without a cutting line and a folding line formed around the conductive line pattern corresponding to the fourth sub-connection part 504.

According to still another embodiment, the substrate 400 may include a fourth cutting line (not shown), a fourth folding line (not shown), and a fourth cutout part (not shown).

The fourth sub-connection part 504 may include a fourth extension pattern (not shown), a fourth sub-substrate (not shown). The fourth extension pattern extends from the inner terminal 610 of the outer antenna 600.

The fourth sub-substrate and the substrate 400 are integrally formed with each other on the fourth folding line.

The first fourth cutting line forms an open figure, and the coupling between the first cutting line and the fourth folding line forms a closed figure.

The fourth folding line is used to fold the fourth sub-substrate that is cut out along the fourth cutting line.

The size and the shape of the closed figure formed through the coupling between the fourth cutting line and the fourth folding line correspond to the size and the shape of the fourth cutout part which correspond to the size and the shape of the fourth sub-substrate.

The fourth sub-substrate has the size and the shape sufficient to receive the fourth extension pattern (not shown).

The fourth cutout part is formed by cutting the substrate along the fourth cutting line and folding the fourth sub-substrate along the fourth folding line.

Referring to FIGS. 9 to 11, if the first sub-substrate 551 is folded along the first folding line 421, the first sub-substrate 551 is formed at the lower portion of the substrate 400. In addition, the first extension pattern 541 is formed at the lower portion of the first sub-substrate 551. The first connector 311 may be electrically connected to the terminal of the first extension pattern 541 through the via hole 533 formed at the lower portion of the first connector 311 in the substrate 400 and the via hole 533 formed at the upper portion of the terminal of the first extension pattern 541 in the first sub-substrate 551. In particular, the first connector 311 and the terminal of the first extension pattern 541 may be electrically connected to each other by thermocompression for a conductive via provided in the via hole 533 and a conductive material provided at a peripheral portion of the conductive via. In this case, the conductive material may include conductive paste or solder.

If the second sub-substrate 552 is folded along the second folding line 422, the second sub-substrate 552 is formed under the substrate 400. In addition, the second extension pattern 542 is provided under the second sub-substrate 552. The second connector 312 may be electrically connected to the terminal of the second extension pattern 542 through the via hole 533 formed at the lower portion of the second connector 312 in the substrate 400 and the via hole 533 formed at the upper portion of the terminal of the second extension pattern 542 in the second sub-substrate 552. In particular, the second connector 312 and the terminal of the second extension pattern 542 may be electrically connected to each other by thermocompression for a conductive via provided in the via hole 533 and a conductive material provided at a peripheral portion of the conductive via. In this case, the conductive material may include conductive paste or solder.

If the third sub-substrate 553 is folded along the third folding line 423, the third sub-substrate 553 is formed under the substrate 400. In addition, the third sub-substrate 553 is provided under the third sub-substrate 553. The third connector 313 may be electrically connected to the terminal of the third extension pattern 543 through the via hole 533 formed at the lower portion of the third connector 313 in the substrate 400 and the via hole 533 formed at the upper portion of the terminal of the third extension pattern 543 in the third sub-substrate 553. In particular, the third connector 313 and the terminal of the third extension pattern 543 may be electrically connected to each other by thermocompression for a conductive via provided in the via hole 533 and a conductive material provided at a peripheral portion of the conductive via. In this case, the conductive material may include conductive paste or solder.

Figure 12:
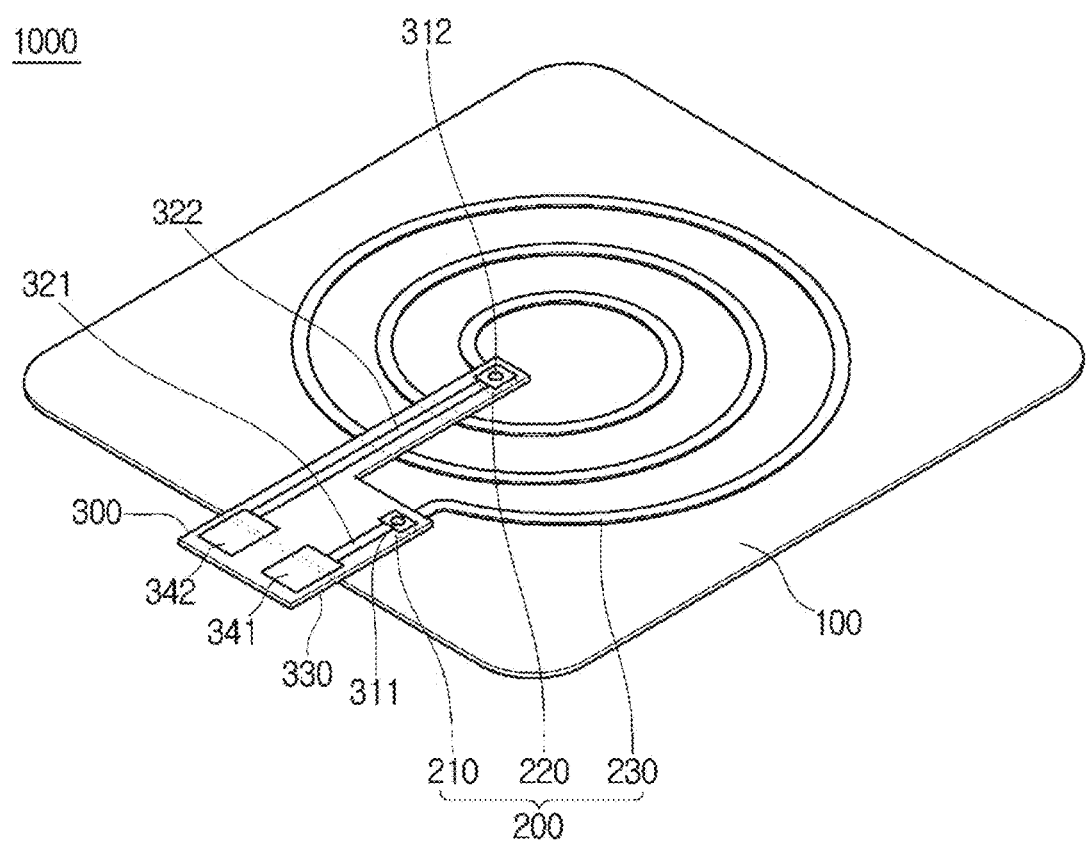
FIG. 12 is a perspective view showing the antenna assembly according to still another embodiment of the disclosure.
Figure 13:
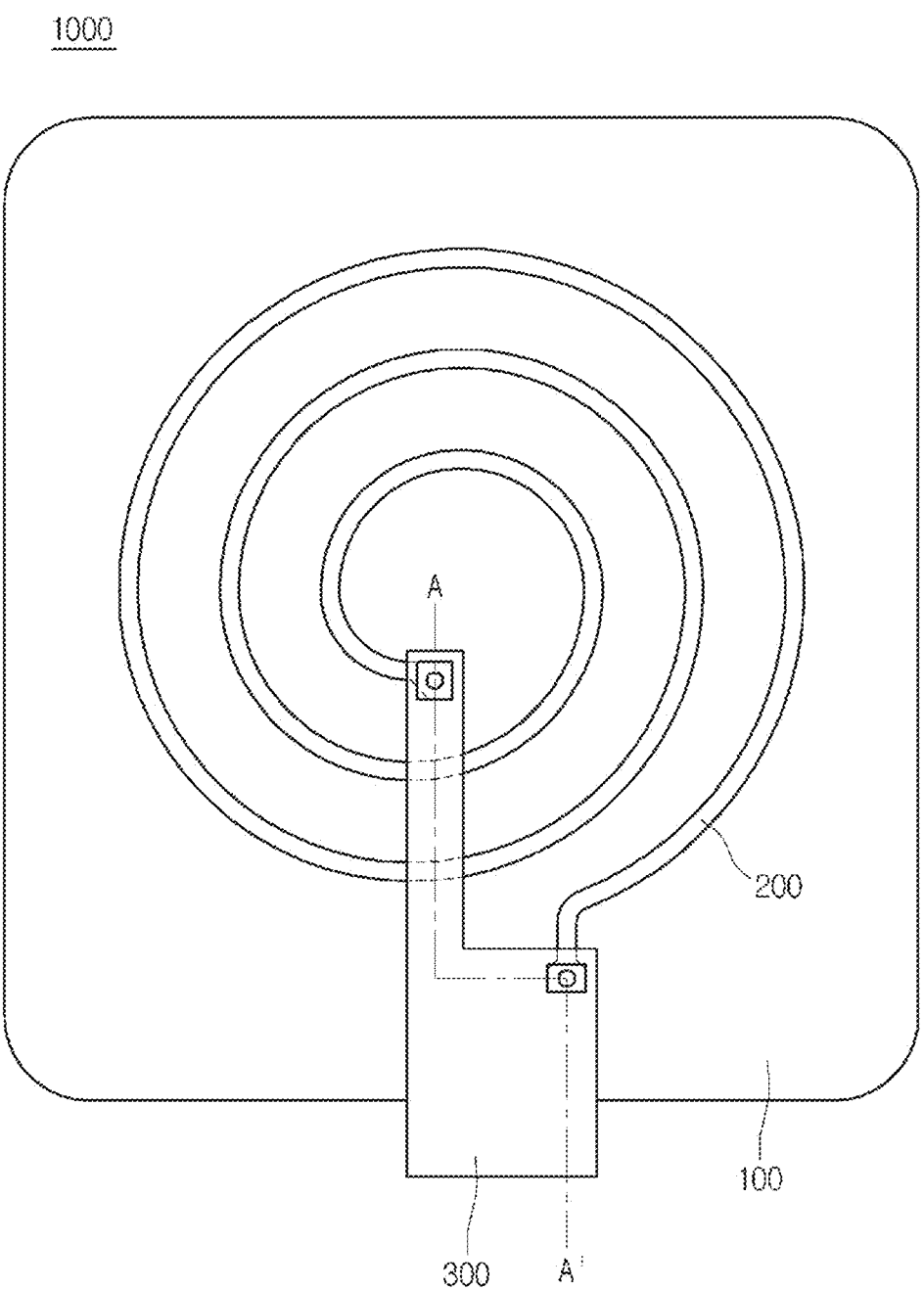
FIG. 13 is a plan view showing the antenna assembly according to still another embodiment of the disclosure.
Figure 14:
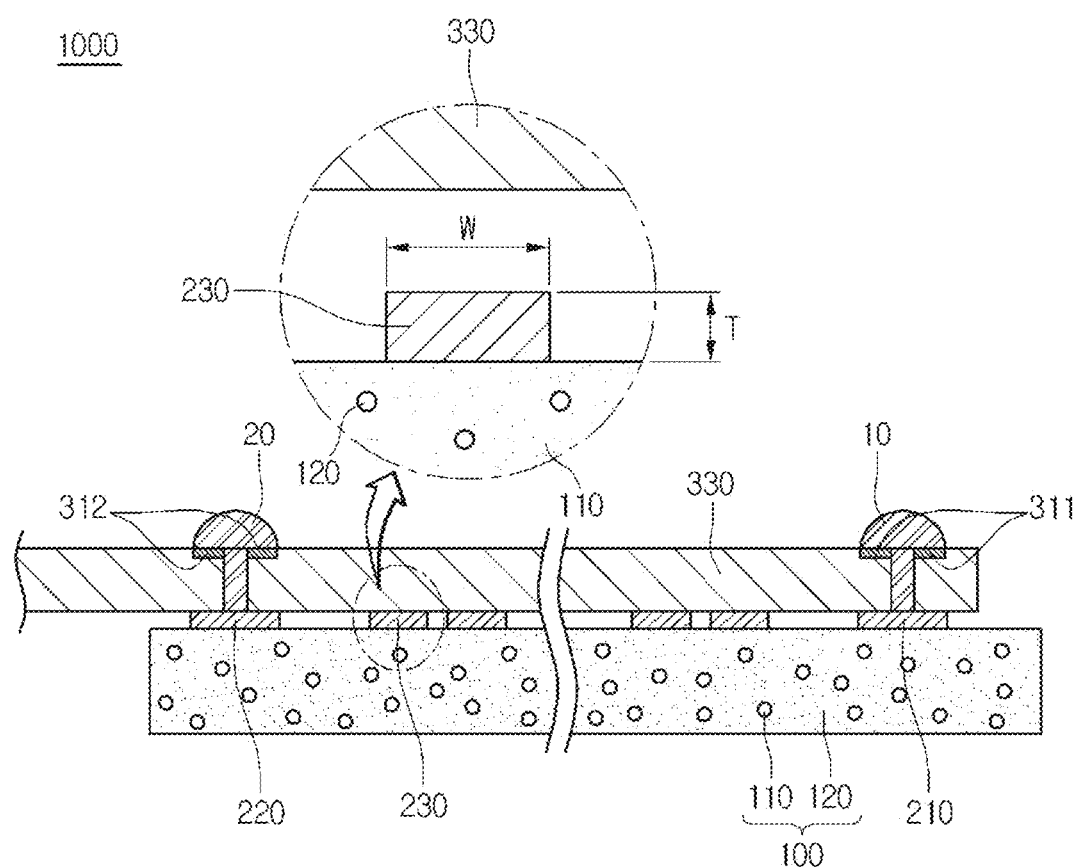
FIG. 14 is a sectional view taken along dotted line A-A' shown in a contact part of the antenna assembly of FIG. 13.

FIG. 12 is a plan view showing an antenna assembly 1000 according to still another embodiment of the disclosure. FIG. 13 is a bottom view showing the antenna assembly 1000 according to still another embodiment of the disclosure. FIG. 14 is a sectional view taken along dotted line A-A' shown in the contact part 300 of FIG. 13.

Referring to FIGS. 12 to 14, the antenna assembly 1000 may include the magnetic substrate 100, the inner antenna 200, and the contact part 300. The contact part 300 may include the first contact terminal 341, the second contact terminal 342, the first connection conductive line 321, the second connection conductive line 322, and the substrate 330. FIGS. 13 and 14 does not show the first contact terminal 341, the second contact terminal 342, the first connection conductive line 321, the second connection conductive line 322, and the substrate 330.

The antenna assembly 1000 may wirelessly receive power from a transmitter. According to one embodiment, the antenna assembly 1000 may wirelessly receive power through electromagnetic induction. According to one embodiment, the antenna assembly 1000 may wirelessly receive power through resonance.

Referring to FIG. 12 again, the inner antenna 200 may include the outer terminal 210, the inner terminal 220, and the inner coil 230. The inner coil 230 may include a conductive layer or a conductive pattern.

The outer terminal 210 is provided at one end of the inner coil 230 and the inner terminal 220 is provided at an opposite end of the inner coil 230.

The outer terminal 210 and the inner terminal 220 are necessary for the electrical connection with the contact part 300.

The inner coil 230 may have a coil pattern formed by winding one conductive line several times. According to one embodiment, the coil pattern may have a plane spiral structure, but the embodiment is not limited thereto. In other words, the coil pattern may have various patterns.

The inner antenna 200 may be directly provided on a top surface of the magnetic substrate 100. According to one embodiment, a bonding layer (not shown) may be further interposed between the inner antenna 200 and the magnetic substrate 100.

The inner antenna 200 may include a conductor. The conductor may include metal or the alloy thereof. According to one embodiment, metal may include silver (Ag) or copper (Cu), but the embodiment is not limed thereto.

The inner antenna 200 may transmit power, which is wirelessly received from the transmitter, to the contact part 300. The inner antenna 200 may receive power through electromagnetic induction or resonance from the transmitter.

The first connector 311 of the contact part 300 may be electrically connected to the outer terminal 210 of the inner antenna 200, and the second connector 312 of the contact part 300 may be electrically connected to the inner terminal 220 of the inner antenna 200.

The substrate 330 may include a wiring layer, and the wiring layer may include a receiving circuit to be described.

The contact part 300 connects the receiving circuit (not shown) to the inner antenna 200 to transmit power received from the inner antenna 200 to a load (not shown) through a receiving circuit (not shown). The receiving circuit may include a rectifying circuit to convert AC power to DC power and a smoothing circuit that removes a ripple component from the converted DC power and transmit the ripple component to the load.

FIGS. 13 and 14 are views to explain the detailed structure of the antenna assembly 1000 according to still another embodiment of the disclosure when the inner antenna 200 is connected to the contact part 300.

FIG. 13 is a plan view showing an antenna assembly 1000 according to still another embodiment of the disclosure.

FIG. 13 is a view showing the state that the inner antenna 200 is connected to the contact part 300.

According to one embodiment, the inner antenna 200 may be electrically connected to the contact part 300 by a solder. In detail, the first sub-connection part 501 may correspond to a solder 10, and the second sub-connection part 502 may correspond to a solder 20. In other words, the outer terminal 210 of the inner antenna 200 may be electrically connected to the first connector 311 of the contract part 300 by the first solder 10. The inner terminal 220 of the inner antenna 200 may be electrically connected to the second connector 312 of the contact part 300 by the solder 20. In detail, the outer terminal 210 of the inner antenna 200 may be electrically connected to the first connector 311 of the contact part 300 through the via hole of the first solder 10, and the inner terminal 220 of the inner antenna 200 may be electrically connected to the second connector 312 of the contact part 300 through the vial hole of the second solder 20.

FIG. 14 illustrates the sectional view taken along the dotted line A-A' shown in the contact part 300 of FIG. 13.

FIG. 14 is a sectional view of the antenna assembly 1000 taken the dotted line A-A' shown in the contact part 300 of FIG. 13.

Referring to FIG. 14, the magnetic substrate 100 is provided on a top surface thereof with the outer terminal 210, the inner terminal 22, and the inner coil 230 which are components of the inner antenna 200.

In the antenna assembly 1000 according to still another embodiment of the disclosure, since the inner antenna 200 is directly provided on the top surface of the magnetic substrate 100, the whole thickness of the antenna assembly 1000 can be significantly reduced differently from the case in which a coil pattern is formed on a conventional FPCB.

As described above, the magnetic substrate 100 has the thickness in the range of 0.3 mm to 0.6 mm, and the inner antenna 200 has a thickness in the range of 0.8 mm to 1.4 mm. In particular, the magnetic substrate 100 has a thickness of 0.43 mm, and the inner antenna 200 has a thickness of 0.1 mm. The sums of the thicknesses of the magnetic substrate 10 and the inner antenna 200 may be 0.53 mm, but the numeric values are provided for the illustrative purpose.

In other words, the inner antenna 200 is configured in the form of a conductor, a conductive pattern, a thin film, and the like, so that the thickness of the antenna assembly 1000 can be reduced. If the antenna assembly 1000 is applied to a slim electronic device, the whole thickness of a portable terminal is reduced so that power can advantageously receive power from the transmitter.

The contact part 300 is directly provided on the inner antenna 200. As the contact part 300 is directly provided on the inner antenna 200, the inner antenna 200 can be easily connected to the contact part 300.

The outer terminal 210 of the inner antenna 200 is connected to the first connector 311 of the contact part 300 by the solder 10.

The inner terminal 220 of the inner antenna 200 is connected with the second connector 312 of the contact part 300 by the solder 20.

The inner coil 230 is designed to have predetermined values in a width W and a thickness T thereof. In addition, the inner coils 230 may be designed to have a predetermined spacing value.

FIGS. 15 to 19 are sectional views to explain a method of preparing the antenna assembly 1000 according to one embodiment of the disclosure.

The structure of the antenna assembly 1000 may be essentially incorporated in the description made with reference to FIGS. 12 to 14.

Figure 15:
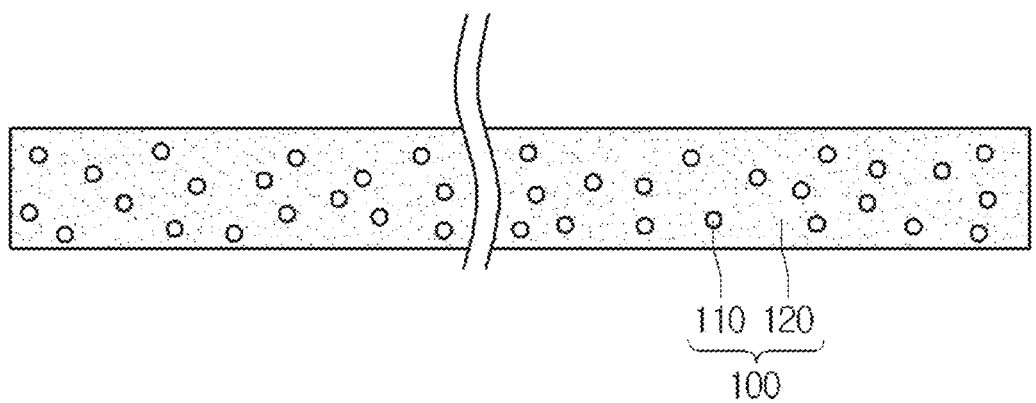
FIGS. 15 to 19 are sectional views to explain a method of fabricating the antenna assembly according to one embodiment of the disclosure.

First, referring to FIG. 15, the magnetic substrate 100 is formed.

Figure 16:
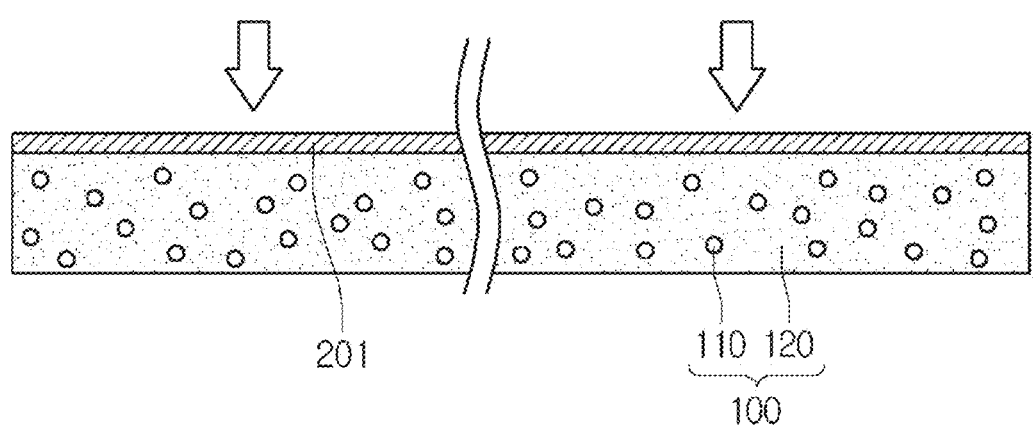

Next, referring to FIG. 16, a conductor 201 is directly laminated on the top surface of the magnetic substrate 100. According to the embodiment, after the bonding layer is laminated on the top surface of the magnetic substrate 100, the conductor 201 may be laminated.

According to one embodiment, in order to laminate the conductor 201 on the top surface of the magnetic substrate 100, after heating the conductor 201 at a predetermined temperature, a laminating process to apply predetermined pressure may be employed. The laminating process may refer to bond different types of metallic thin films or different types of papers to each other by using heat and pressure.

Figure 17:
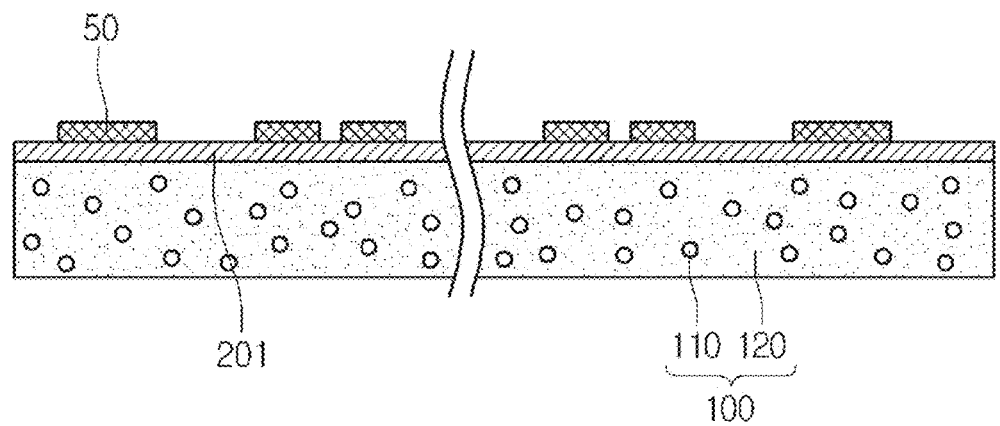

Next, referring to FIG. 17, a mask 50 is laminated on the top surface of the conductor 201. The mask 50 may be laminated only on the top surface of a place to form the outer terminal 210, the inner terminal 220, and the inner coil 230 of the inner antenna 230.

Figure 18:
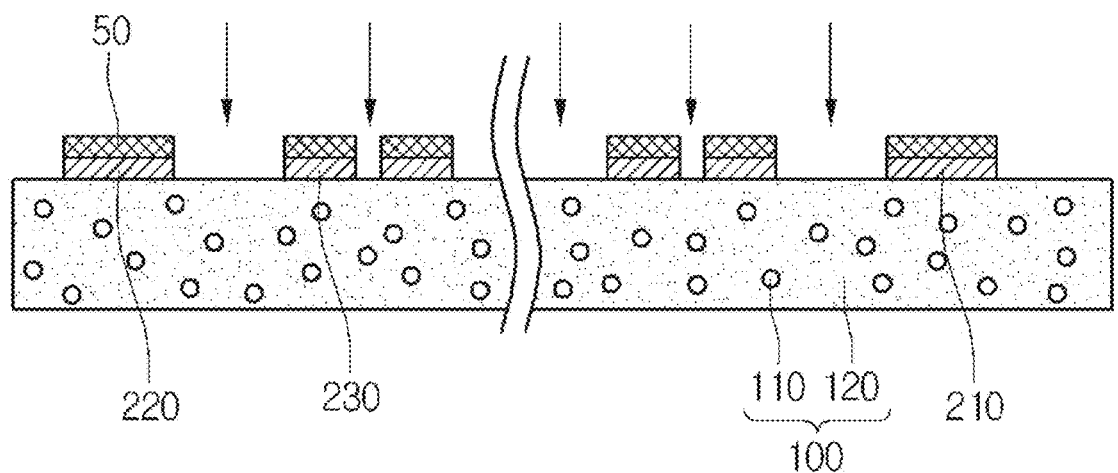

Therefore, referring to FIG. 18, if the resultant structure is dipped into an etchant in the state shown in FIG. 17, a groove part in which the mask 50 is not located is etched. Then, the conductor 201 has a predetermined conductive pattern.

Thereafter, if the mask 50 is removed, the inner antenna 200 of the antenna assembly 1000 is formed.

Figure 19:
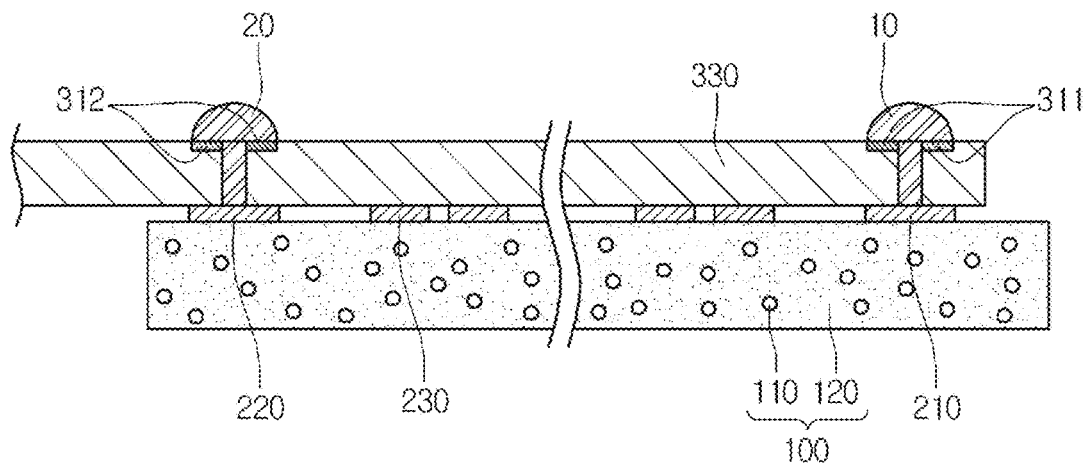

Thereafter, referring to FIG. 19, a soldering work is performed so that the inner antenna 200 is connected to the contact part 300.

In other words, the outer terminal 210 of the inner antenna 200 is connected to the third connection terminal 310 of the contact part 300 by the solder 10. A second connection terminal of the inner antenna 200 is connected to a fourth connection terminal 320 of the contact part 300 by the solder 20.

As described above, the inner antenna 200 is provided on the top surface of the magnetic substrate 100, so that the whole thickness of the antenna assembly 1000 can be reduced. In addition, the antenna assembly 1000 can be fabricated only through the laminating process and the etching process, so that the manufacturing process can be simplified.

Figure 20:
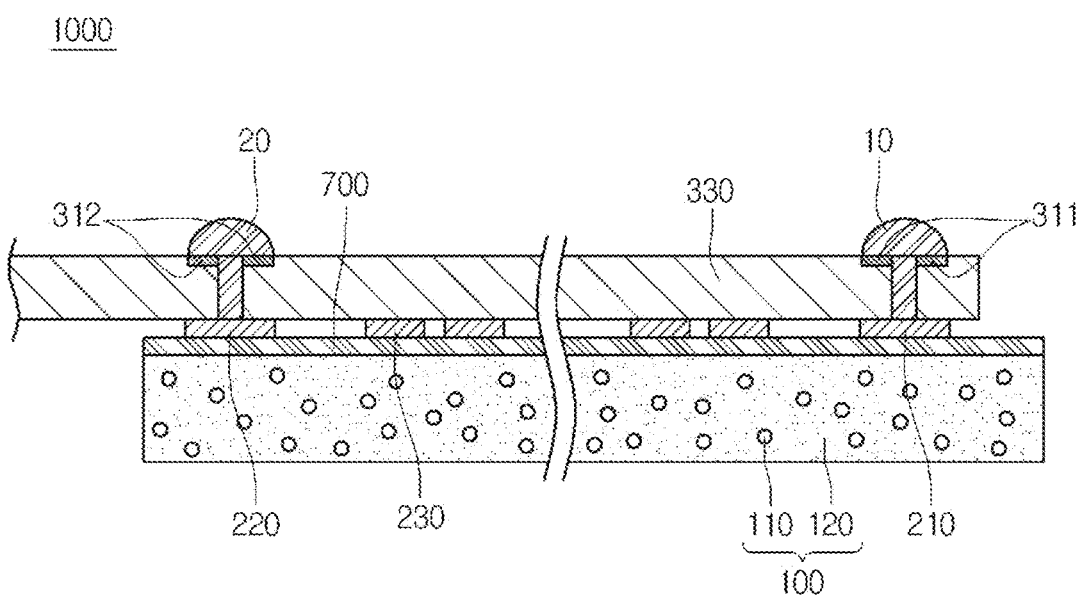
FIG. 20 is a sectional view taken along dotted line A-A' shown in the contact part of the antenna assembly according to still another embodiment shown in FIG. 13.

FIG. 20 is a sectional view showing the antenna assembly 1000 according to still another embodiment of the disclosure in the case when the sectional surface of the antenna assembly 1000 is taken along dotted line A-A' of the contact part 300 of FIG. 13.

Referring to FIG. 20, the antenna assembly 1000 may include the magnetic substrate 100, the inner antenna 200, the contact part 300, and the bonding layer 700.

The magnetic substrate 100, the inner antenna 200, and the contact part 300 have the same description as that described with reference to FIG. 12.

The bonding layer 700 is interposed between the magnetic substrate 100 and the inner antenna 200 to bond the magnetic substrate 100 to the inner antenna 200.

Figure 21:
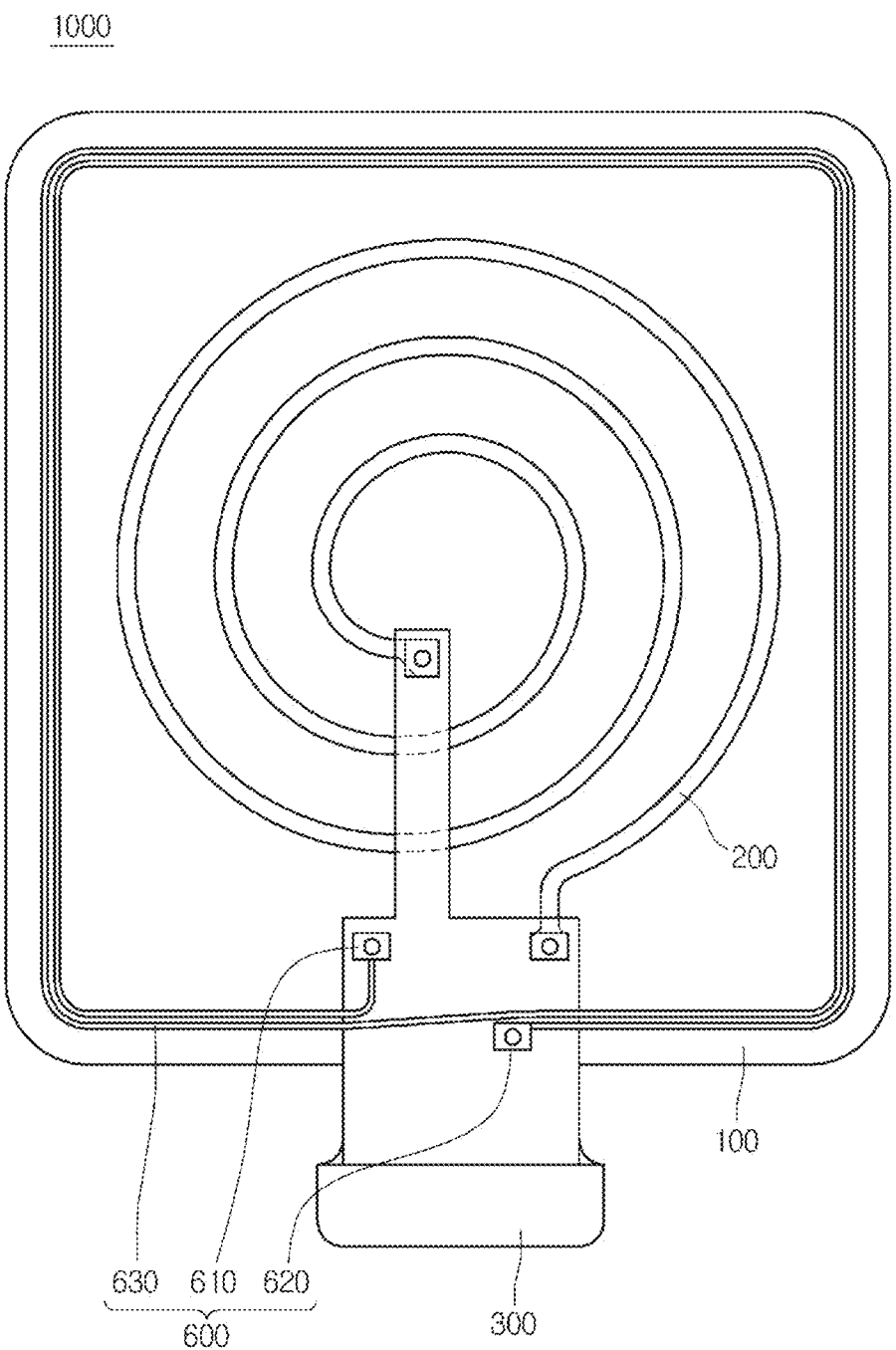
FIG. 21 is a plan view showing an antenna assembly according to still another embodiment of the disclosure.

FIG. 21 is a plan view showing the antenna assembly 1000 according to still another embodiment of the disclosure.

Referring to FIG. 21, the antenna assembly 1000 may include the magnetic substrate 100, the inner antenna 200, the contact part 300, and the outer antenna 600. The contact part 300 may include the first connector 311, the second connector 312, the third connector 313, the fourth connector 314, the first connection conductive line 321, the second conductive line 322, the third conductive line 323, a fourth conductive line 324, the first contact terminal 341, the second contact terminal 342, the third contact terminal 343, and the fourth contact terminal 344, but the above components are not limited.

The magnetic substrate 100, the inner antenna 200, and the contact part 300 have the same description as that described with reference to FIGS. 12 to 14.

The outer antenna 600 includes an inner terminal 610, an outer terminal 620, and an outer coil 630.

The inner terminal 610 and the outer terminal 620 of the outer antenna 600 are connected to the contact part 300.

The outer antenna 600 may make communicate with a reader allowing a short range wireless communication. The outer antenna 600 may perform an antenna function to transceive information with the reader.

According to one embodiment, the outer antenna 600 may be provided at the outside of the inner antenna 200. According to one embodiment, when the inner antenna 200 is provided at the center of the magnetic substrate 100, the outer antenna 600 may be provided along an outer portion of the magnetic substrate 100 so that the outer antenna 600 can surround the inner antenna 200. The outer antenna 600 may have a quadrangular structure formed by winding one conductive line several lines, but the embodiment is not limited thereto.

The outer antenna 600 may have a conductive pattern or a conductive layer similarly to the inner antenna 200.

Although various technologies are applied to a short-range communication standard of the outer antenna 600, an NFC (Near Field Communication) is preferable. The NFC is a technology for wireless communication within a short range with the band of 13.56 MHz.

The outer antenna 600 may be directly provided on the top surface of the magnetic substrate 100.

A method of providing the outer antenna 600 in the magnetic substrate 100 may be the same as that of the fabrication method described with reference to FIG. 15.

Hereinafter, the details of the antenna assembly 1000 according to still another embodiment of the disclosure will be described with reference to FIGS. 22 to 24.

Figure 22:
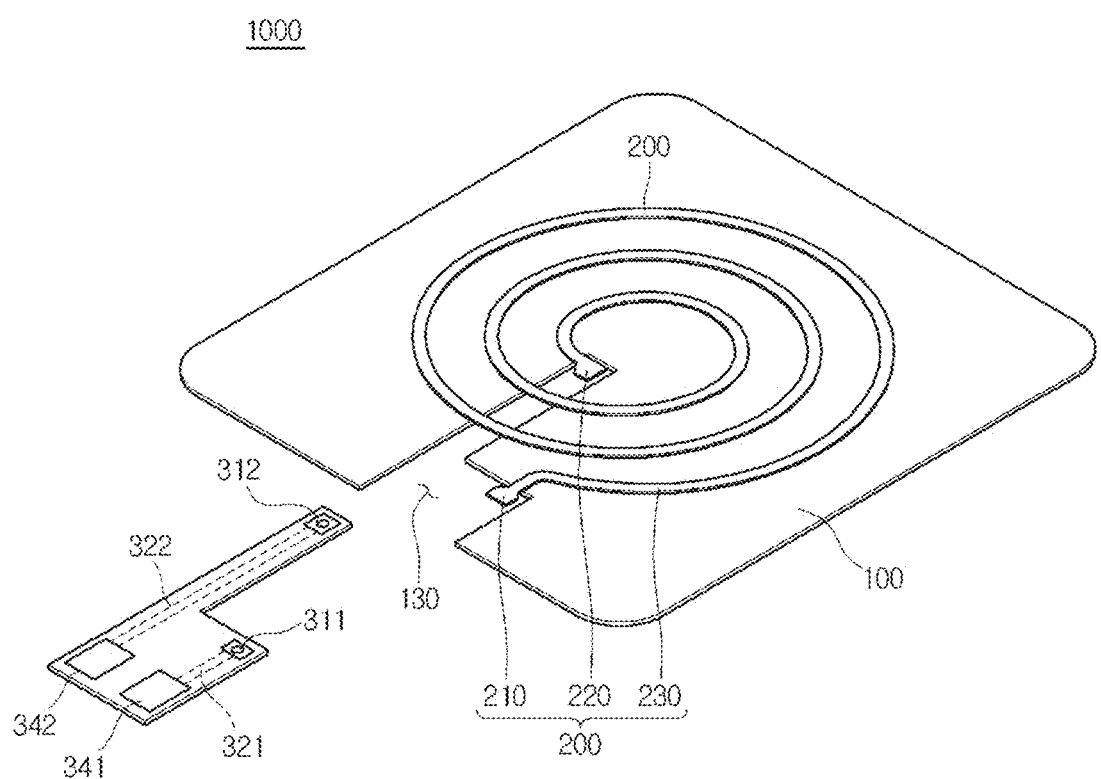
FIG. 22 is a perspective view showing the antenna assembly according to still another embodiment of the disclosure.

FIG. 22 is a perspective view showing the antenna assembly 1000 according to still another embodiment of the disclosure.

Referring to FIG. 22, the antenna assembly 1000 includes the magnetic substrate 100, the inner antenna 200, and the contact part 300. The contact part 300 may include the first contact terminal 341, the second contact terminal 342, the first connection conductive line 321, the second conductive line 322, and the substrate 330. In FIGS. 23 and 24, the first contact terminal 341, the second contact terminal 342, the first connection conductive line 321, the second conductive line 322, and the substrate 330 are not shown.

The details of the inner antenna 200 and the contact part 300 are the same as the description made with reference to FIG. 12. Since the magnetic substrate 100 partially has a different structure from that shown in FIG. 12, the description will be made while focusing on the different structure.

Referring to FIG. 22, the magnetic substrate 100 has a receiving region 130 having the same structure as that of the contact part 300. That is to say, the magnetic substrate 100 shown in FIG. 12 is provided on a top surface thereof with the inner antenna 200, and the contact part 300 is connected on the inner antenna 200. The magnetic substrate 100 shown in FIG. 22 has the receiving region 130 in the same structure as that of the contact part 300, and the contact part 300 may be provided under the inner antenna 200.

Figure 23:
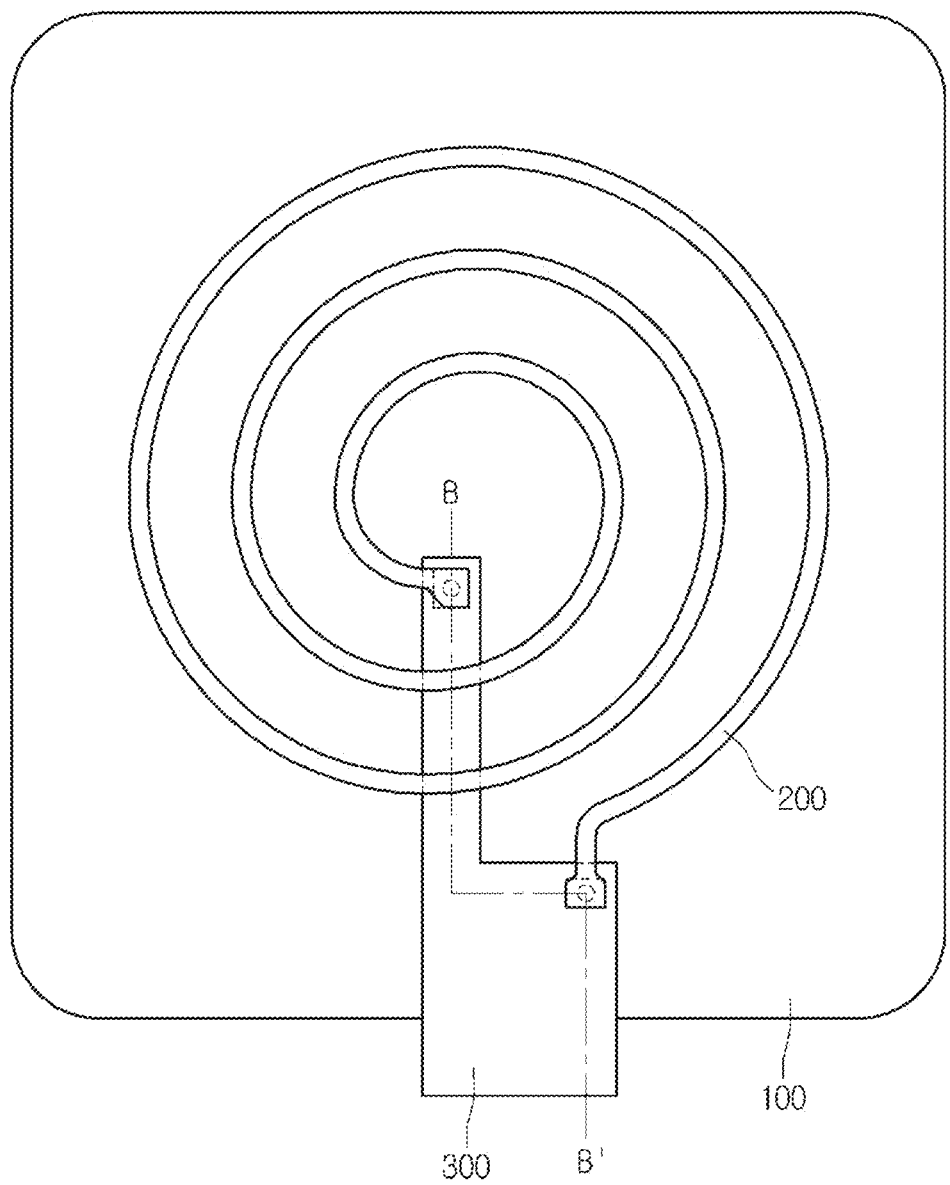
FIG. 23 is a plan view showing the antenna assembly according to still another embodiment of the disclosure.

FIG. 23 is a plan view showing the antenna assembly 1000 according to still another embodiment of the disclosure.

FIG. 23 shows the state that the inner antenna 200 is connected with the contact part 300.

The contact part 300 may have the thickness equal to or less than that of the magnetic substrate 100. The contact part 300 may be realized by using a flexible printed circuit board (PCB).

The contact part 300 may be provided in the receiving region 130 of the magnetic substrate 100.

If the contact part 300 has a thickness equal to or less than that of the magnetic substrate 100, the whole thickness of the antenna assembly 1000 may be reduced by the thickness of the contact part 300 differently from that of the embodiment of FIG. 14. In addition, since the magnetic substrate 100 less requires the magnetic member 110 and the support member 120 by the size of the receiving region 130, the magnetic substrate 100 has an advantage in cost.

Figure 24:
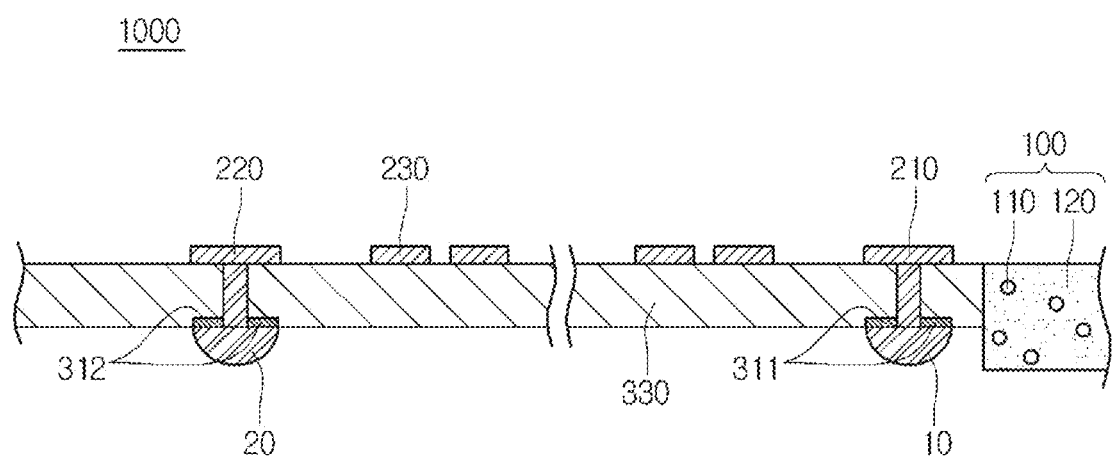
FIG. 24 is a sectional view taken along dotted line B-B' shown in a contact part of the antenna assembly of FIG. 23.

FIG. 24 is a sectional view showing the antenna assembly 1000 according to still another embodiment of the disclosure in the case when the sectional surface of the antenna assembly 1000 is taken along dotted line B-B' of the contact part 300 of FIG. 23.

Hereinafter, the description of the antenna assembly 1000 will be made on the assumption that the thickness of the contact part 300 is less than that of the magnetic substrate 100.

Referring to FIG. 24, the contact part 300 is provided on the top surface thereof with an outer terminal 210, an inner terminal 220, and an inner coil 230 which are components of the inner antenna 200.

The contact part 300 is provided under the inner antenna 200.

The outer terminal 210 of the inner antenna 200 is connected with the first connector 311 of the contact part 300 by the solder 10 corresponding to the first sub-connection part 501.

The inner terminal 220 of the inner antenna 200 is connected with the second connector 312 of the contact part 300 by the solder 20 corresponding to the first sub-connection part 501.

The inner coil 230 is designed to have predetermined values in a width W and a thickness T thereof. In addition, the inner coils 230 may be designed to have a predetermined spacing value.

Referring to FIG. 24, since the thickness of the contact part 300 is less than that of the magnetic substrate 100, the whole thickness of the antenna assembly 1000 can be reduced by the thickness of the contact part 300 differently from the embodiment of FIG. 14. In addition, since the magnetic substrate 100 less requires the magnetic member 110 and the support member 120 by the size of the receiving region 130 shown in FIG. 21, the magnetic substrate 100 has an advantage in cost.

Hereinafter, the antenna assembly 1000 according to still another embodiment of the disclosure will be described in detail.

Figure 25:
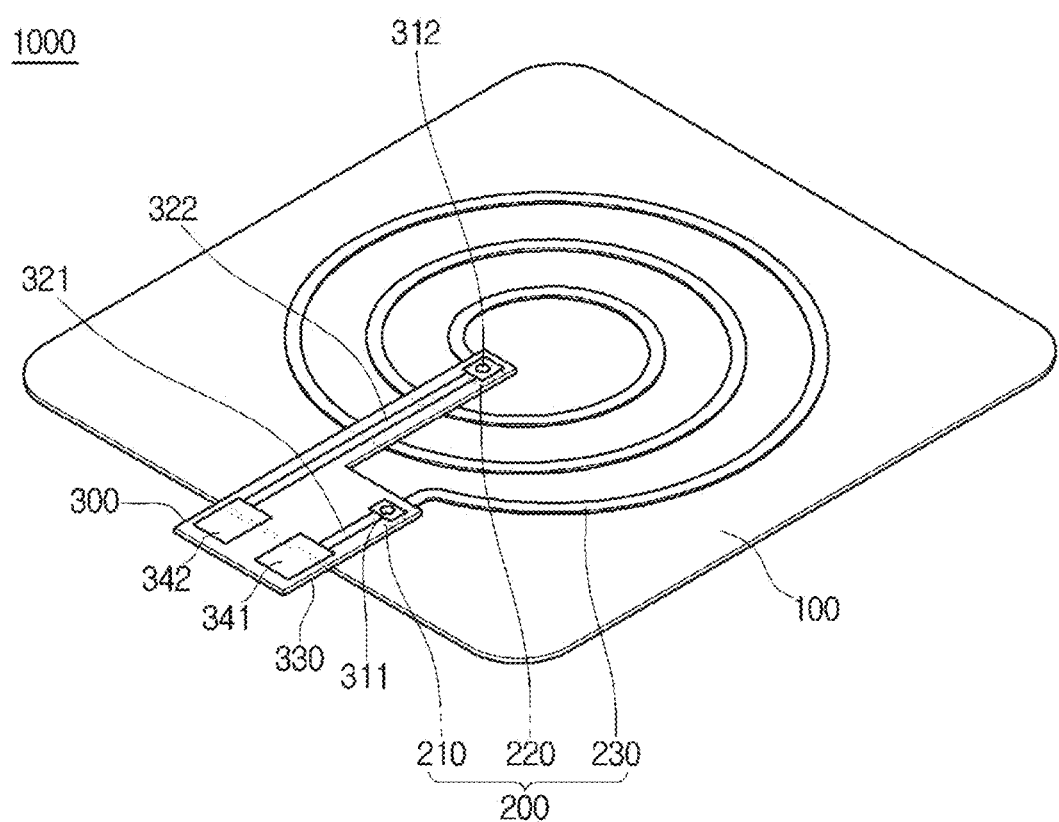
FIG. 25 is a perspective view showing an antenna assembly according to still another embodiment of the disclosure.
Figure 26:
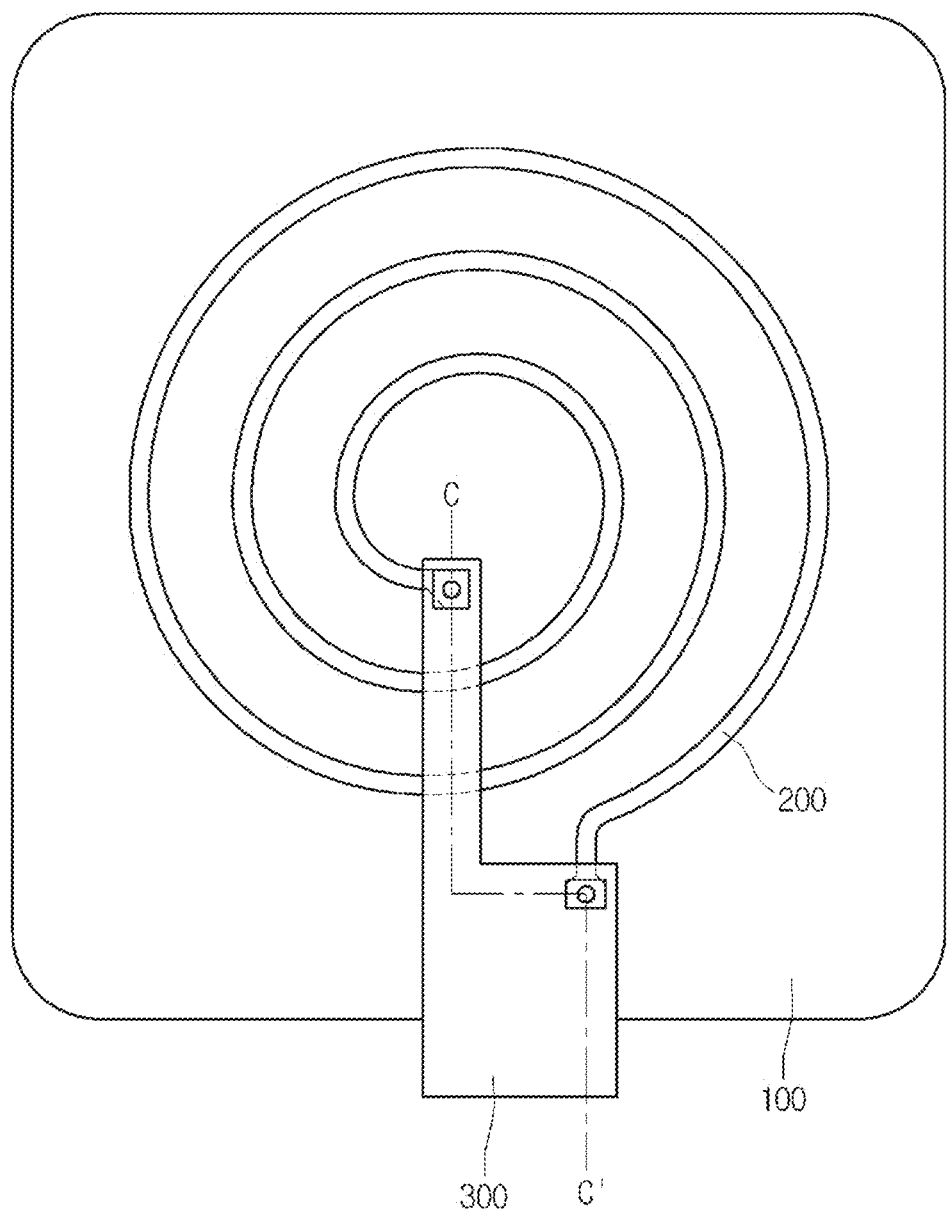
FIG. 26 is a plan view showing the antenna assembly according to still another embodiment of the disclosure.
Figure 27:
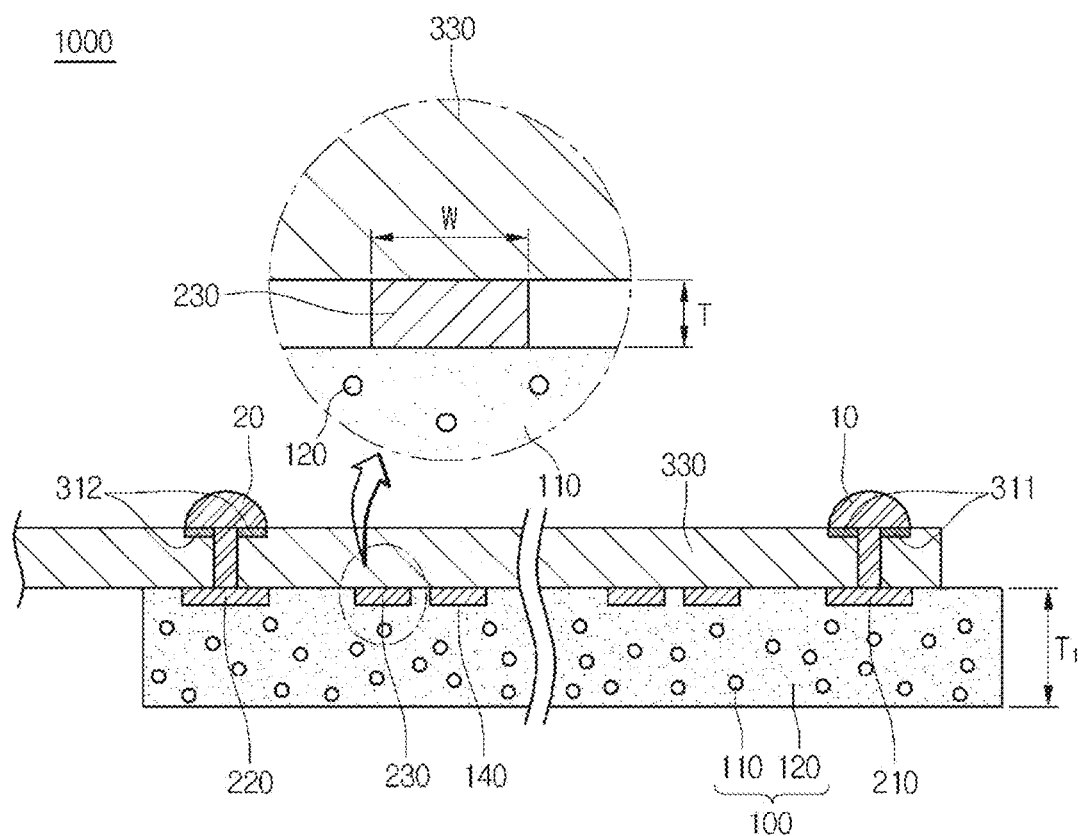
FIG. 27 is a sectional view taken along dotted line C-C' shown in a contact part of the antenna assembly.

FIG. 25 is a perspective view showing the antenna assembly 1000 according to still another embodiment of the disclosure, FIG. 26 is a plan view showing the antenna assembly 1000 according to the still another embodiment of the disclosure, and FIG. 27 is a sectional view taken along line C-C' of the antenna assembly 1000 according to still another embodiment of the disclosure. FIGS. 28 to 32 are views to explain the method of fabricating the antenna assembly 1000 according to still another embodiment of the disclosure.

Referring to FIG. 25, the antenna assembly 1000 according to still another embodiment of the disclosure may include the magnetic substrate 100, the inner antenna 200, and the contact part 300

According to one embodiment, the antenna assembly may receive power from a transmitter through electromagnetic induction. In this case, a coil 210 of the inner antenna 200 may wirelessly receive the power from the coil of the transmitter through the electromagnetic induction.

According to one embodiment, the antenna assembly may receive power from a transmitter through resonance. In this case, an inner coil 230 of the inner antenna 200 may include a reception resonance coil, which operates with a transmission resonance coil of the transmitter at a resonance frequency to receive power, and a reception induction coil coupled with the resonance coil to transmit the received power to a reception circuit.

The magnetic substrate 100 may change the direction of the magnetic field received from the transmitter.

The magnetic substrate 100 may change the direction of the magnetic field received from the transmitter, thereby reducing an amount of a magnetic field that leaks to an outside. Accordingly, the magnetic substrate 100 may have a shielding effect.

The magnetic substrate 100 changes the direction of the magnetic field received from the transmitter to a side direction, so that the magnetic field can be more concentrated on the inner antenna 200.

The magnetic substrate 100 absorbs the magnetic field leaking to the outside among magnetic fields received from the transmitter to discharge the magnetic field in the form of heat. If an amount of the magnetic field leaking to the outside is reduced, an influence harmful to a human body may be prevented.

Referring to FIG. 27, the magnetic substrate 100 may include a magnetic member 110 and a support member 120.

The magnetic member 110 may have a particle form or a ceramic form. According to one embodiment, the magnetic member 110 may include one of spinal-type, hex-type, sendust-type, and permalloy-type magnetic members.

The support member 120 may include thermoplastic resin or thermoplastic resin, and supports the magnetic substrate 100.

The magnetic substrate 100 may be provided in a sheet shape, and may have a flexible property.

Referring to FIG. 25 again, the inner antenna 200 may include the outer terminal 210, the inner terminal 220, and the inner coil 230. The inner coil 230 may have a conductive layer or a conductive pattern.

The inner antenna 200 may be provided in the magnetic substrate 100. In detail, the inner antenna 200 may be recessed inward of the magnetic substrate 100. In more detail, the magnetic substrate 100 may have a pattern groove, and the inner antenna 200 may be provided in the pattern groove. The pattern groove may have the same shape as that of a conductive pattern or a conductive layer of the inner antenna 200.

The thickness of the inner antenna 200 may be smaller than that of the magnetic substrate 100, and the upper portion of the inner antenna 200 may be exposed to the outside of the magnetic substrate 100.

The fabrication process of the antenna assembly 1000 by providing the inner antenna 200 and the contact part 300 in the magnetic substrate 100 will be described below with reference to FIGS. 28 to 32.

The outer terminal 210 of the inner antenna 200 is located at one end of the inner coil 230, and the inner terminal 220 is located at an opposite end of the inner coil 230.

The outer terminal 210 and the inner terminal 220 of the inner antenna 200 is required for the connection with the contact part 300.

The inner coil 230 may have a pattern by winding one conductive line several times. According to one embodiment, although the pattern may have a plan spiral structure, the embodiment is not limited thereto, but the pattern may have various patterns.

The inner antenna 200 may transmit power, which is wirelessly received from the transmitter, to the contact part 300. The inner antenna 200 may transmit power, which is received from the transmitter through electromagnetic induction or resonance, to the contact part 300.

The contact part 300 may include the first connector 311, the second connector 312, and the substrate 330.

The first connector 311 of the contact part 300 may be connected to the outer terminal 210 of the inner antenna 200, and the second connector 312 of the contact part 300 may be connected to the inner terminal of the inner antenna 200.

The substrate 330 may include a wiring layer, and the wiring layer may include a receiving circuit to be described.

The contact part 300 connects the receiving circuit (not shown) to the inner antenna 200 to transmit power received from the inner antenna 200 to a load (not shown) through a receiving circuit (not shown). The receiving circuit may include a rectifying circuit to convert AC power to DC power and a smoothing circuit that removes a ripple component from the converted DC power and transmit the ripple component to the load.

FIGS. 26 to 27 are sectional views to explain the detailed structure of the antenna assembly 1000 according to still another embodiment of the disclosure in the state that the inner antenna 200 is connected to the contact part 300.

FIG. 26 is a view showing the state that the inner antenna 200 is connected to the contact part 300.

The inner antenna 200 may be electrically connected to the contact part 300 by a solder.

Referring to FIG. 27, the outer terminal 210 of the inner antenna 200 may be connected to the first connector 311 of the contact part 300 by the first solder 10, and the inner terminal 220 of the inner antenna 200 may be connected to the second connector 312 of the contact part 300 by the second solder 20. In detail, the outer terminal 210 of the inner antenna 200 may be connected to the first connector 311 of the contact part 300 through the via hole of the first solder 10, and the inner terminal 220 of the inner antenna 200 may be connected to the second connector 312 of the contact part 300 through the via hole of the second solder 20.

According to one embodiment, the via hole may be formed by using a laser. In this case, the laser may include an UV laser or a CO2 layer.

FIG. 27 is a sectional view showing the antenna assembly 1000 in which the magnetic substrate 100 and the inner antenna 200 are connected with the contact part 300.

In other words, the outer terminal 210, the inner terminal 220, and the inner coil 230, which are components of the inner antenna 200, may be provided in the pattern grooves 140 of the magnetic substrate 100.

In other words, the state in which the magnetic substrate 100 and the inner antenna 200 are connected with the contact part 300 is shown.

The inner coil 230 is designed to have predetermined values in a width W and a thickness T thereof. According to one embodiment, the thickness of the inner coil 230 may be 0.1 mm, and the thickness of the magnetic substrate 100 may be 0.43 mm, but the embodiment is not limited thereto. According to one embodiment, the thickness T of the inner coil 230 may be less than the thickness T1 of the magnetic substrate 100.

In the antenna assembly 1000 according to still another embodiment of the disclosure, the inner antenna 200 is directly provided in the pattern groove 140 of the magnetic substrate 100, so that the whole thickness of an electronic device having the antenna assembly 1000 mounted therein can be reduced by the thickness of the inner antenna 200. If still another embodiment of the disclosure is applied to an electronic device, such as a portable terminal, having the antenna assembly 1000, the whole thickness of a slim portable terminal can be reduced.

Further, in the antenna assembly 1000 according to still another embodiment of the disclosure, since the inner antenna 200 is provided in the pattern groove 140 of the magnetic substrate 100, the whole size of an electronic device having the antenna assembly 1000 can be reduced different from the case in which a coil pattern is formed on a conventional FPCB.

FIGS. 28 to 32 are sectional views to explain a method of fabricating the antenna assembly 1000 according to sill another embodiment of the disclosure.

Hereinafter, a method of fabricating the antenna assembly 1000 according to still another embodiment of the disclosure will be described together with the description made with reference to FIGS. 25 to 27.

Figure 28:
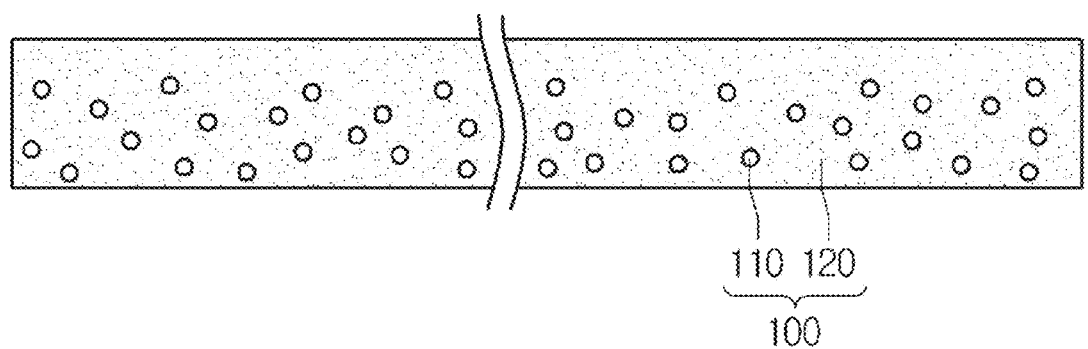
FIGS. 28 to 32 are sectional views to explain a method of fabricating the antenna assembly according to one embodiment of the disclosure.

Referring to FIG. 28, the magnetic substrate 100 is provided. According to one embodiment, the magnetic substrate 100 may be formed by coating sendust alloy-based metal powders (Al, Fe, $SiO_2$) on polyethylene rubber, and forming an oxidation thin film on the surface of the resultant structure.

Figure 29:
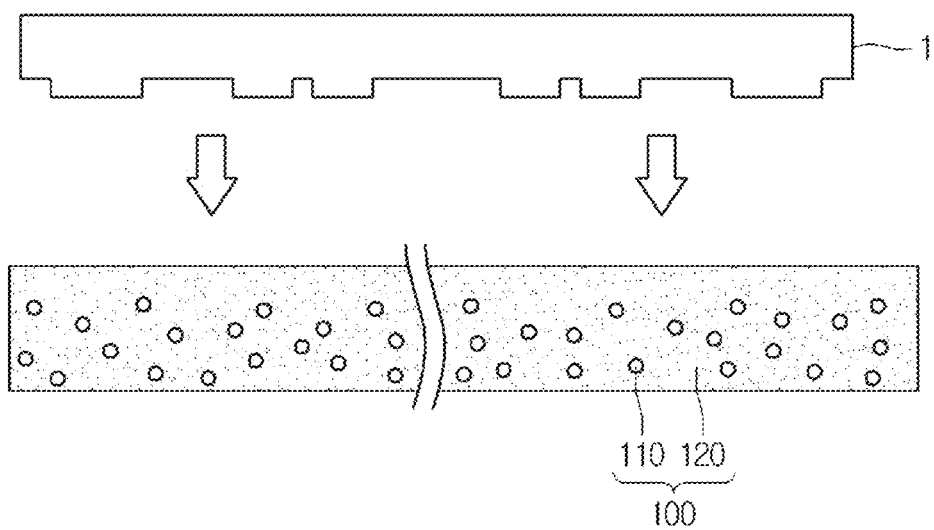

Next, referring to FIG. 29, in order to form a pattern groove in the magnetic substrate 100 to receive the inner antenna 200, a mold 1 is used and heat and pressure are simultaneously applied. The mold 1 may be manufactured with the same shape as that of the inner antenna 200. According to one embodiment, the mold 1 may be formed of an aluminum alloy, a copper alloy, and cast iron.

The mold 1 may have a protrusion corresponding to the position for the inner antenna 200 to wirelessly receive power.

Heat is applied by using the mold 1. In this case, the heat is applied at a specific temperature based on the characteristics of sendust alloy-based metal powders serving as components of the magnetic substrate 100. According to one embodiment, when the magnetic substrate 100 is fabricated by coating sendust alloy-based metal powders on polyethylene rubber, high temperature in the range of 100° C. to 180° C. and high pressure are applied by using the mold 1. Then, a temperature is cooled to 100 or less, and the mold 1 is separated from the magnetic substrate 100. If the mold 1 is instantly separated after the magnetic substrate 100 is pressed by using the mold 1, the remaining heat of the pattern groove 140 prevents the pattern groove 140 from being formed in a desirable shape. Accordingly, it is necessary to cool the magnetic substrate 100 to the temperature of 100° C. or less and then separate the mold 1 from the magnetic substrate 100.

If the magnetic substrate 100 is formed of sendust alloy-based metal powders, the applied temperature and pressure may be varied depending on the arrangement or the density of the powders. In other words, if the powders are not uniformly arranged, higher temperature and pressure must be applied. If the powders are uniformly arranged, lower temperature and pressure may be applied as compared with the case that the powders are not uniformly arranged. In addition, if the powders have lower density, lower temperature and pressure may be applied as compared with the case that the powders have higher density. In addition, the applied temperature and pressure may be varied depending on the components of powders, that is, the alloy constituting the powders.

As described above, the applied temperature may be varied depending on the arrangement, density, and components of the powders.

According to another embodiment, laser may be irradiated instead of applying heat and pressure by using the mold 1 in order to form a pattern groove in the magnetic substrate 100 to receive the inner antenna 200. The pattern groove may be formed by using an excimer laser to irradiate a laser beam having an ultraviolet wavelength band. The excimer laser may include a KrF excimer laser (krypton fluoride, the central wavelength of 284 nm) or an ArF excimer laser (argon fluoride, the central wavelength of 193 nm).

Figure 30:
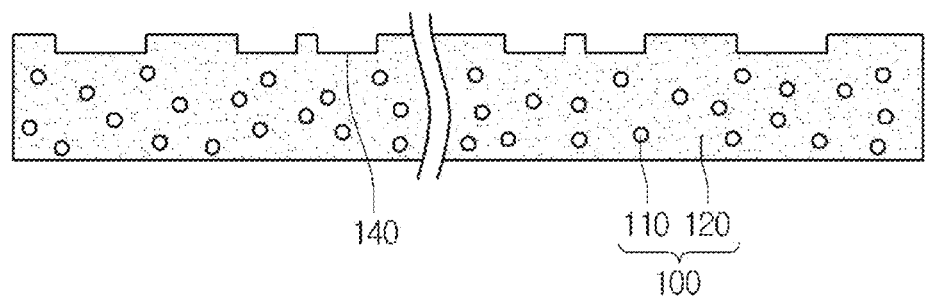

Next, FIG. 30 shows the state of the magnetic substrate 100 having a pattern groove 140 when the mold 1 is separated from the magnetic substrate 100.

Figure 31:
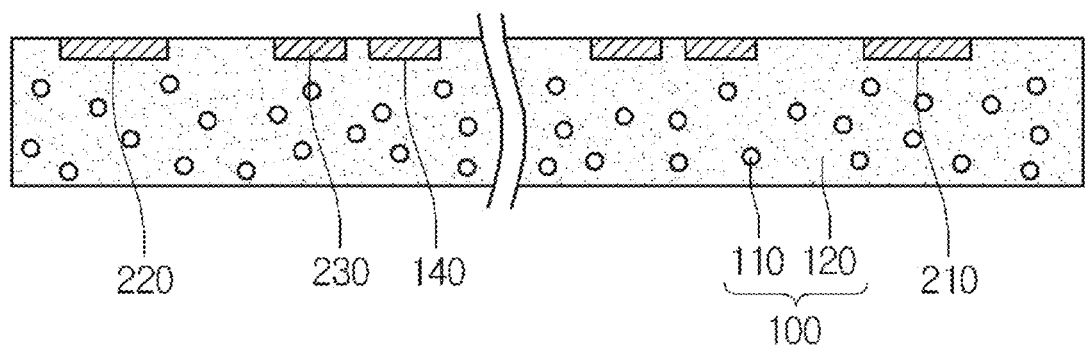

Thereafter, referring to FIG. 31, the inner antenna 200 is inserted into the pattern groove 140 formed in the magnetic substrate 100 in the state shown in FIG. 30. If the inner antenna 200 is inserted, a predetermined conductive pattern is formed in the pattern groove 140 of the magnetic substrate 100.

According to one embodiment, the process of inserting the inner antenna 200 into the pattern groove 140 of the magnetic substrate 100 may be performed by inserting metal subject to a plating process or an etching process so that the inner antenna 200 has a conductive pattern.

In detail, according to the plating process, a metallic material is filled in the pattern groove 140 to form the inner antenna 200. In this case, the metallic material may include one selected among Cu, Ag, Sn, Au, Ni, and Pd. The scheme of filling the metallic material may include one of an electro less plating scheme, an electroplating scheme, a screen printing scheme, a sputtering scheme, an evaporation scheme, an injecting scheme, and a dispensing scheme, or the combination thereof.

Figure 32:
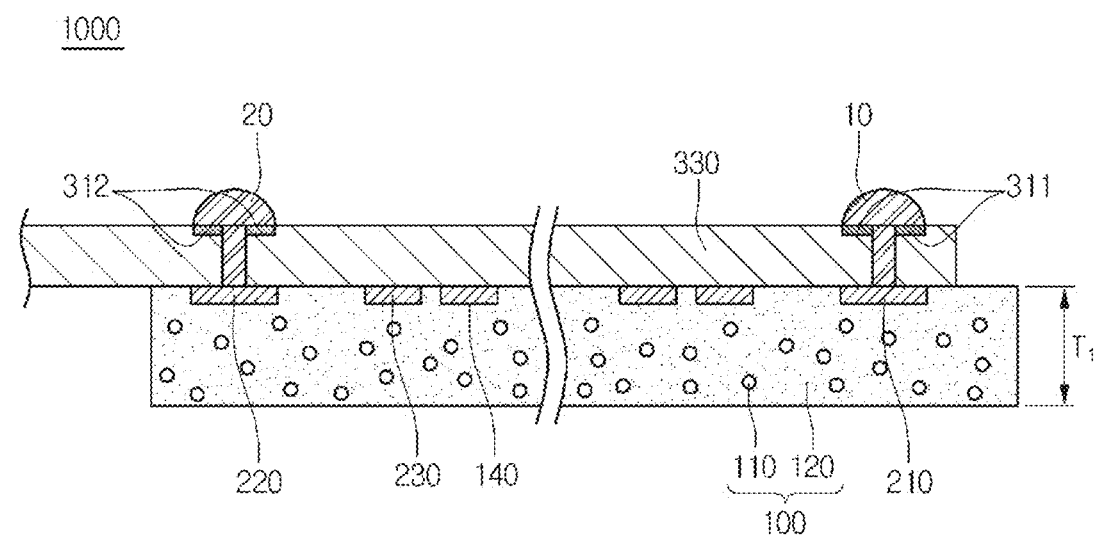

Thereafter, referring to FIG. 32, a soldering work is performed to connect the inner antenna 200 to the contact part 300.

In other words, the outer terminal 210 of the inner antenna 200 is connected to the first connector 311 of the contact part 300 by the solder 10, and the second connection terminal 200 of the inner antenna 200 is connected to the second connector 312 of the contact part 300 by the solder 20.

As described above, according to the method of fabricating the antenna assembly 1000 of still another embodiment of the disclosure, the pattern groove is formed in the magnetic substrate 100, and the inner antenna 200 is provided in the pattern groove, so that the whole thickness of the antenna assembly 1000 can be reduced. In addition, the antenna assembly 1000 can be fabricated only through a process of forming the pattern groove and a process of inserting a coil part, so that the fabricating process can be simplified.

FIG. 33 is a view to explain an inductance, a resistance, a Q value of the inner antenna of a coil part according to a use frequency when the coil part is provided on the top surface of the magnetic substrate according to still another embodiment of the disclosure. FIG. 34 is a view to explain an inductance, a resistance, the Q value of the inner antenna according to a use frequency when a coil part is provided in a pattern groove in a magnetic substrate according to still another embodiment of the disclosure.

The relationship among the inductance, resistance, and the Q value of the inner antenna 200 may be expressed through following Equation 1.

$$Q=w*L/R \qquad \text{[Equation 1]}$$

In Equation 1, w represents a frequency used in power transmission; L represents the inductance of the inner antenna 200, and the resistance of the inner antenna 200.

As shown in Equation 1, as the inductance of the inner antenna 200 is increased, the Q value is increased. If the Q value is increased, power transmission efficiency can be improved. The resistance of the inner antenna 200 is a numeric value obtained based on power loss occurring in the inner antenna 200, and the Q value is increased as the resistance is increased.

Referring to FIGS. 33 and 34, regarding the comparison in the use frequency of 150 KHz, when comparing with the case that the inner antenna 200 is provided on the top surface of the magnetic substrate 100 according to still another embodiment of the disclosure, FIG. 34 shows that the inductance of the inner antenna 200 is increased from about 9986.92 μm to about 10339.34 μm, and the resistance of the inner antenna 200 is reduced by 0.057Ω from about 0.910Ω to about 0.853Ω, when the inner antenna 200 is provided in the pattern groove 140 in the magnetic substrate 100 according to still another embodiment of the disclosure. Accordingly, the Q value is increased by the increment of the inductance and the decrement of the resistance.

Therefore, in the antenna assembly 1000 according to the still another embodiment of the disclosure, the Q value can be increased by arranging the inner antenna 200 in the pattern groove of the magnetic substrate 100.

Figure 35:
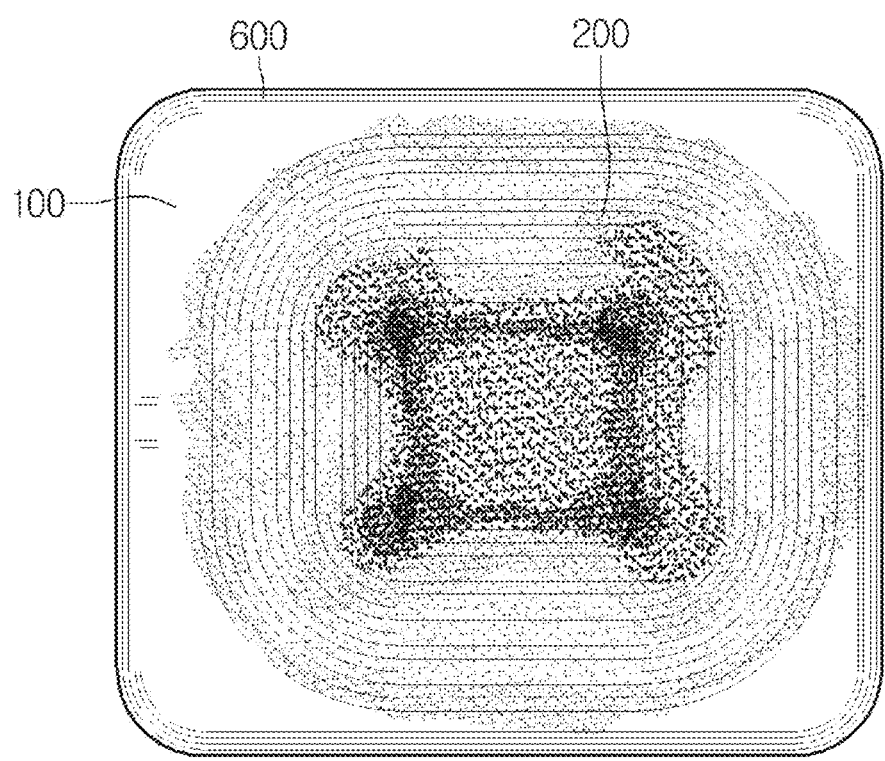
FIG. 35 illustrates an H-field representing a radiation pattern of a magnetic field when a coil part is provided on the top surface of the magnetic substrate according to still another embodiment of the disclosure.
Figure 36:
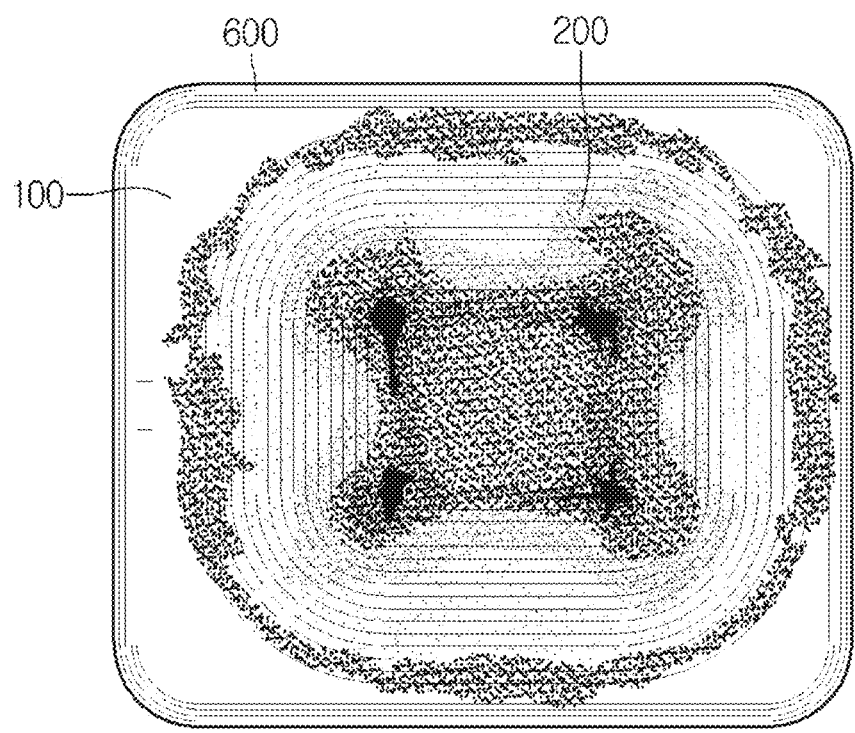
FIG. 36 is an H-field representing a radiation pattern of a magnetic field when the coil part is provided in the pattern groove of the magnetic substrate according to still another embodiment of the disclosure.

FIG. 35 illustrates an H-field representing a radiation pattern of a magnetic field when a coil part is provided on the top surface of the magnetic substrate 100 according to still another embodiment of the disclosure. FIG. 36 is an H-field representing the radiation pattern of the magnetic field when the coil part is provided in a pattern groove of the magnetic substrate 100 according to still another embodiment of the disclosure.

Referring to FIGS. 35 and 36, when the inner antenna 200 is provided in the pattern groove of the magnetic substrate 100, a greater amount of magnetic field is radiated from an outer portion of the inner antenna 200 as compared with when the coil part is provided on the top surface of the magnetic substrate 100. This is because the direction of the magnetic field directed outward is changed to the side direction of the inner antenna 200 due to the recessed structure of the inner antenna 200 in the magnetic substrate 100.

In addition, when the inner antenna 200 is provided in the pattern groove of the magnetic substrate 100, a greater amount of magnetic field is radiated from an inner portion of the inner antenna 200 as compared with when the inner antenna 200 is provided on the top surface of the magnetic substrate 100. This is because the direction of the magnetic field directed outward is changed to the side direction of the inner antenna 200 due to the recessed structure of the inner antenna 200 in the magnetic substrate 100.

Referring to FIGS. 35 and 36, the antenna assembly 1000 may further include the outer antenna 600.

The outer antenna 600 may make communication with a reader that can make short-range wireless communication. The outer antenna 600 functions as an antenna to transceive the information with the reader.

According to one embodiment, the outer antenna 600 may be provided at an outer portion of the inner antenna 200. According to one embodiment, when the inner antenna 200 is provided at the center of the magnetic substrate 100, the outer antenna 600 may be provided along the outer portion of the magnetic substrate 100 so that the outer antenna 600 surrounds the inner antenna 200. The outer antenna 600 may have a quadrangular structure formed by winding one conductive line several times, but the embodiment is not limited thereto.

The outer antenna 600 may have a conductive pattern or a conductive layer similarly to the inner antenna 200.

Although various technologies are applied to a short-range communication standard of the outer antenna 600, an NFC (Near Field Communication) is preferable Hereinafter, an antenna assembly according to still another embodiment of the disclosure will be described with reference to FIGS. 37 and 48.

Figure 37:
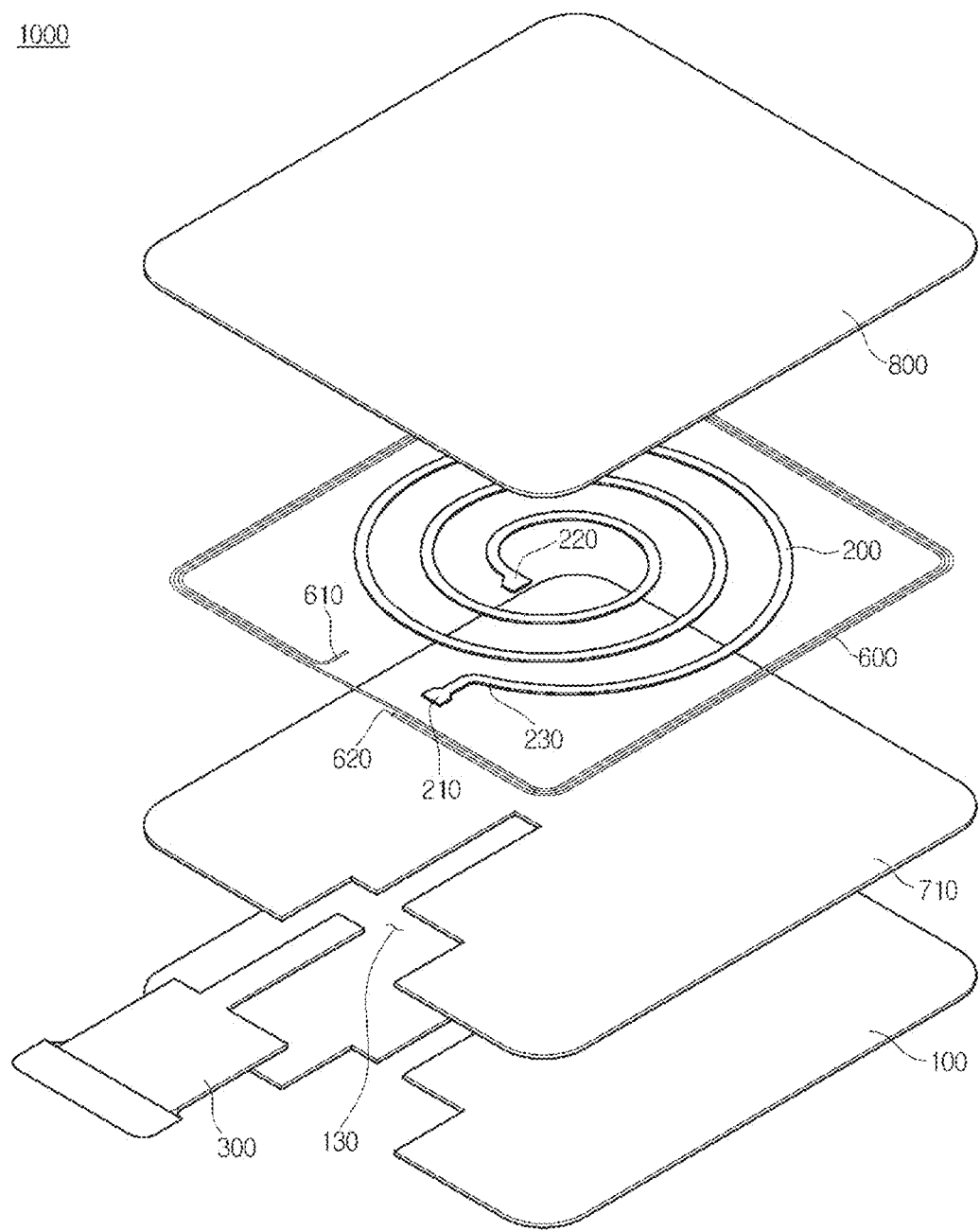
FIG. 37 is an exploded perspective view showing an antenna assembly according to still embodiment of the disclosure
Figure 38:
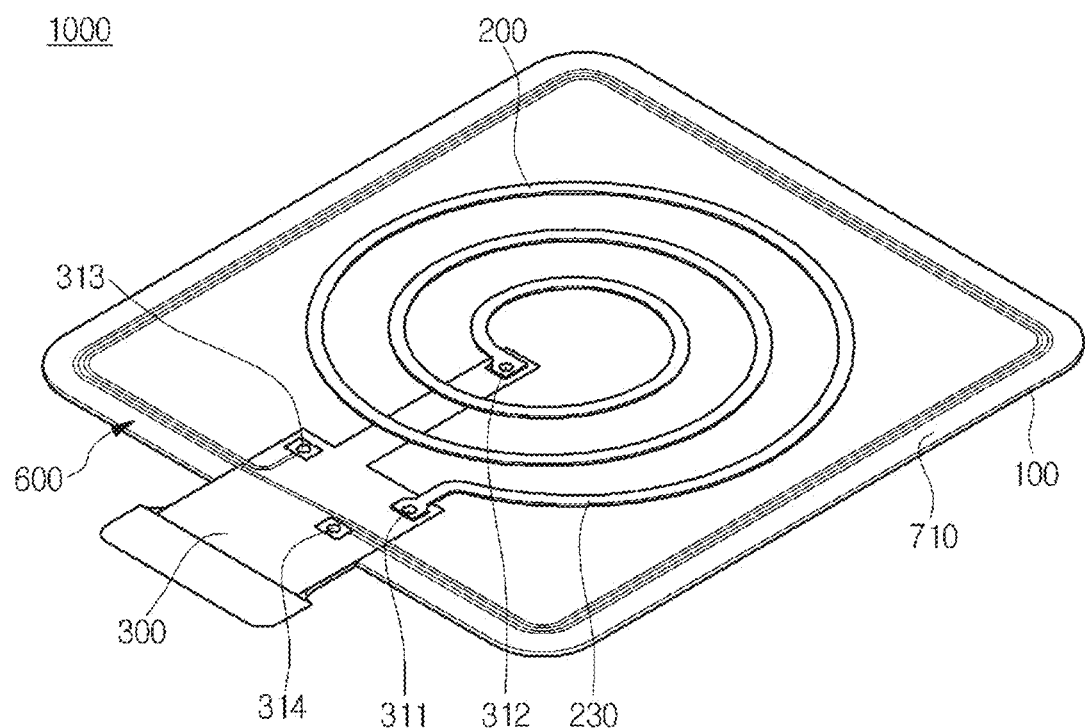
FIG. 38 is a perspective view showing the antenna assembly according to still embodiment of the disclosure.
Figure 39:
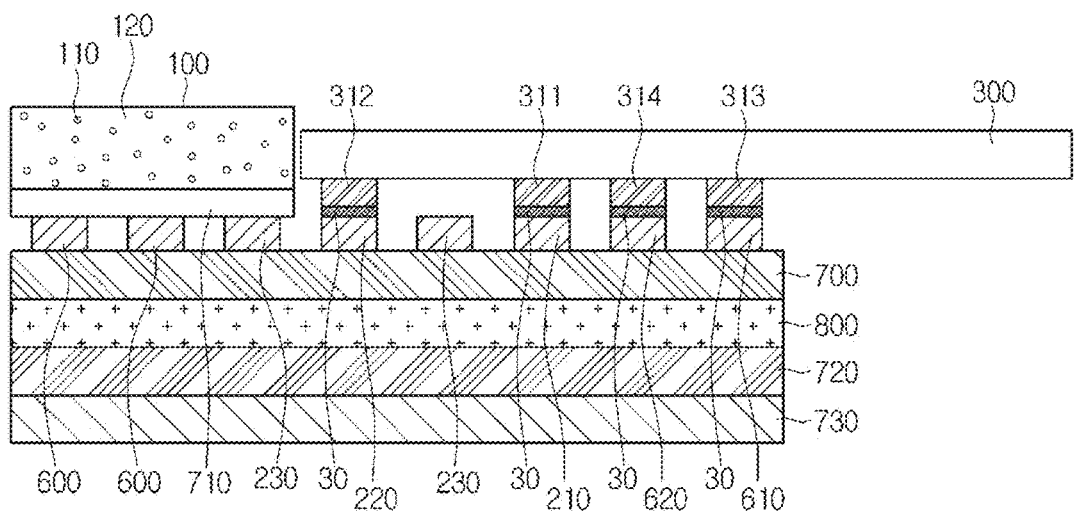
FIG. 39 is a sectional view showing the antenna assembly according to still another embodiment of the disclosure.

FIG. 37 is an exploded perspective view showing an antenna assembly 1000 according to still embodiment of the disclosure. FIG. 38 is a perspective view showing the antenna assembly 1000 according to still embodiment of the disclosure. FIG. 39 is a sectional view showing the antenna assembly 1000 according to still another embodiment of the disclosure.

Meanwhile, FIG. 38 is a perspective view showing the assembly of components of the antenna assembly 1000 shown in FIG. 37, in which a part of components according to the previous embodiment is omitted.

The antenna assembly 1000 according to still another embodiment of the disclosure may be mounted in an electronic device such as a portable terminal.

Referring to FIGS. 37 to 39, the antenna assembly 1000 may include the magnetic substrate 100, the inner antenna 200, the contact part 300, the outer antenna 600, the bonding layer 700, a first double-side bonding layer 710, a second double-side bonding layer 720, a protective film 800, and a release layer 730.

Referring to FIG. 37, the magnetic substrate 100 may change the direction of the magnetic field received from the transmitter.

The magnetic substrate 100 can reduce an amount of a magnetic field leaking to the outside by changing the direction of the magnetic field received from the transmitter by the inner antenna 200. Accordingly, the magnetic substrate 100 can have a shielding effect.

The magnetic substrate 100 changes the direction of the magnetic field received from the transmitter into the side direction, so that the magnetic field can be more concentrated on the inner antenna 200.

The magnetic substrate 100 absorbs the magnetic field leaking to the outside among magnetic fields received from the transmitter to discharge the magnetic field in the form of heat. If an amount of the magnetic field leaking to the outside is reduced, an influence harmful to a human body may be prevented.

Referring to FIG. 39, the magnetic substrate 100 may include the magnetic member 110 and the support member 120.

The magnetic member 110 may have a particle form or a ceramic form. According to one embodiment, the magnetic member 110 may include one of spinal-type, hex-type, sendust-type, and permalloy-type magnetic members.

The support member 120 may include thermosetting resin or thermoplastic resin and may support the magnetic substrate 100.

Referring to FIG. 37 again, the magnetic substrate 100 may be provided in the form of a sheet, and may have a flexible property.

The magnetic substrate 100 may have the receiving space 130 in a predetermined region. The receiving space 130 may have the same shape as that of the contact part 300, and the contact part 300 is provided in the receiving space 130 to connect with the inner antenna 200.

The inner antenna 200 may wirelessly receive power from the transmitter through the electromagnetic induction or resonance. Similarly to the description made with reference to FIG. 12, the inner antenna 200 may include the outer terminal 210, the inner terminal 220, and the inner coil 230. The inner coil 230 may include a conductive layer or a conductive pattern.

The contact part 300 connects the receiving circuit (not shown) to the inner antenna 200 to transmit power received from the inner antenna 200 to the load (not shown) through a receiving circuit (not shown).

The contact part 300 may include a wiring layer, and the wiring layer may include the receiving circuit. The receiving circuit may include a rectifying circuit to rectify the received power, a smoothing circuit that removes a noise component, and a main IC chip that controls the whole operation to wireless receive power.

In addition, the receiving circuit can transmit a signal received from the outer antenna 600 to a short-range communication signal processing unit (not shown).

The contact part 300 is provided in the receiving space 130 of the magnetic substrate 100 so that the contact part 300 may make contact with the inner antenna 200. Referring to FIG. 38, the contact part 300 may be provided in the receiving space 130 of the magnetic substrate 100.

The contact part 300 may include the first connector 311, the second connector 312, the third connector 313, and the fourth connector 314. The first connector 311 of the contact part 300 may make contact with the first connector 311 of the inner antenna 200. The second connector 312 of the contact part 300 may make contact with the inner antenna 220 of the inner antenna 200. The third connector 313 of the contact part 300 may make contact with the inner terminal 610 of the outer antenna 600. The fourth connector 314 of the contact part 300 may make contact with the outer terminal 620 of the outer antenna 600.

The contact part 300 may be provided in the receiving space 130 in the same shape as that of the receiving space 130. As the contact part 300 is provided in the receiving space 130 of the magnetic substrate 100, the whole thickness of the antenna assembly 1000 can be reduced by the thickness of the contact part 300. Accordingly, the thickness of an electronic device such as a portable terminal having the antenna assembly 1000 mounted therein can be greatly reduced.

According to one embodiment, the contact part 300 may include an FPCB, a tape substrate (TS) or a lead frame (LF). When the TS is used as the contact part 300, the thickness of the contact part 300 is reduced, so that the whole size of the antenna assembly 1000 can be reduced.

When a lead frame is used as the contact part 300, the wiring layer included in the contact part 300 can be protected from heat emission, external moisture, or shock, and can be produced in large amount.

Referring to FIG. 37 again, the outer antenna 600 may make communicate with a reader allowing short-range wireless communication. The outer antenna 600 may perform an antenna function to transceive information with the reader.

The short-range communication signal processing unit (not shown) may receive and process a signal received from the outer antenna 600 through the contact part 300.

Although various technologies are applied to a short-range communication standard of the outer antenna 600, an NFC (Near Field Communication) is preferable According to one embodiment, the outer antenna 600 may be provided at an outer portion of the inner antenna 200. Referring to FIG. 38, when the inner antenna 200 is provided at the center of the magnetic substrate 100, the outer antenna 600 may be provided along the outer portion of the magnetic substrate 100 so that the outer antenna 600 surrounds the inner antenna 200. The outer antenna 600 may have a quadrangular structure formed by winding one conductive line several times, but the embodiment is not limited thereto.

Referring to FIG. 37 again, the bonding layer (not shown) may be provided under the protective film 800, and the protective film 800 may be attached to the inner antenna 200 and the outer antenna 600, which is described below.

The first double-side bonding layer 710 is attached between the inner antenna 200, the outer antenna 600, and the magnetic substrate 100 so that the first double-side bonding layer 710 may be attached to the inner antenna 200 and the magnetic substrate 100. The above structure will be described below. The first double-side bonding layer 710 may have a receiving space provided in the same shape as that of the contact part 300 similarly to the magnetic substrate 100.

Referring to FIG. 39, the second double-side bonding layer 720 may attach the protective film 800 to the release layer 730, which will be described below.

The inner antenna 200 may be provided on the magnetic substrate 100 and may have a spiral shape, but the embodiment is not limited thereto.

Thereafter, a method of fabricating the antenna assembly 1000 according to still another embodiment of the disclosure will be described with reference to FIGS. 40 to 48.

Figure 40:
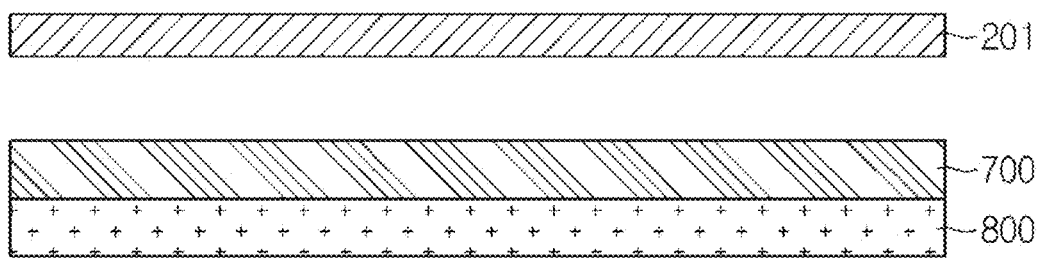
FIGS. 40 to 48 are sectional views to explain a method of fabricating the antenna assembly according to still another embodiment of the disclosure.

As shown in FIG. 40, when the fabrication process is started, the conductor 201, the bonding layer 700, and the protective film 800 are prepared.

According to one embodiment, the conductor 201 may be formed the alloy of copper (Cu). The Cu may be used in the form of a rolled foil or an electrolytic foil. The conductor 201 may have various thicknesses according to the requirements of a product. According to one embodiment, the thickness of the conductor 201 may be 100 μm, but the embodiment is not limited thereto.

The bonding layer 700 may enhance the bonding strength between the conductor 201 and the protective film 800 and may include thermosetting resin, but the embodiment is not limited thereto. Preferably, the bonding layer 700 has the thickness of 17 μm, but the embodiment is not limited thereto.

The protective film 800 protects the conductor 201 in the process of forming a conductive pattern for the conductor 201. In detail, the protective film 800 may protect the conductor 201 to support the conductor 201 in the etching process to be described below so that a predetermined conductive pattern is formed.

According to one embodiment, the protective film 800 may be formed of polyimide film (PI), but the embodiment is not limited.

Figure 41:
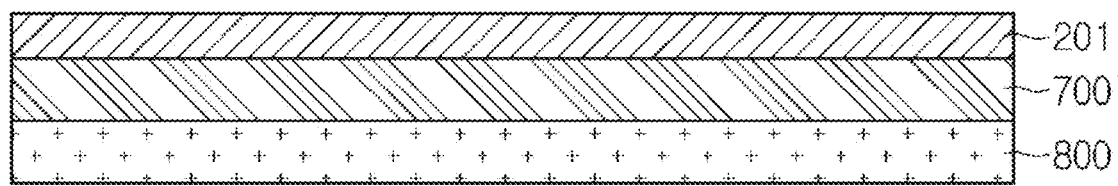

Next, as shown in FIG. 41, the conductor 201 may be attached to the protective film 800 through the bonding layer 700. The attachment may be achieved through the laminating process. The laminating process refers to a process of bonding mutually different materials to each other by applying predetermined heat and pressure.

Figure 42:
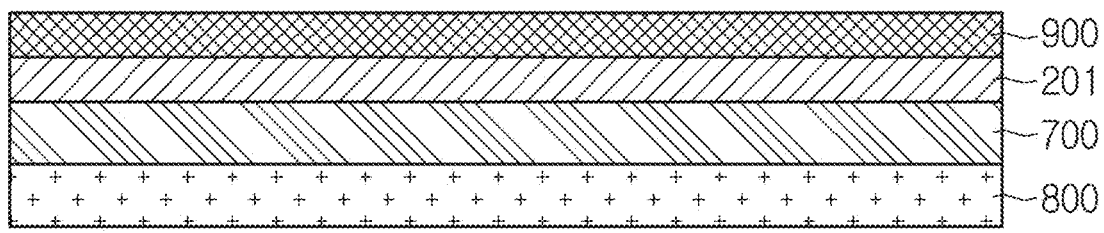

Thereafter, as shown in FIG. 42, a photosensitive film 900 is attached to the top surface of the conductor 201. The photosensitive film 900 is used to form a predetermined conductive pattern through an etching process for the conductor 201. The photosensitive film 900 may include an UV exposure type of film or an LDI exposure type of film. According to still another embodiment, a photosensitive coating solution may be coated on the top surface of the conductor 201 instead of the photosensitive film 900.

Figure 43:
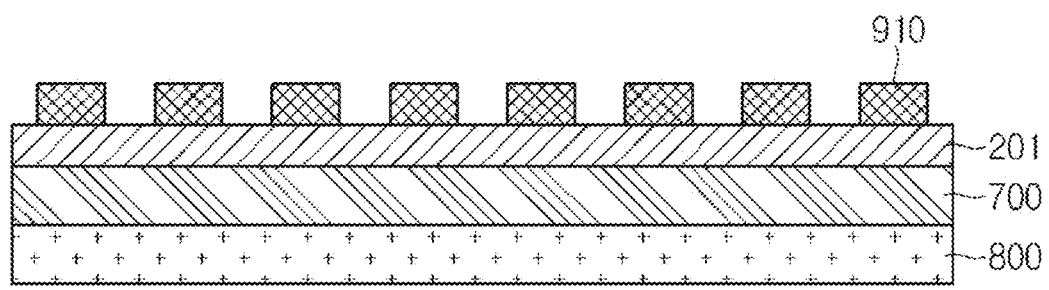

Subsequently, as shown in FIG. 43, the photosensitive film 900 is exposed and developed to form a mask pattern 910.

The mask pattern 919 may be formed on a top surface of a position in which a predetermined conductive pattern is formed through the exposure and development processes.

The exposure process is to irradiate light to the photosensitive film 900 by distinguishing between a part, in which the conductive pattern is formed, and a part in which the conductive pattern is not formed. In other words, the exposure process is a process to irradiate light to the part in which the conductive pattern is not formed. The development process refers to a process of removing the part to receive light through the exposure process.

The mask pattern 910 may be formed at parts for the inner antenna 200 and the outer antenna 600 through the exposure and development process. The part for the conductor 201 to be exposed by the mask pattern 910 may be etched.

Figure 44:
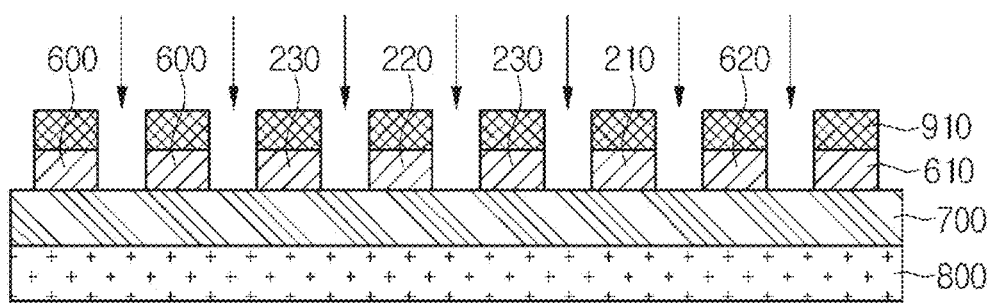

Subsequently, as shown in FIG. 44, a groove part in which the mask pattern 910 is not formed may be etched through the etching process. The etching process refers to a process of corroding and removing the conductor 201 positioned at the part, in which the mask pattern 910 is not formed, by using a material chemically reacting with the conductor 201 positioned at the part in which the mask pattern 910 is not formed. According to one embodiment, the conductor 201 may be patterned through a wet etching process or a dry etching process.

Figure 45:
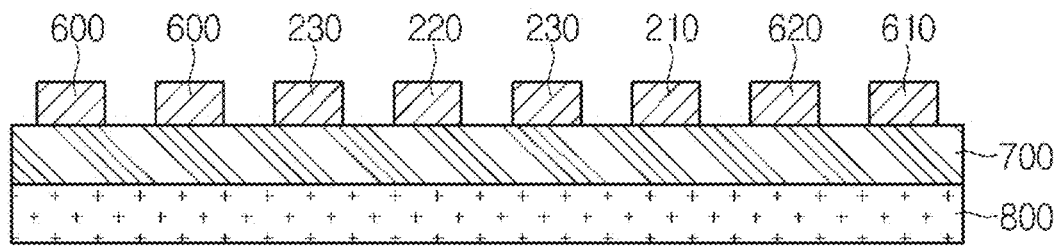

Subsequently, as shown in FIG. 45, if the mask pattern 910 is removed, the outer terminal 210 and the inner terminal 220 of the inner antenna 200, the inner terminal 610 and the outer terminal 620 of the outer antenna 600, an inner coil 230 having a predetermined conductive pattern and an outer antenna 600 having the predetermined conductive pattern may be formed.

Figure 46:
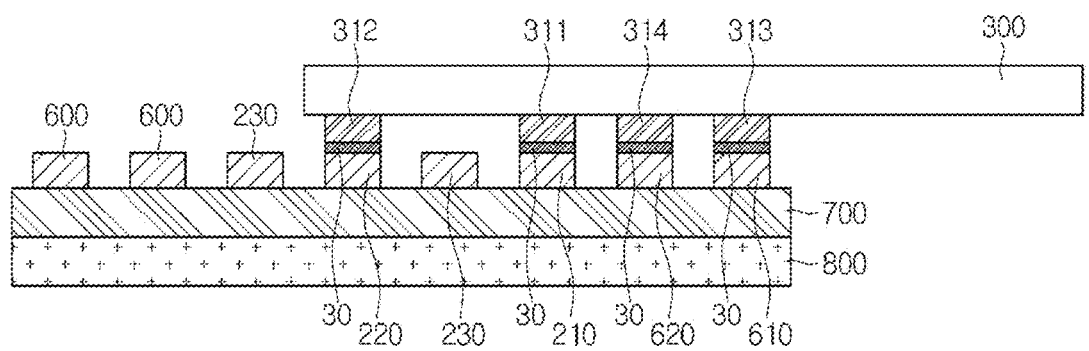

Thereafter, as shown in FIG. 46, a soldering process is performed to connect the inner antenna 200 and the outer antenna 600 with the contact part 300. According to one embodiment, the soldering process may include a reflow process, but the embodiment is not limited thereto. The reflow process is a process of stably performing the electrical connection between the inner coil 230 and the outer antenna 600 to the contact part 300 by melting solder cream as high temperature heat source is applied.

The outer terminal 210 of the inner antenna 200 may be connected with the first connector 311 of the contact part 300 by a solder 30, and the internal terminal 220 of the inner antenna 200 may be connected to the second connector 312 of the contact part 300 by the solder 30. The inner terminal 610 of the outer antenna 600 may be connected to the third connector 313 of the contact part 300 by the solder 30, and the outer terminal 620 of the outer antenna 600 may be connected to the fourth connector 313 of the contact part 300 by the solder 30.

Figure 47:
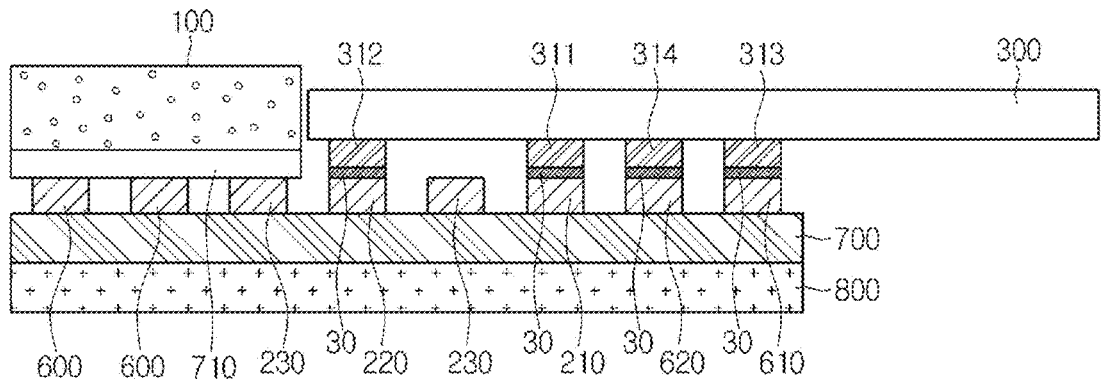

Thereafter, as shown in FIG. 47, the magnetic substrate 100 may be laminated on the top surface of the conductive pattern positioned at parts other than a region occupied by the contact part 300, that is, on the top surface of the inner coil 230 and the outer antenna 600.

Before this, the magnetic substrate 100 having the receiving space corresponding to the contact part 300 can be obtained. The receiving space of the magnetic substrate 100 may be formed in the shape matched with the shape of the contact part 300.

As described with reference to FIG. 37, the whole thickness of the antenna assembly 1000 can be reduced by the thickness of the contact part 300 as the contact part 300 is provided in the receiving space 130 of the magnetic substrate 100. Accordingly, the thickness of the electronic device, such as the portable terminal, having the antenna assembly 1000 mounted therein can be greatly reduced.

In this case, the inner coil 230, and the outer antenna 600 and the magnetic substrate 100 are attached to each other by the first double-side bonding layer 710. According to one embodiment, the magnetic substrate 100 may have the thickness in the range of 100 μm to 800 μm, but the embodiment is not limited thereto. According to one embodiment, the first double-side bonding layer 710 has a thickness in the range of 10 μm to 50 μm, respectively, but the embodiment is not limited thereto.

Figure 48:
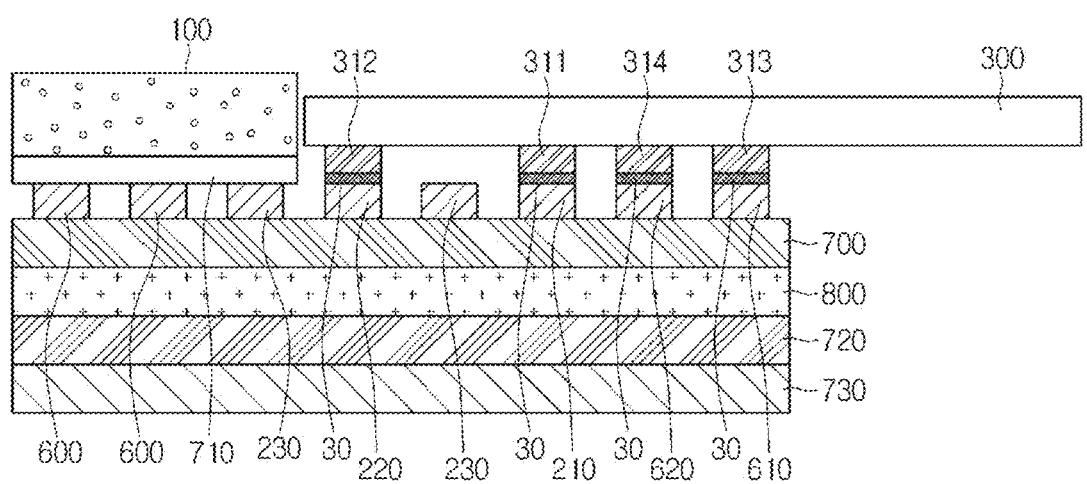

Thereafter, as shown in FIG. 48, the release layer 730 may be attached to one side of the protective film 800 through the second double-side bonding layer 720. The release layer 730 is an attached paper layer to protect the second double-side bonding layer 720, and may be removed when the release layer 730 is attached to the case of the electronic device such as the portable terminal.

Figure 49:
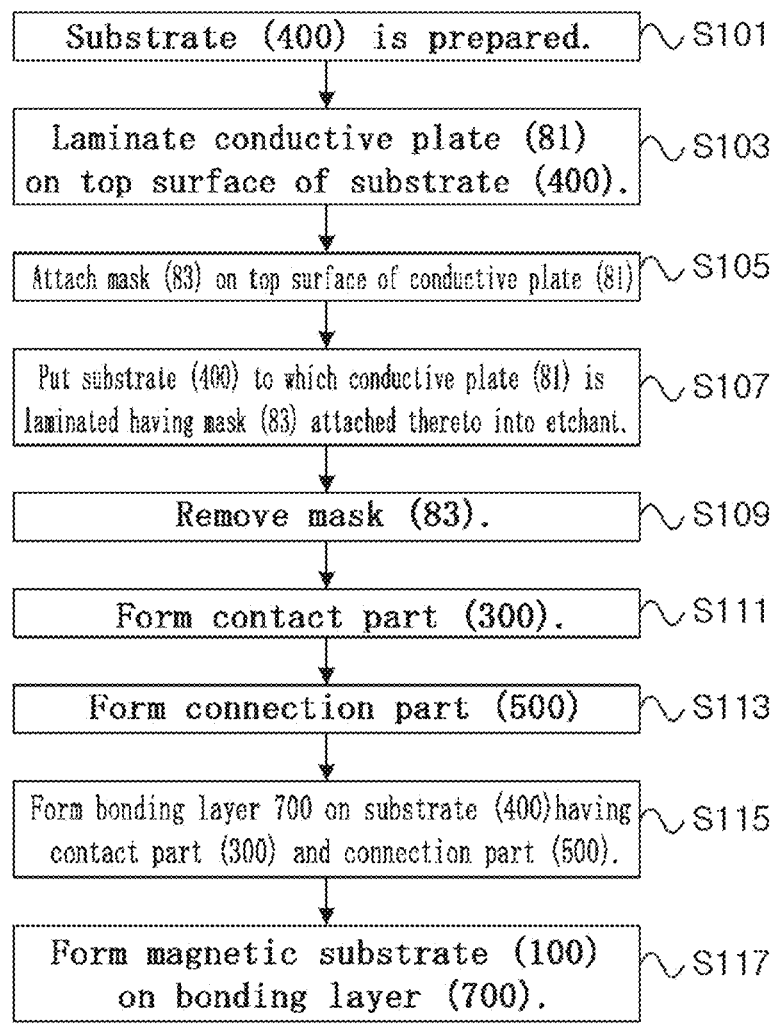
FIG. 49 is a flowchart showing the method of fabricating the antenna assembly according to still another embodiment of the disclosure.

FIG. 49 is a flowchart showing the method of fabricating an antenna assembly according to one embodiment of the disclosure.

In particular, FIG. 49 shows the method of fabricating the antenna assemblies shown in FIGS. 1 to 11.

Referring to FIG. 49, the substrate 400 is prepared (step S101).

Thereafter, a conductive plate 81 is laminated on a top surface of the substrate 400 (step S103). In this case, the conductive plate 81 may include a copper plate.

According to one embodiment, after the bonding layer is laminated on the top surface of the magnetic substrate 100, the conductive plate 81 may be laminated on the bonding layer.

According to another embodiment, the conductive plate 81 is heated at a predetermined temperature, and then a laminating process may be performed to apply predetermined pressure. The laminating process may refer to bond different types of metallic thin films or different types of papers to each other by using heat and pressure.

Thereafter, a mask 83 is attached on the top surface of the conductive plate 81 (step S105). The shape of the mask 83 may include the shape of the inner antenna 200 and the shape of the outer antenna 600.

Subsequently, the substrate 400 on which the conductive plate 81 having the mask 83 attached thereto is laminated is etched by an etchant so that the part having no the mask 83 is removed. Accordingly, the conductive plate 81 is prepared at the pattern of the mask 83 (step S107).

According to one embodiment, the substrate 400 on which the conductive plate 81 having the mask 83 attached thereto is laminated is put into the etchant to etch the conductive plate 81.

According to still another embodiment, the etchant is sprayed onto the substrate 400 on which the conductive plate 81 having the mask 83 attached thereto is laminated to etch the conductive plate 81.

The sectional surface of the conductive pattern formed through the etching process will be described below with reference to FIGS. 50 to 53.

FIGS. 50 to 53 are sectional views showing a conductive pattern formed through the etching process according to the embodiment of the disclosure.

In particular, FIG. 50A shows a sectional view of a conductive pattern formed through an under-etching process according to the embodiment of the disclosure, FIG. 50B shows a sectional view of a conductive pattern formed through an over-etching process, and FIG. 50C shows a sectional view showing a conductive pattern formed through a fine etching process according to the embodiment of the disclosure.

Figure 50:
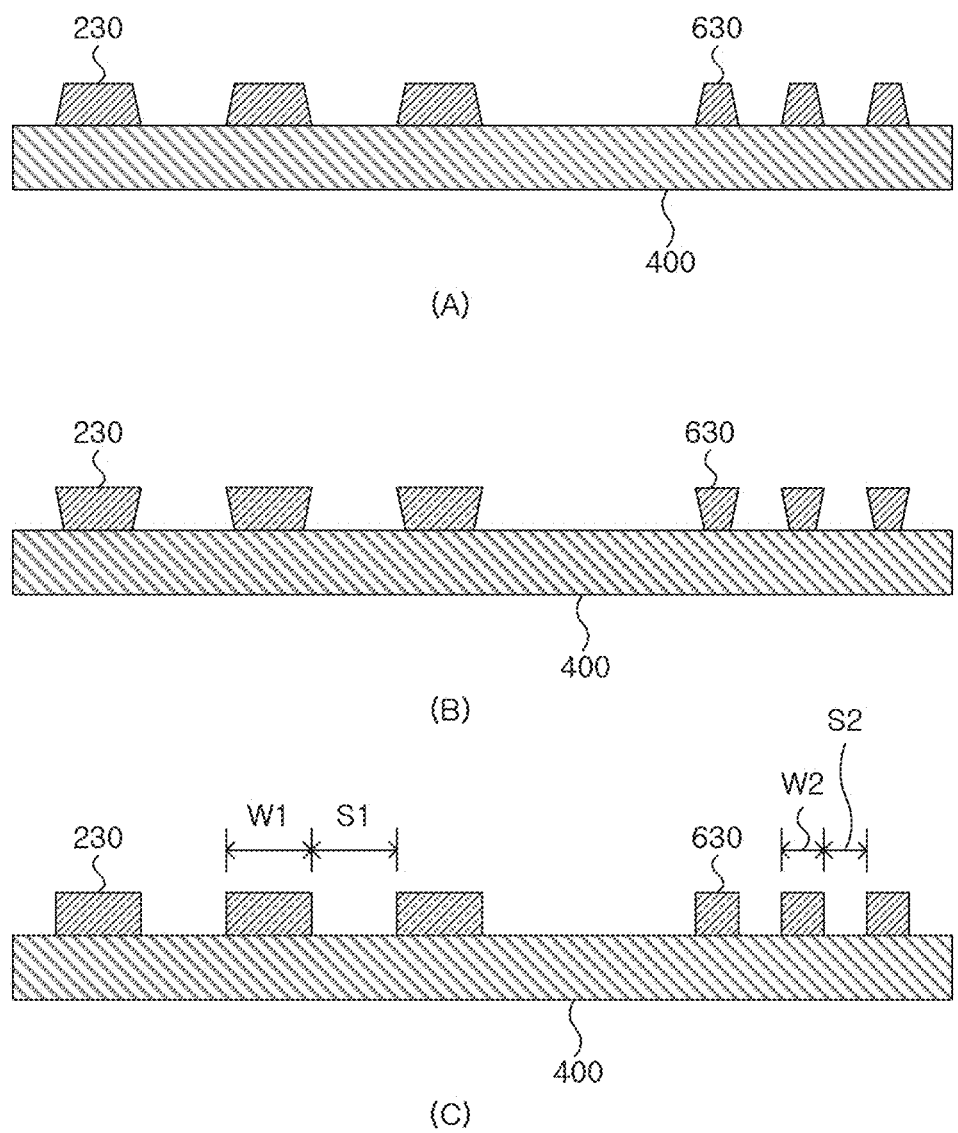
Figure 51:
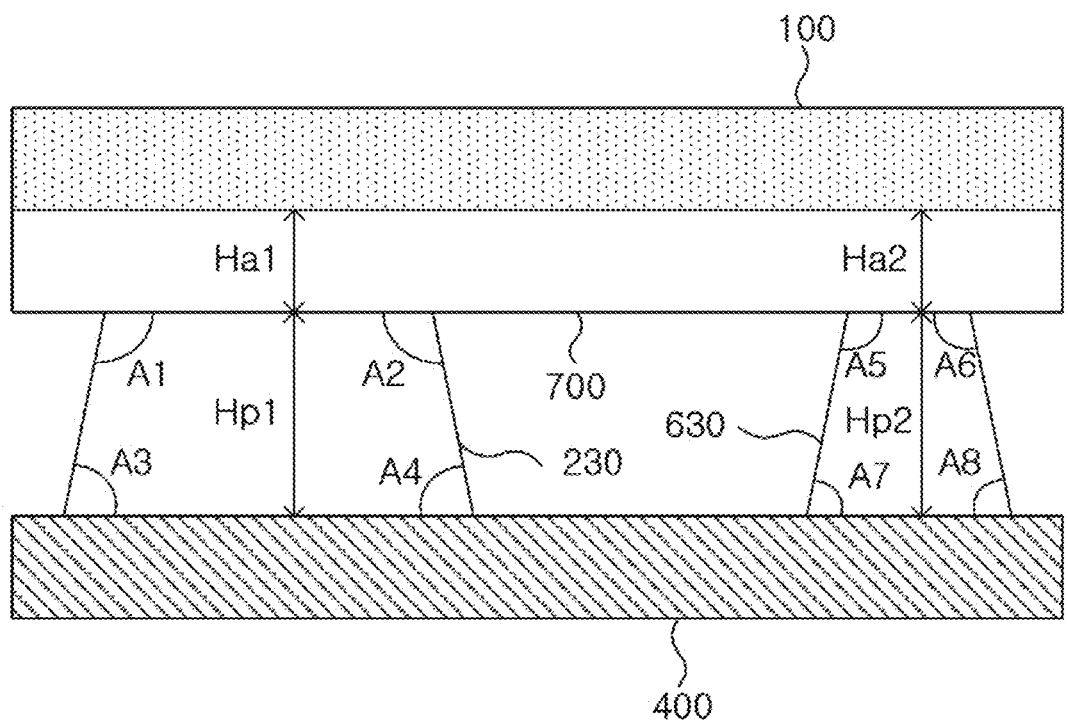
Figure 54:
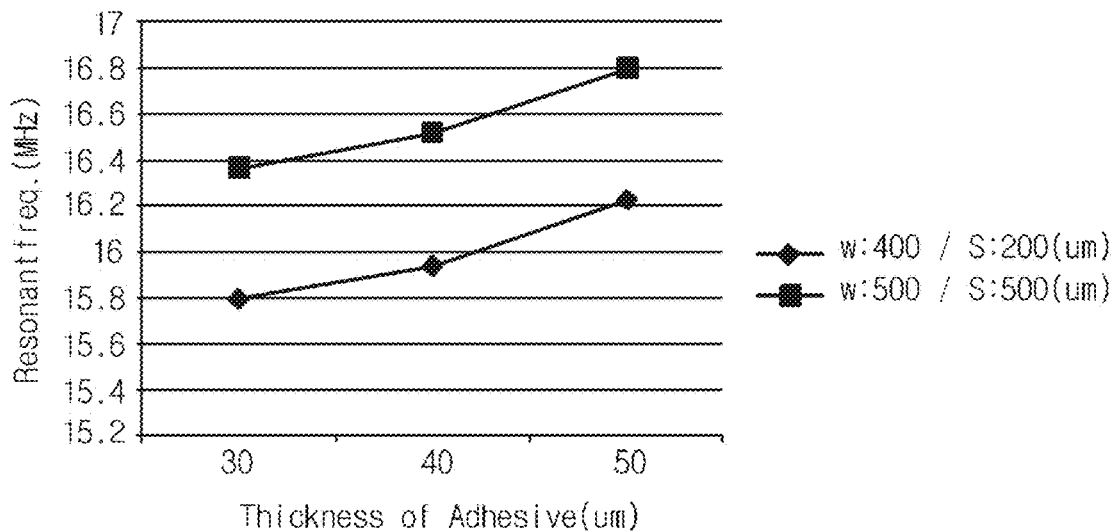
FIG. 54 is a flowchart showing a method of fabricating a connection part of the antenna assembly according to one embodiment of the present invention.

Referring to FIGS. 50 and 51, the sectional surface of the conductive pattern may be an equivalent sectional surface. In other words, the sectional surface of the inner coil 230 corresponding to the coil pattern may be simplified to a polygon having a plurality of inner angles. In this case, the simplification refers to the equivalence of smaller concavo-convex patterns in the sides of the sectional surface or the rounded edges. The equivalent sectional surface of the inner coil 230 corresponding to the coil pattern may be a quadrangular shape, in detail, a trapezoid shape.

The sectional surface of the outer coil 630 corresponding to the coil pattern may be simplified to a polygon having a plurality of inner angles. The sectional surface of the outer coil 630 corresponding to the coil pattern may be a quadrangular shape, in detail, a trapezoid shape.

Hereinafter, the case that the inner coil 230 has a quadrangular sectional surface, and the outer coil 630 has a quadrangular sectional surface will be described.

An equivalent quadrangular sectional surface of the inner coil 230 has a top-left inner angle A1, a top-right inner angle A2, a bottom-left inner angle A3, and a bottom-right inner angle A4.

An equivalent quadrangular sectional surface of the outer coil 630 has a top-left inner angle A5, a top-right inner angle A6, a bottom-left inner angle A7, and a top-right inner angle A8.

According to the embodiment, since the inner coil 230 and the outer coil 630 are formed from the same conductive plate 81, the thickness of the inner coil 230 may be the same as that of the thickness of the outer coil 630. In addition, the inner coil 230 and the outer coil 630 may be formed at the same layer. The top surface of the substrate 400 may be parallel to the top surface of the inner coil 230, and the top surface of the substrate 400 may be parallel to the top surface of the outer coil 630. The height Hp1 from the top surface of the substrate 400 to the top surface of the inner coil 230 may be equal to the height Hp2 from the top surface of the substrate 400 to the top surface of the outer coil 630.

According to the embodiment, in order to increase a Q value by reducing resistance components of a coil pattern, the thickness of the inner coil 230 and the outer coil 630 corresponding to the coil pattern may be 80 μm or more which is greater than the thickness of the typical conductive line pattern. In order to increase the Q value by reducing a resistance component of the coil pattern, the thicknesses of the inner coil 230 and the outer coil 630 corresponding to the coil pattern may be 100 μm or more.

According to the embodiment, since the inner coil 230 and the outer coil 630 are formed from the same conductive plate 81 through the same etching process, the top-left inner angle A1 at the sectional surface of the inner coil 230 may be equal to the top-left inner angle A5 at the sectional surface of the outer coil 630. The top-right inner angle A2 at the sectional surface of the inner coil 230 may be equal to the top-right inner angle A6 at the sectional surface of the outer coil 630. The bottom-right inner angle A3 at the sectional surface of the inner coil 230 may be equal to the bottom-right inner angle A7 at the sectional surface of the outer coil 630. The bottom-right inner angle A4 at the sectional surface of the inner coil 230 may be equal to the bottom-right inner angle A8 at the sectional surface of the outer coil 630.

The top-left inner angle A1 at the sectional surface of the inner coil 230 may be equal to the top-right inner angle A2 at the sectional surface of the inner coil 230. The bottom-right inner angle A3 at the sectional surface of the inner coil 230 may be equal to the bottom-right inner angle A4 at the sectional surface of the inner coil 230. The top-left inner angle A5 at the sectional surface of the outer coil 630 may be equal to the top-right inner angle A6 at the sectional surface of the outer coil 630. The bottom-right inner angle A7 at the sectional surface of the outer coil 630 may be equal to the bottom-right inner angle A8 at the sectional surface of the outer coil 630.

If a fine etching scheme is performed, the top-left inner angle A1, the top-right inner angle A2, the bottom-right inner angle A3, and the bottom-right inner angle A4 at the sectional surface of the inner coil 230 can be substantially equal to 90 degrees. In addition, if the fine etching scheme is performed, the top-left inner angle A5, the top-right inner angle A6, the bottom-right inner angle A7, and the bottom-right inner angle A8 at the sectional surface of the outer coil 630 may be substantially equal to 90 degrees.

If an under-etching scheme is performed, the top-left inner angle A1 at the sectional surface of the inner coil 230 is greater than the top-right inner angle A2 at the sectional surface of the inner coil 230. The bottom-right inner angle A3 at the sectional surface of the inner coil 230 is greater than the bottom-right inner angle A4 at the sectional surface of the inner coil 230. The top-left inner angle A5 at the sectional surface of the outer coil 630 is greater than the top-right inner angle A6 at the sectional surface of the outer coil 630. The bottom-right inner angle A7 at the sectional surface of the outer coil 630 is greater than the bottom-right inner angle A8 at the sectional surface of the outer coil 630.

If an over-etching scheme is performed, the top-left inner angle A1 at the sectional surface of the inner coil 230 is less than the top-right inner angle A2 at the sectional surface of the inner coil 230. The bottom-right inner angle A3 at the sectional surface of the inner coil 230 is less than the bottom-right inner angle A4 at the sectional surface of the inner coil 230. The top-left inner angle A5 at the sectional surface of the outer coil 630 is less than the top-right inner angle A6 at the sectional surface of the outer coil 630. The bottom-right inner angle A7 at the sectional surface of the outer coil 630 is less than the bottom-right inner angle A8 at the sectional surface of the outer coil 630.

Since the Q value of the antenna subject to the fine etching scheme is greater than Q values of the antennas subject to the under-etching scheme or the over-etching scheme, the performance of the antenna subject to the fine etching scheme is less than the performance of the antenna subject to the under-etching scheme or the over-etching scheme. Accordingly, when the maximum and the minimum of four inner angles at each sectional surface of the under-etched and the over-etched antenna patterns are 95 degrees or less, and 85 degrees or more, respectively, the performance of the antenna pattern can be improved.

Hereinafter, the characteristic change of the antenna pattern depending on the change of an etching factor will be described.

Although description is made with reference to FIGS. 52 and 53 while focusing on the inner coil 230, if the inner and outer coils 230 and 630 are formed from the same conductive plate 81, the description of FIGS. 52 and 53 is applicable to the outer coil 630.

The sectional surface of the antenna pattern shown in FIG. 52 corresponds to a pattern etched according to the first embodiment in following table 1, and the sectional surface of the antenna pattern shown in FIG. 53 corresponds to a pattern etched according to the second embodiment in following table 1. FIG. 52A is a substantial sectional view showing the pattern etched according to the first embodiment in the following table 1, and FIG. 52B is an equivalent quadrangular sectional view showing a pattern etched according to the first embodiment in the following table 1. FIG. 53A is a substantial sectional view showing the pattern etched according to the second embodiment in the following table 1, and FIG. 53B is an equivalent quadrangular sectional view showing a pattern etched according to the second embodiment in the following table 1.

TABLE 1

| Etching factor | $1^{st}$ embodiment | $2^{nd}$ embodiment |
| --- | --- | --- |
| Etching chamber material | PVC | Titanium |
| Temperature | 50° C. | 68° C. |
| Nozzle pressure | 3 kPa | 5 kPa |
| Production speed (Possible length in etching one time) | 2.5 m | 4 m |

Following table 2 shows the characteristic of the antenna pattern etched according to the embodiment in table 1.

TABLE 2

| Antenna pattern characteristic | $1^{ST}$ embodiment | $2^{nd}$ embodiment |
| --- | --- | --- |
| Width size (Lu1) of upper side portion at sectional surface (μm) | 472 | 537 |
| Width size (Lc1) of intermediate portion at sectional surface (μm) | 483 | 502 |
| Width size (Lb1) of lower side portion at sectional surface (um) | 561 | 521 |
| Top-left inner angle (A1) of equivalent quadrangular sectional surface (degree) | 114 | 85 |
| Top-right inner angle (A2) (degree) of equivalent quadrangular sectional surface | 114 | 85 |
| Bottom-right inner angle (A3) of equivalent quadrangular sectional surface (degree) | 66 | 95 |
| Bottom-right inner angle (A1) of equivalent quadrangular sectional surface (degree) | 66 | 95 |
| Spacing of antenna pattern (μm) | 139 | 179 |
| Pitch of antenna pattern (μm) | 700 | 700 |
| Thickness (D1) of antenna pattern (μm) | 100 | 100 |
| Turn number of antenna pattern | 14 | 14 |
| Efficiency of antenna pattern (%) | 61.22 | 62.12 |
| Inductance (L) of antenna pattern (micro-H) | 7.672 | 7.624 |
| Resistance (R) of antenna pattern (ohm) | 0.593 | 0.509 |
| Q value of antenna pattern | 8.13 | 9.41 |

As shown in Table 2, it is difficult to allow the width size of the upper side portion at the sectional surface of the antenna pattern, the width size of the intermediate portion at the sectional surface of the antenna pattern, and the width size of the lower side portion at the sectional surface of the antenna pattern to have an equal value. In other words, according to the embodiment of the disclosure, the width size of the upper side portion at the sectional surface of the antenna pattern may be different from the width size of the intermediate portion at the sectional surface of the antenna pattern. The width size of the upper side portion at the sectional surface of the antenna pattern may be different from the width size of the lower side portion at the sectional surface of the antenna pattern. The width size of the intermediate portion at the sectional surface of the antenna pattern may be different from the width size of the lower side portion at the sectional surface of the antenna pattern.

In addition, according to the embodiment of the disclosure, if the width size of the upper side portion at the sectional surface of the antenna pattern may approximate the width size of the lower side portion at the sectional surface of the antenna pattern, the width size of the intermediate portion at the sectional surface of the antenna pattern may be smaller than the width size of the upper side portion at the sectional surface of the antenna pattern, and the width size of the intermediate portion at the sectional surface of the antenna pattern may be smaller than the width size of the lower side portion at the sectional surface of the antenna pattern.

In order to explain the characteristic of the antenna pattern, the maximum (Lmax) and the minimum (Lmin) of the width sizes of the upper side portion and the lower side portion at the sectional surface of the antenna pattern are defined in following Equation 2.

$$Lmax = max(Lu1, Lb1)$$

$$Lmin = min(Lu1, Lb1) \quad \text{[Equation 2]}$$

In Equation 2, max(a, b) returns a greater number of a and b, and min(a, b) returns a smaller number of a and b.

In order to obtain an antenna pattern representing performance superior to that of the first embodiment shown in table 2, at least one of conditions shown in following equation 3 may be satisfied. In Equation 3, |a−b| represents the difference between a and b.

$$D1/(|Lu1-Lb1|/2) > 2.248 \rightarrow D1/|Lu1-Lb1| > 1.124$$

$$D1/(|Lmax-Lc1|/2) > 2.565 \rightarrow D1/|Lmax-Lc1| > 1.283$$

$$D1/(|Lmin-Lc1|/2) > 18.19 \rightarrow D1/|Lmin-Lc1| > 9.095$$

$$90 \text{ degree} \leq max(A1, A2, A3, A4) < 114 \text{ degree}$$

$$66 \text{ degree} < min(A1, A2, A3, A4) \leq 90 \text{ degree} \quad \text{[Equation 3]}$$

In order to obtain an antenna pattern representing performance superior to that of the second embodiment shown in table 2, at least one of conditions shown in Equation 4 may be satisfied.

$$D1/(|Lu1-Lb1|/2) > 12.5 \rightarrow D1/|Lu1-Lb1| > 6.25$$

$$D1/(|Lmax-Lc1|/2) > 5.715 \rightarrow D1/|Lmax-Lc1| > 2.858$$

$$D1/(|Lmin-Lc1|/2) > 10.527 \rightarrow D1/|Lmin-Lc1| > 5.264$$

$$90 \text{ degree} < max(A1, A2, A3, A4) < 95 \text{ degree}$$

$$85 \text{ degree} < min(A1, A2, A3, A4) \leq 90 \text{ degree} \quad \text{[Equation 4]}$$

In order to obtain an antenna pattern representing performance superior to the intermediate performance of the performance of the first embodiment and the performance of the second embodiment shown in table 2, at least one of conditions shown in following Equation 5 may be satisfied.

$$D1/(|Lu1-Lb1|/2) > 3.75 \rightarrow D1/|Lu1-Lb1| > 1.875$$

$$D1/(|Lmax-Lc1|/2) > 4.14 \rightarrow D1/|Lmax-Lc1| > 2.07$$

$$D1/(|Lmin-Lc1|/2) > 14.359 \rightarrow D1/|Lmin-Lc1| > 7.18$$

$$90 \text{ degree} \leq max(A1, A2, A3, A4) < 105 \text{ degree}$$

$$75 \text{ degree} < min(A1, A2, A3, A4) \leq 90 \text{ degree} \quad \text{[Equation 5]}$$

Referring to FIG. 49 again, the mask 83 is removed (step S109), and the inner antenna 200 and the outer antenna 600 of the antenna assembly 1000 are formed.

Meanwhile, the contact part 300 is formed (step S111).

According to one embodiment, when the substrate 400 is integrally formed with the substrate 330 of the contact part 300, the patterns of the inner antenna 200, the outer antenna 600, and the contact part 300 may be simultaneously formed through the above steps (S103, S105, S107, and S111).

According to still another embodiment, when the substrate 400 is separated from the substrate 330 of the contact part 300, the patterns of the contact part 300 may be formed through a process different from a process of forming the inner antenna 200 and the outer antenna 600 of the antenna assembly 1000.

Thereafter, the connection part 500 is formed (step S113). The method of forming the connection part 500 according to various embodiments will be described below.

The bonding layer 700 is formed on the substrate 400 having the contact part 300 and the connection part 500 (step S115).

The magnetic substrate 100 is formed on the bonding layer 700 (step S117).

Hereinafter, the distance between the magnetic substrate 100 and the antenna patterns spaced apart from each other by the bonding layer 700 will be described with reference to FIGS. 50 and 51.

Referring to FIGS. 50 and 51, the inner coil 230 of the inner antenna 200 has a line width of W1 and a spacing S1, and the inner coil 230 is spaced apart from the magnetic substrate 100 at a distance Ha1 by the bonding layer 700. The outer coil 630 of the outer antenna 600 has a line width W2 and a spacing S2, and the external coil 630 is spaced apart from the magnetic substrate 100 at a distance Ha2 by the bonding layer 700. Since the bonding layer used to space the inner coil 230 apart from the magnetic substrate 100 is the same as the bonding layer used to space the outer coil 630 apart from the magnetic substrate 100, the distance Ha1 may be equal to the distance Ha2.

Table 3 shows NFC communication performance of the outer antenna 600, which is varied depending on the distance Ha2 between the magnetic substrate 100 and the outer antenna 600 spaced apart from each other by the bonding layer 700, as the result of an EMVCo load modulation test when the outer antenna 600 is an NFC antenna, the line width W2 of the external antenna 600 is 400 μm, and the spacing S2 of the outer antenna 600 is 200 μm.

TABLE 3

| W: 400/S: 200 (um) | | | | | | | |
|---|---|---|---|---|---|---|---|
| | | Gap (Thick. of Ad) | | | | | |
| | | 30 um | | 40 um | | 50 um | |
| Resonant freq. | | 15.79 MHz | | 15.935 MHz | | 16.225 MHz | |
| EMVCo Load modulation | (0, 0, 0) 8.8 < X < 80 | 29.15 mV | PASS | 32.7 mV | PASS | 34.58 mV | PASS |
| | (1, 0, 0) 7.2 < X < 80 | 12.7 mV | PASS | 15.6 mV | PASS | 19.2 mV | PASS |
| | (2, 0, 0) 5.6 < X < 80 | 6.4 mV | PASS | 8.6 mV | PASS | 11.0 mV | PASS |
| | (3, 0, 0) 4.0 < X < 80 | 3.8 mV | FAIL | 4.6 mV | PASS | 5.4 mV | PASS |

In table 3, x, y, and z represent the relative position relationship between test equipment and the antenna assembly 1000. In particular, an x value among x, y, and z represents the distance between the test equipment and the antenna assembly 1000.

Further, in table 3, A<X<B represent the range of the performance value used to pass the test. For example, in order to pass the test at the relative position relationship (0, 0, 0), the performance value of the antenna must be greater than 8.8 mV, and must be smaller than 80 mV. When the distance Ha2 is 30 μm, the resonance frequency is 15.79 MHz, and the antenna performance of the outer antenna 600 is 29.15 mv. Accordingly, the outer antenna 600 having the line width of 400 μm, the spacing of 200 μm, and the distance of 30 μm is proper.

However, in order to pass the test at the relative position relationship (3, 0, 0), the performance value of the antenna must be smaller than 80 mV, and must be smaller than 80 mV. When the distance Ha2 is 30 μm, the resonance frequency is 15.79 MHz, and the antenna performance of the outer antenna 600 is 3.8 mv. Accordingly, the outer antenna 600 having the line width of 400 μm, the spacing of 200 μm, and the distance of 30 μm is not proper.

Table 4 shows NFC communication performance of the outer antenna 600, which is varied depending on the distance Ha2 between the magnetic substrate 100 and the outer antenna 600 spaced apart from each other by the bonding layer 700, as the result of an EMVCo load modulation test when the outer antenna 600 is an NFC antenna, the line width W2 of the external antenna 600 is 500 μm, and the spacing S2 of the outer antenna 600 is 500 μm.

As recognized from table 3 and table 4, since line width increase and spacing increase decreases a resistance component, the Q value can be increased, and the performance of the outer antenna 600 can be improved.

In particular, as shown in Table 3 and Table 4, if the line width of the outer antenna 600 is less than 400 μm, and the spacing of the outer antenna 600 is less than 200 μm, the performance of the outer antenna 600 may be significantly affected by the distance Ha2. If the line width of the outer antenna 600 is less than 400 μm, and the spacing of the outer antenna 600 is less than 200 μm, the distance Ha2 is preferably equal to or greater than 35 μm when taking into consideration a margin.

As described above, the bonding layer 700 includes a typical bonding layer having the thickness of 10 μm or more, so that the performance of the outer antenna 600 can be improved.

Table 5 shows NFC communication performance of the outer antenna 600, which is varied depending on the distance Ha2 between the magnetic substrate 100 and the outer antenna 600 spaced apart from each other by the bonding layer 700, as the result of an EMVCo load modulation test when the outer antenna 600 is an NFC antenna, the line width W2 of the external antenna 600 is 400 μm, the spacing S2 of the outer antenna 600 is 200 μm, and the relative position relationship between the test equipment and the antenna assembly 1000 is (3, 0, 0)

TABLE 4

| W: 500/S: 500 (um) | | | | | | | |
|---|---|---|---|---|---|---|---|
| | | Gap (Thick. of Ad) | | | | | |
| | | 30 um | | 40 um | | 50 um | |
| Resonant freq. | | 16.37 MHz | | 16.515 MHz | | 16.805 MHz | |
| EMVCo Load modulation | (0, 0, 0) 8.8 < X < 80 | 32.7 mV | PASS | 31.0 mV | PASS | 25.6 mV | PASS |
| | (1, 0, 0) 7.2 < X < 80 | 20.2 mV | PASS | 19.7 mV | PASS | 18.2 mV | PASS |
| | (2, 0, 0) 5.6 < X < 80 | 12.2 mV | PASS | 11.9 mV | PASS | 10.4 mV | PASS |
| | (3, 0, 0) 4.0 < X < 80 | 6.1 mV | PASS | 6.0 mV | PASS | 5.9 mV | PASS |

TABLE 5

| W: 400/S: 200 (um) | | | | | | | |
|---|---|---|---|---|---|---|---|
| | Gap (Thick. of Ad) | | | | | | |
| | 10 um | 20 um | 30 um | 40 um | 50 um | 60 um | 70 um |
| Resonant freq. (MHz) | 15.0 | 15.22 | 15.79 | 15.935 | 16.225 | 16.32 | 16.51 |
| Load (3, 0, 0) | 0 mV | 1.2 mV | 3.8 mV | 4.6 mV | 5.4 mV | 5.5 mV | 3.9 mV |
| modulation 4.0 < X < 80 | FAIL | FAIL | FAIL | PASS | PASS | PASS | FAIL |

As shown in Table 5, if the line width W2 is less than 400 μm, and the spacing S2 is 200 μm, and if the distance Ha2 is smaller than 30 μm, the outer antenna 600 does not pass the EMVCo Load modulation. Accordingly, the distance Ha 2 is preferably grater than 30 μm.

If the line width W2 is 400 μm and the spacing S2 is 200 μm, and if the distance Ha2 is greater than 70 μm, the outer antenna 600 does not pass the EMVCo Load modulation. Accordingly, the distance Ha2 is preferably less than 70 μm.

If the line width W2 is 400 μm and the spacing S2 is 200 μm, and if the distance Ha2 is greater than 40 μm and less than 60 μm, the outer antenna 600 passes the EMVCo Load modulation. Accordingly, the distance Ha2 is preferably greater than 40 μm and less than 60 μm.

Table 6 shows NFC communication performance of the outer antenna 600, which is varied depending on the distance Ha2 between the magnetic substrate 100 and the outer antenna 600 spaced apart from each other by the bonding layer 700, as the result of an EMVCo load modulation test when the outer antenna 600 is an NFC antenna, the line width W2 of the external antenna 600 is 500 μm, the spacing S2 of the outer antenna 600 is 500 μm, and the relative position relationship between the test equipment and the antenna assembly 1000 is (3, 0, 0)

TABLE 6

| W: 500/S: 500 (um) | | | | | | | |
|---|---|---|---|---|---|---|---|
| | Gap (Thick. of Ad) | | | | | | |
| | 10 um | 20 um | 30 um | 40 um | 50 um | 60 um | 70 um |
| Resonant freq. (MHz) | 15.95 | 16.117 | 16.37 | 16.515 | 16.805 | 16.91 | 17.15 |
| Load (3, 0, 0) | 0 mV | 2.9 mV | 6.1 mV | 6.0 mV | 5.9 mV | 5.2 mV | 3.3 mV |
| modulation 4.0 < X < 80 | FAIL | FAIL | PASS | PASS | PASS | PASS | FAIL |

If the line width W2 is 500 μm and the spacing S2 is 500 μm, and if the distance Ha2 is greater than 20 μm, the outer antenna 600 does not pass the EMVCo Load modulation. Accordingly, the distance Ha2 is preferably greater than 20 μm.

If the line width W2 is 500 μm and the spacing S2 is 500 μm, and if the distance Ha2 is greater than 70 μm, the outer antenna 600 does not pass the EMVCo Load modulation. Accordingly, the distance Ha2 is preferably less than 70 μm.

If the line width W2 is 500 μm and the spacing S2 is 500 μm, and if the distance Ha2 is greater than 30 μm and less than 60 μm, the outer antenna 600 passes the EMVCo Load modulation. Accordingly, the distance Ha2 is preferably greater than 30 μm and less than 60 μm.

As shown in Tables 5 and 6, if the distance Ha2 is greater than 35 μm and less than 65 μm, the outer antenna 600 can pass the two tests. Accordingly, if the distance Ha2 is greater than 35 μm and less than 65 μm, the resonance frequency can be easily set in the range of 16.2 MHz to 16.3 MHz which is a target frequency range. In other words, if the distance Ha2 is less than a predetermined value, the impedance matching is not easy.

Figure 55:
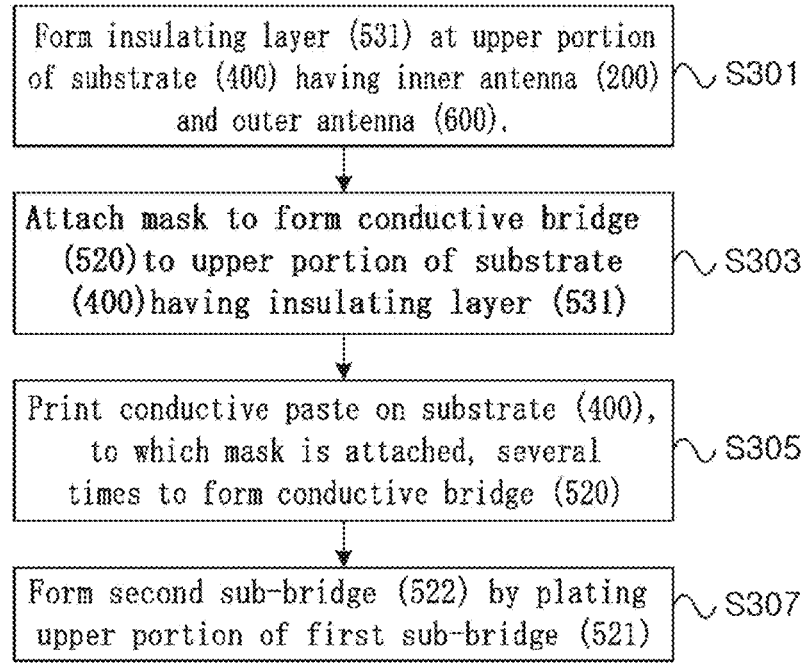
FIG. 55 is a graph showing the performance of a conductive bridge as a function of a printing count of conductive paste according to the embodiment of the disclosure.

FIG. 55 is a flowchart showing a method of fabricating the connection part 500 of the antenna assembly 1000 according to one embodiment of the disclosure.

In particular, FIG. 55 shows the method of fabricating the connection part 500 of the antenna assembly 1000 shown in FIGS. 4 and 5.

The insulating layer 531 is formed at the upper portion of the substrate 400 having the inner antenna 200 and the outer antenna 600 (step S301).

The insulating layer 531 may have the shape sufficient to cover a part in which the conductive bridge 520 corresponding to the first sub-connection part 501 meets the inner coil 230 and to cover a part in which the conductive bridge 520 corresponding to the first sub-connection part 501 meets the outer coil 630 without covering a portion of the outer terminal 210 of the inner antenna 200.

The insulating layer 531 may have the shape sufficient to cover a part in which the conductive bridge 520 corresponding to the second sub-connection part 502 meets the inner coil 230 and to cover a part in which the conductive bridge 520 corresponding to the second sub-connection part 502 meets the outer coil 630 without covering a portion of the inner terminal 220 of the inner antenna 200.

The insulating layer 531 may have the shape sufficient to cover a part in which the conductive bridge 520 corresponding to the third sub-connection part 503 meets the inner coil 230 and to cover a part in which the conductive bridge 520 corresponding to the third sub-connection part 503 meets the outer coil 630 without covering a portion of the inner terminal 610 of the outer antenna 600.

The insulating layer 531 may have the shape sufficient to cover a part in which the conductive bridge 520 corresponding to the second sub-connection part 502 meets the inner coil 230 and to cover a part in which the conductive bridge 520 corresponding to the fourth sub-connection part 504 meets the inner coil 230 without covering a portion of the outer terminal 620 of the outer antenna 600.

According to one embodiment, the insulating layer 531 may include insulating sheet. The insulating sheet may be attached to the upper portion of the substrate 400 having the inner antenna 200 and the outer antenna 600 by the bonding layer or the laminating process.

According to still another embodiment, the insulating layer 531 may include insulating ink coated and dried. In this case, a mask is attached to the upper portion of the substrate 400 having the inner antenna 200 and the outer antenna 600 in order to form the insulating layer 531. In this case, the mask to form the insulating layer 531 has the shape in such a manner that the mask covers at least a portion of the inner terminal 220 of the inner antenna 200, the outer terminal 210 of the inner antenna 200, and the inner terminal 610 of the outer antenna 600 without covering a part in which the conductive bridge 520 corresponding to the first sub-connection part 501 is formed, a part in which the conductive bridge 520 corresponding to the second sub-connection part 501 is formed, and a part in which the conductive bridge 520 corresponding to the third sub-connection part 503 is formed. If the fourth sub-connection part 504 corresponds to the conductive bridge 520, the mask to form the insulating layer 531 covers at least a portion of the outer terminal 620 of the outer antenna 600 and does not cover a part in which the conductive bridge 520 corresponding to the fourth sub-connection part 504 is formed. If insulating ink is coated on the upper portion of the substrate 400 having the mask to form the insulating layer 531 and dried, and a corresponding mask is removed from the resultant structure, the insulating layer 531 formed of the insulating ink may be formed.

Thereafter, the mask to form the conductive bridge 520 is attached to the upper portion of the substrate 400 having the insulating layer 531 (step S303). The mask to form the conductive bridge 520 does not cover the part in which the conductive bridge 520 corresponding to the first sub-connection part 501 is formed, the part in which the conductive bridge 520 corresponding to the second sub-connection part 502 is formed, the part in which the conductive bridge 520 corresponding to the third sub-connection part 503 is formed, and the part in which the conductive bridge 520 corresponding to the fourth sub-connection part 504 is formed, but may cover the periphery of the above parts.

Conductive paste is printed on the substrate 400, to which the mask to form the conductive bridge 520 is attached, several times (step S305) to form the first sub-bridge 521.

The following table shows the performance of the conductive bridge according to the printing count of the conductive paste.

| Printing count | L (uH) | R (Ω) | Q | DCR (Ω) |
| --- | --- | --- | --- | --- |
| 1 | 7.607 | 1.699 | 2.833 | 1.717 |
| 3 | 7.608 | 1.291 | 3.706 | 1.320 |
| 5 | 7.588 | 1.245 | 4.102 | 1.250 |
| 6 | 7.613 | 1.153 | 4.277 | 1.067 |

Figure 56:
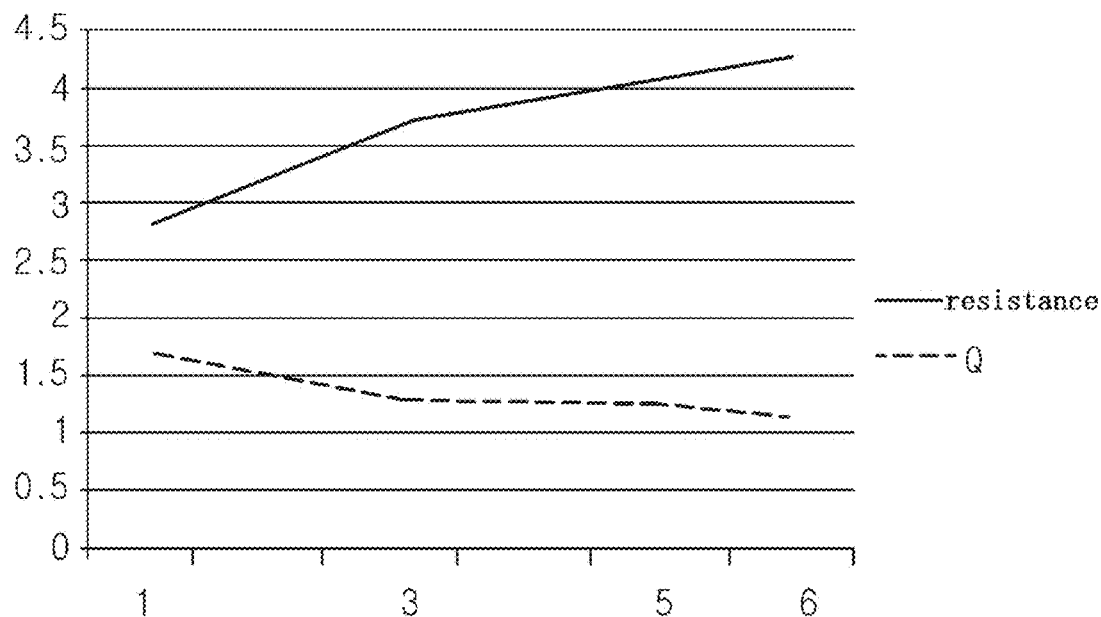
FIG. 56 is a flowchart showing a method of fabricating a connection part of an antenna assembly according to another embodiment of the disclosure.

FIG. 56 is a graph showing the performance of the conductive bridge as a function of the printing count of the conductive paste according to the embodiment of the disclosure.

As shown in FIG. 56, as the printing count of the conductive paste is increased, the resistance of the conductive bridge is decreased, so that the Q value is increased.

In particular, as shown in FIG. 56, if the printing count of the conductive paste is less than three times, the resistance and the Q value as a function of the printing count of the conductive paste is rapidly decreased and increased, respectively. If the printing count of the conductive paste is greater than three times, the resistance or the Q value as a function of the printing count of the conductive paste is slowly decreased and increased, respectively.

In order to improve the performance of the antennas in the antenna assembly, the conductive bridge may have the thickness corresponding to at least three-time printing of the conductive paste.

In particular, the increase in the printing count of the conductive paste refers to the increase of the complexity in the fabrication process of the antenna assembly 1000. Accordingly, the conductive bridge may have the thickness corresponding to at least three-time printing of the conductive paste.

Further, when the conductive bridge includes the second sub-bridge 522 formed through the plating scheme, the resistance may be additionally decreased due to the second sub-bridge 522. Accordingly, the conductive bridge may have the thickness corresponding to at least one printing of the conductive paste.

The second sub-bridge 522 is formed by plating the upper portion of the first sub-bridge 521 (step S307). In this case, the upper portion of the first sub-bridge 521 may be plated with copper (Cu).

Figure 57:
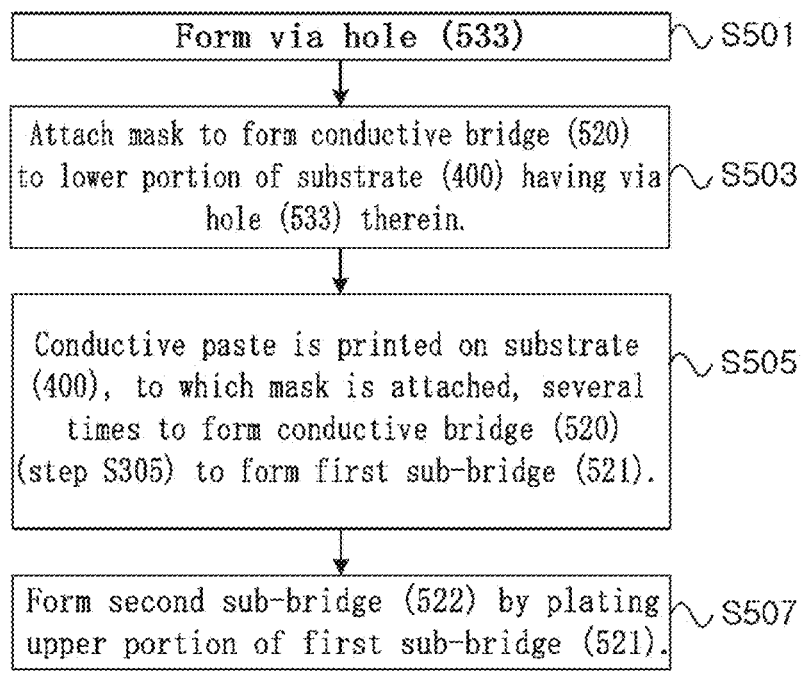
FIG. 57 is a flowchart showing a method of fabricating a connection part of an antenna assembly according to still another embodiment of the disclosure.

FIG. 57 is a flowchart showing a method of fabricating the connection part 500 of the antenna assembly according to still another embodiment of the disclosure.

In particular, FIG. 57 shows the method of fabricating the connection part 500 of the antenna assembly shown in FIGS. 6 to 8.

First, in the substrate 400, the via hole 533 is formed under the outer terminal 210 of the inner antenna 200, the inner terminal 220 of the inner antenna 200, the inner terminal 610 of the outer antenna 600, and the outer terminal 620 of the outer antenna 600.

The mask to form the conductive bridge 520 is attached to the lower portion of the substrate 400 having the via hole 533 (step S503). The mask to form the conductive bridge 520 does not cover the part in which the conductive bridge 520 corresponding to the first sub-connection part 501 is formed, the part in which the conductive bridge 520 corresponding to the second sub-connection part 502 is formed, the part in which the conductive bridge 520 corresponding to the third sub-connection part 503 is formed, and the part in which the conductive bridge 520 corresponding to the fourth sub-connection part 504 is formed, but may cover the periphery of the above parts.

Conductive paste is printed on the substrate 400, to which the mask to form the conductive bridge 520 is attached, several times (step S305) to form the first sub-bridge 521. The performance of the conductive bridge according to the printing count of the conductive paste has been described above.

The lower portion of the first sub-bridge 521 is plated (step S507), so that the second sub-bridge 522 is formed. In this case, the lower portion of the first sub-bridge 521 may be plated with copper (Cu).

Figure 58:
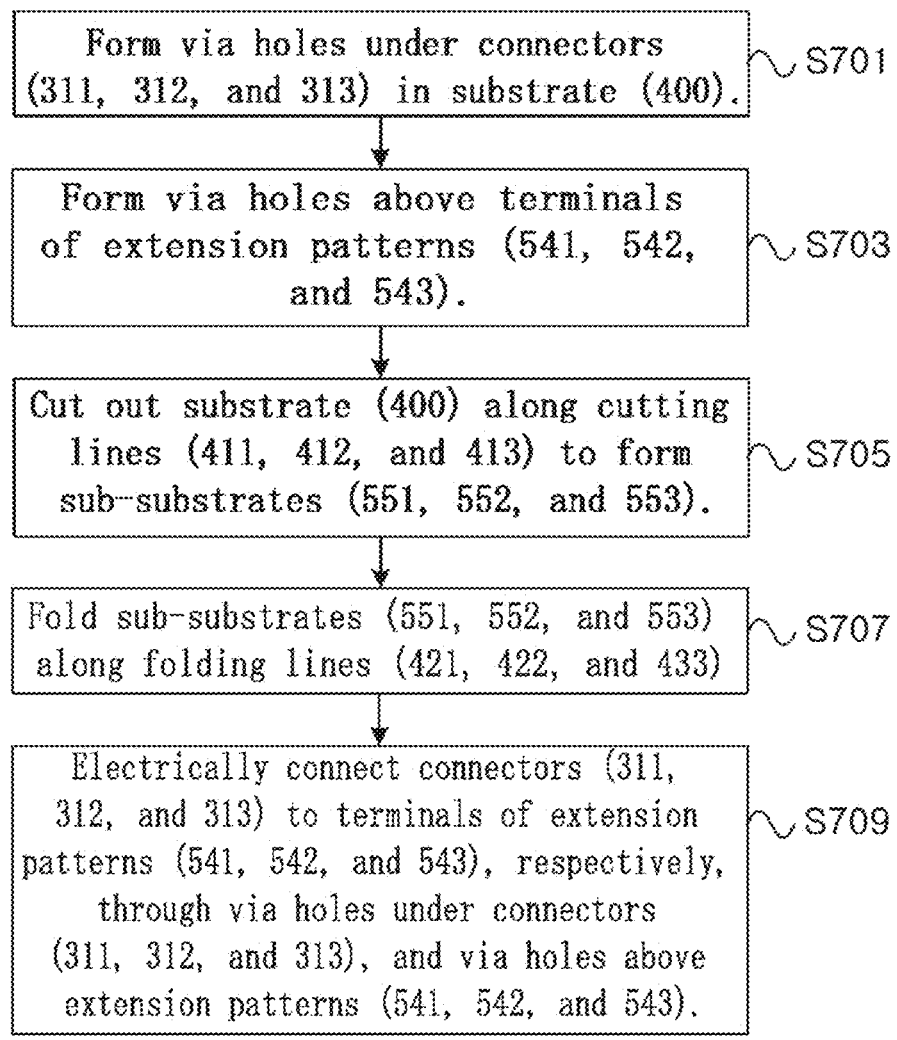
FIG. 58 is a flowchart showing the method of fabricating the connection part 500 of the antenna assembly according to another embodiment of the disclosure.

FIG. 58 is a flowchart showing the method of fabricating the connection part 500 of the antenna assembly according to another embodiment of the disclosure.

In particular, FIG. 58 shows the method of fabricating the connection part 500 of the antenna assembly shown in FIGS. 9 to 11.

The via holes are formed under the connectors 311, 312, and 313 in the substrate 400 (step S701).

The via holes are formed above the terminals of the extension patterns 541, 542, and 543 (step S703).

The substrate 400 is cut out along the cutting lines 411, 412, and 413 to form the sub-substrates 551, 552, and 553 (step S705).

The sub-substrates 551, 552, and 553 are folded along the folding lines 421, 422, and 433, so that the lower portion of the substrate 400 makes contact with the upper portions of the sub-substrates 551, 552, and 553 (step S707).

The connectors 311, 312, and 313 are electrically connected to the terminals of the extension patterns 541, 542, and 543, respectively, through the via holes under the connectors 311, 312, and 313, and the via holes above the upper position of the extension patterns 541, 542, and 543 (step S709). The connectors 311, 312, and 313 and the terminals of the extension patterns 541, 542, and 543 may be electrically connected with each other by the thermocompression of the conductive vias provided in the via holes 533 and conductive materials provided at the peripheral portions of the conductive vias.

Although an exemplary embodiment of the disclosure has been described, the disclosure is not limited to the above features, but it should be understood by those skilled in the art that various modifications and variations are possible without departing from the subject matter of the disclosure claimed by accompanying claims. In addition, the modifications and variations should not be understood based on the technical spirit or prospects of the disclosure.

What is claimed is:

1. An antenna assembly comprising:
    a first antenna for wireless charging;
    a second antenna for wireless communication;
    a magnetic sheet;
    a plurality of contact terminals;
    a first plurality of lines connecting the first antenna and the plurality of contact terminals; and
    a second plurality of lines connecting the second antenna and the plurality of contact terminals,
    wherein the first antenna comprises:
        a first coil pattern wound multiple times;
        a first terminal positioned at an outside of the first coil pattern; and
        a second terminal positioned at an inside of the first coil pattern;
    wherein the second antenna comprises:
        a second coil pattern wound multiple times;
        a third terminal positioned at an inside of the second coil pattern; and
        a fourth terminal positioned at an outside of the second coil pattern;
    wherein the first terminal is disposed at the inside of the second coil pattern;
    wherein the third terminal is disposed at the outside of the first coil pattern;
    wherein the third terminal is closer to the first terminal than it is to the second terminal;
    wherein the third terminal is closer to the first terminal than it is to the fourth terminal;
    wherein the plurality of contact terminals comprises:
        a first contact terminal and a second contact terminal connected to the first antenna; and
        a third contact terminal and a fourth contact terminal connected to the second antenna,
    wherein the first plurality of lines is positioned between the third terminal and the fourth terminal;
    wherein the first plurality of lines comprises:
        a first line connecting the first terminal and the first contact terminal; and
        a second line connecting the second terminal and the second contact terminal,
    wherein the second plurality of lines comprises:
        a third line connecting the third terminal and the third contact terminal; and
        a fourth line connecting the fourth terminal and the fourth contact terminal, and
    wherein the antenna assembly comprises a part in which a distance between the magnetic sheet and the second antenna is 35 to 65 µm.

2. The antenna assembly of claim 1, wherein the first line is positioned between the third line and the fourth line in the part of the antenna assembly.

3. The antenna assembly of claim 1, wherein the second line is positioned between the third line and the fourth line in the part of the antenna assembly.

4. The antenna assembly of claim 1, wherein the first line comprises a first sub-connection part, a first connector, and a first connection conductive line,
    wherein the first sub-connection part connects the first terminal and the first connector, and
    wherein the first connection conductive line connects the first connector and the first contact terminal.

5. The antenna assembly of claim 4, wherein the second line comprises a second sub-connection part, a second connector, and a second connection conductive line,
    wherein the second sub-connection part connects the second terminal and the second connector, and
    wherein the second connection conductive line connects the second connector and the second contact terminal.

6. The antenna assembly of claim 1,
    wherein the third line comprises a third sub-connection part, a third connector, and a third connection conductive line,
    wherein the third sub-connection part connects the third terminal and the third connector, and
    wherein the third connection conductive line connects the third connector and the third contact terminal.

7. The antenna assembly of claim 6, wherein the fourth line comprises a fourth sub-connection part, a fourth connector, and a fourth connection conductive line,
    wherein the fourth sub-connection part connects the fourth terminal and the fourth connector, and
    wherein the fourth connection conductive line connects the fourth connector and the fourth contact terminal.

8. The antenna assembly of claim 1,
    wherein the antenna assembly comprises the part that the distance between the magnetic sheet and the second antenna is 40 to 60 µm.

9. The antenna assembly of claim 8, wherein a spacing of the second antenna is less than 500 µm, and
    wherein the spacing of the second antenna is ½ to 2 times than a line width of the second antenna.

10. The antenna assembly of claim 8, further comprising an adhesive layer between the magnetic sheet and the second antenna.

11. An antenna assembly comprising:
    a first antenna for wireless charging;
    a second antenna for wireless communication;
    a magnetic sheet;
    a plurality of contact terminals;
    a first plurality of lines connecting the first antenna and the plurality of contact terminals; and
    a second plurality of lines connecting the second antenna and the plurality of contact terminals, wherein the first antenna comprises:
   a first coil pattern wound multiple times;
   a first terminal positioned at an outside of the first coil pattern; and
   a second terminal positioned at an inside of the first coil pattern;
wherein the second antenna comprises:
   a second coil pattern wound multiple times;
   a third terminal positioned at an inside of the second coil pattern; and
   a fourth terminal positioned at an outside of the second coil pattern;
wherein the first terminal is disposed at the inside of the second coil pattern;
wherein the third terminal is disposed at the outside of the first coil pattern;
wherein the third terminal is closer to the first terminal than it is to the second terminal;
wherein the third terminal is closer to the first terminal than it is to the fourth terminal;
wherein the plurality of contact terminals comprises:
   a first contact terminal and a second contact terminal connected to the first antenna; and
   a third contact terminal and a fourth contact terminal connected to the second antenna,
wherein the first plurality of lines and the second plurality of lines are alternately arranged on the antenna assembly in such a manner that one line of the second plurality of lines is arranged between two adjacent lines of the first plurality of lines and one line of the first plurality of lines is arranged between two adjacent lines of the second plurality of lines,
wherein the first plurality of lines comprises:
   a first line connecting the first terminal and the first contact terminal; and
   a second line connecting the second terminal and the second contact terminal,
wherein the second plurality of lines comprises:
   a third line connecting the third terminal and the third contact terminal; and
   a fourth line connecting the fourth terminal and the fourth contact terminal, and
wherein the antenna assembly comprises a part in which a distance between the magnetic sheet and the second antenna is 35 to 65 µm.

12. An antenna assembly of claim 11, wherein the first line is positioned between the third line and the fourth line in the part of the antenna assembly.

13. An antenna assembly of claim 11, wherein the second line is positioned between the third line and the fourth line in the part of the antenna assembly.

14. The antenna assembly of claim 11, wherein the first line comprises a first sub-connection part, a first connector, and a first connection conductive line,
   wherein the first sub-connection part connects the first terminal and the first connector, and
   wherein the first connection conductive line connects the first connector and the first contact terminal.

15. The antenna assembly of claim 14, wherein the second line comprises a second sub-connection part, a second connector, and a second connection conductive line,
   wherein the second sub-connection part connects the second terminal and the second connector, and
   wherein the second connection conductive line connects the second connector and the second contact terminal.

16. The antenna assembly of claim 11, wherein the third line comprises a third sub-connection part, a third connector, and a third connection conductive line,
   wherein the third sub-connection part connects the third terminal and the third connector, and
   wherein the third connection conductive line connects the third connector and the third contact terminal.

17. The antenna assembly of claim 16,
   wherein the fourth line comprises a fourth sub-connection part, a fourth connector, and a fourth connection conductive line,
   wherein the fourth sub-connection part connects the fourth terminal and the fourth connector, and
   wherein the fourth connection conductive line connects the fourth connector and the fourth contact terminal.

18. The antenna assembly of claim 11, wherein the antenna assembly comprises the part that the distance between the magnetic sheet and the second antenna is 40 to 60 µm.

19. The antenna assembly of claim 18, wherein a spacing of the second antenna is less than 500 µm, and
   wherein the spacing of the second antenna is ½ to 2 times than a line width of the second antenna.

20. The antenna assembly of claim 18, further comprising an adhesive layer between the magnetic sheet and the second antenna.

* * * * *